(12) United States Patent
Saggar et al.

(10) Patent No.: US 11,695,498 B2
(45) Date of Patent: Jul. 4, 2023

(54) TECHNIQUES FOR SYMBOL TRANSMISSION WITH MODIFIED PADDING DURATION

(71) Applicant: QUALCOMM Incorporated, San Diego, CA (US)

(72) Inventors: Hemant Saggar, Irvine, CA (US); Iyab Issam Sakhnini, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 201 days.

(21) Appl. No.: 17/344,494

(22) Filed: Jun. 10, 2021

(65) Prior Publication Data

US 2022/0399951 A1 Dec. 15, 2022

(51) Int. Cl.
*H04L 1/00* (2006.01)
*H04L 27/26* (2006.01)
*H04L 41/0803* (2022.01)
*H04W 24/10* (2009.01)
*H04W 72/20* (2023.01)
*H04W 72/044* (2023.01)

(52) U.S. Cl.
CPC ........ *H04L 1/0008* (2013.01); *H04L 27/2605* (2013.01); *H04L 41/0803* (2013.01); *H04W 24/10* (2013.01); *H04W 72/20* (2023.01); *H04W 72/044* (2013.01)

(58) Field of Classification Search
None
See application file for complete search history.

(56) References Cited

U.S. PATENT DOCUMENTS

| 10,609,707 | B2 * | 3/2020 | Lahetkangas | H04L 5/0091 |
| 2020/0205140 | A1 * | 6/2020 | Du | H04W 72/23 |
| 2020/0244418 | A1 * | 7/2020 | Baldemair | H04L 1/1854 |
| 2021/0218608 | A1 * | 7/2021 | Rama Chandran | H04L 27/2678 |
| 2021/0360472 | A1 * | 11/2021 | Cao | H04W 72/04 |

* cited by examiner

*Primary Examiner* — Diane L Lo
(74) *Attorney, Agent, or Firm* — Holland & Hart LLP

(57) ABSTRACT

Methods, systems, and devices for wireless communications are described. A device may receive an indication of a subcarrier spacing (SCS) for communications in a plurality of transmission time intervals (TTIs), where a TTI include a set of symbols, a corresponding set of cyclic prefixes, and a padding duration. The device may receive a control signal indicating a configuration for the padding duration, at least a portion of which may be reallocated as one or more additional symbols with corresponding one or more additional cyclic prefixes. In some examples, the one or more additional cyclic prefixes and at least a first portion of the set of cyclic prefixes may be reduced in duration in comparison with a remaining portion of the set of cyclic prefixes. The device may communicate during the padding duration using the one or more additional symbols and the corresponding one or more additional cyclic prefixes.

30 Claims, 25 Drawing Sheets

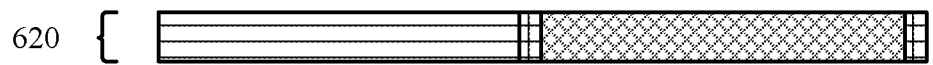

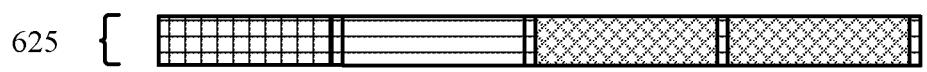

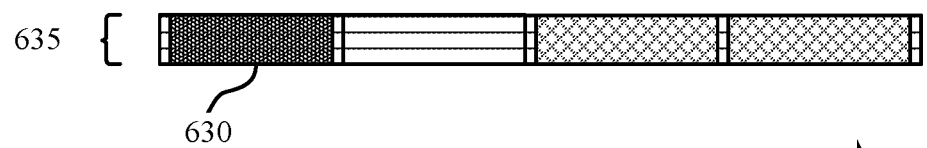

 Cyclic Prefix 615
 OFDM symbols 605
 Extra OFDM symbols 610

TECHNIQUES FOR SYMBOL TRANSMISSION WITH MODIFIED PADDING DURATION

FIELD OF TECHNOLOGY

The following relates to wireless communications, including techniques for symbol transmission with modified padding duration.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform (DFT) spread orthogonal frequency division multiplexing (OFDM) (DFT-S-OFDM). A wireless multiple-access communications system may include one or more base stations or one or more network access nodes, each simultaneously supporting communication for multiple communication devices, which may be otherwise known as user equipment (UE).

Some wireless communications devices may communicate across a set of transmission time intervals (TTIs) according to a subcarrier spacing (SCS) numerology. A configuration of symbols and corresponding cyclic prefixes in each TTI of the set of TTIs may be based on an SCS. Each TTI may include an integer number of symbols, and with shrinking symbol sizes, an extra duration may be left in each TTI after the symbols and cyclic prefixes are allocated according to an SCS.

SUMMARY

The described techniques relate to improved methods, systems, devices, and apparatuses that support techniques for symbol transmission with modified padding duration. Generally, the described techniques provide for methods, systems, devices, and apparatuses that support techniques for a base station to configure a padding duration within a transmission time interval (TTI) (e.g., subframes, half-subframes, slots, or other TTIs). The base station and a user equipment (UE) may communicate across a set of TTIs according to a subcarrier spacing (SCS) numerology. The base station may transmit an indication of the SCS to the UE. Each TTI of the set of TTIs may include a quantity of symbols, a corresponding quantity of cyclic prefixes, and a padding duration based on the SCS. The padding duration may, in some examples, be longer than a symbol duration of each of the symbols in a TTI. The base station may transmit a control signal to the UE to indicate a configuration for the padding duration. In some examples, the UE, the base station, or both may utilize the padding duration for communication according to the configuration. The UE, the base station or both may transmit or receive one or more additional symbols and corresponding cyclic prefixes per the SCS numerology during the padding duration. In some examples, the UE, the base station, or both may utilize the padding duration for transmitting one or more additional symbols and shortened cyclic prefix during the allocated padding duration.

A method for wireless communication at a user equipment (UE) is described. The method may include receiving an indication of a subcarrier spacing for communications in a set of multiple transmission time intervals, where a transmission time interval of the set of multiple transmission time intervals includes a set of multiple symbols, a corresponding set of multiple cyclic prefixes, and a padding duration, where a symbol duration of the set of multiple symbols is based on the subcarrier spacing and where the padding duration is longer than the symbol duration, receiving a control signal indicating a configuration for the padding duration, where the configuration indicates that at least a first portion of the padding duration is to be reallocated as one or more additional symbols with corresponding one or more additional cyclic prefixes, and communicating during the padding duration using the one or more additional symbols and the corresponding one or more additional cyclic prefixes.

An apparatus for wireless communication at a UE is described. The apparatus may include a processor, memory coupled with the processor, and instructions stored in the memory. The instructions may be executable by the processor to cause the apparatus to receive an indication of a subcarrier spacing for communications in a set of multiple transmission time intervals, where a transmission time interval of the set of multiple transmission time intervals includes a set of multiple symbols, a corresponding set of multiple cyclic prefixes, and a padding duration, where a symbol duration of the set of multiple symbols is based on the subcarrier spacing and where the padding duration is longer than the symbol duration, receive a control signal indicating a configuration for the padding duration, where the configuration indicates that at least a first portion of the padding duration is to be reallocated as one or more additional symbols with corresponding one or more additional cyclic prefixes, and communicate during the padding duration using the one or more additional symbols and the corresponding one or more additional cyclic prefixes.

Another apparatus for wireless communication at a UE is described. The apparatus may include means for receiving an indication of a subcarrier spacing for communications in a set of multiple transmission time intervals, where a transmission time interval of the set of multiple transmission time intervals includes a set of multiple symbols, a corresponding set of multiple cyclic prefixes, and a padding duration, where a symbol duration of the set of multiple symbols is based on the subcarrier spacing and where the padding duration is longer than the symbol duration, means for receiving a control signal indicating a configuration for the padding duration, where the configuration indicates that at least a first portion of the padding duration is to be reallocated as one or more additional symbols with corresponding one or more additional cyclic prefixes, and means for communicating during the padding duration using the one or more additional symbols and the corresponding one or more additional cyclic prefixes.

A non-transitory computer-readable medium storing code for wireless communication at a UE is described. The code may include instructions executable by a processor to receive an indication of a subcarrier spacing for communications in a set of multiple transmission time intervals, where a transmission time interval of the set of multiple transmission time intervals includes a set of multiple symbols, a corresponding set of multiple cyclic prefixes, and a padding duration, where a symbol duration of the set of multiple symbols is based on the subcarrier spacing and where the padding duration is longer than the symbol duration, receive a control signal indicating a configuration for the padding duration, where the configuration indicates that at least a first portion of the padding duration is to be reallocated as one or more additional symbols with corresponding one or more additional cyclic prefixes, and communicate during the padding duration using the one or more additional symbols and the corresponding one or more additional cyclic prefixes.

Some examples of the method, apparatuses, and non-transitory computer-readable medium described herein may further include operations, features, means, or instructions for applying the configuration for the padding duration by allocating an additional symbol to the padding duration, where the padding duration may be equal to the symbol duration of the set of multiple symbols.

Some examples of the method, apparatuses, and non-transitory computer-readable medium described herein may further include operations, features, means, or instructions for applying the configuration for the padding duration by allocating an additional symbol and a corresponding cyclic prefix to at least a second portion of the padding duration, where the additional symbol duration may be less than the symbol duration of the set of multiple symbols.

Some examples of the method, apparatuses, and non-transitory computer-readable medium described herein may further include operations, features, means, or instructions for applying the configuration for the padding duration by allocating an additional symbol and a corresponding additional cyclic prefix to the padding duration, where a remaining padding duration after applying the configuration includes an extended cyclic prefix and may be less than or equal to the symbol duration of the set of multiple symbols.

Some examples of the method, apparatuses, and non-transitory computer-readable medium described herein may further include operations, features, means, or instructions for applying the configuration for the padding duration by allocating an additional symbol and an extended cyclic prefix to the padding duration, where a remaining padding duration includes the extended cyclic prefix.

In some examples of the method, apparatuses, and non-transitory computer-readable medium described herein, a duration of the extended cyclic prefix may be greater than a duration of a cyclic prefix of the set of multiple cyclic prefixes.

In some examples of the method, apparatuses, and non-transitory computer-readable medium described herein, the symbol duration may be inversely proportional to the subcarrier spacing.

In some examples of the method, apparatuses, and non-transitory computer-readable medium described herein, the transmission time interval of the set of multiple transmission time intervals includes a half subframe.

A method for wireless communication at a UE is described. The method may include receiving an indication of a subcarrier spacing for communications in a set of multiple transmission time intervals, where a transmission time interval of the set of multiple transmission time intervals includes a set of multiple symbols, a corresponding set of multiple cyclic prefixes, and a padding duration, where a symbol duration of the set of multiple symbols is based on the subcarrier spacing and where the padding duration is at least as long as the symbol duration, receiving a control signal indicating a configuration for the padding duration, where the configuration indicates that the padding duration is to be reallocated as one or more additional symbols with corresponding one or more additional cyclic prefixes, where the one or more additional cyclic prefixes and at least a first portion of the set of multiple cyclic prefixes are reduced in duration in comparison with a remaining portion of the set of multiple cyclic prefixes, and communicating during the transmission time interval using the one or more additional symbols and the set of multiple symbols with the corresponding one or more additional cyclic prefixes, the first portion of the set of multiple cyclic prefixes, and the remaining portion of the set of multiple cyclic prefixes.

An apparatus for wireless communication at a UE is described. The apparatus may include a processor, memory coupled with the processor, and instructions stored in the memory. The instructions may be executable by the processor to cause the apparatus to receive an indication of a subcarrier spacing for communications in a set of multiple transmission time intervals, where a transmission time interval of the set of multiple transmission time intervals includes a set of multiple symbols, a corresponding set of multiple cyclic prefixes, and a padding duration, where a symbol duration of the set of multiple symbols is based on the subcarrier spacing and where the padding duration is at least as long as the symbol duration, receive a control signal indicating a configuration for the padding duration, where the configuration indicates that the padding duration is to be reallocated as one or more additional symbols with corresponding one or more additional cyclic prefixes, where the one or more additional cyclic prefixes and at least a first portion of the set of multiple cyclic prefixes are reduced in duration in comparison with a remaining portion of the set of multiple cyclic prefixes, and communicate during the transmission time interval using the one or more additional symbols and the set of multiple symbols with the corresponding one or more additional cyclic prefixes, the first portion of the set of multiple cyclic prefixes, and the remaining portion of the set of multiple cyclic prefixes.

Another apparatus for wireless communication at a UE is described. The apparatus may include means for receiving an indication of a subcarrier spacing for communications in a set of multiple transmission time intervals, where a transmission time interval of the set of multiple transmission time intervals includes a set of multiple symbols, a corresponding set of multiple cyclic prefixes, and a padding duration, where a symbol duration of the set of multiple symbols is based on the subcarrier spacing and where the padding duration is at least as long as the symbol duration, means for receiving a control signal indicating a configuration for the padding duration, where the configuration indicates that the padding duration is to be reallocated as one or more additional symbols with corresponding one or more additional cyclic prefixes, where the one or more additional cyclic prefixes and at least a first portion of the set of multiple cyclic prefixes are reduced in duration in comparison with a remaining portion of the set of multiple cyclic prefixes, and means for communicating during the transmission time interval using the one or more additional symbols and the set of multiple symbols with the corresponding one or more additional cyclic prefixes, the first portion of the set of multiple cyclic prefixes, and the remaining portion of the set of multiple cyclic prefixes.

A non-transitory computer-readable medium storing code for wireless communication at a UE is described. The code may include instructions executable by a processor to receive an indication of a subcarrier spacing for communications in a set of multiple transmission time intervals, where a transmission time interval of the set of multiple transmission time intervals includes a set of multiple symbols, a corresponding set of multiple cyclic prefixes, and a padding duration, where a symbol duration of the set of multiple symbols is based on the subcarrier spacing and where the padding duration is at least as long as the symbol duration, receive a control signal indicating a configuration for the padding duration, where the configuration indicates that the padding duration is to be reallocated as one or more additional symbols with corresponding one or more additional cyclic prefixes, where the one or more additional cyclic prefixes and at least a first portion of the set of multiple cyclic prefixes are reduced in duration in comparison with a remaining portion of the set of multiple cyclic prefixes, and communicate during the transmission time interval using the one or more additional symbols and the set of multiple symbols with the corresponding one or more additional cyclic prefixes, the first portion of the set of multiple cyclic prefixes, and the remaining portion of the set of multiple cyclic prefixes.

In some examples of the method, apparatuses, and non-transitory computer-readable medium described herein, receiving the control signal may include operations, features, means, or instructions for receiving the control signal selecting a first configuration mode or a second configuration mode based on a delay spread condition at the UE, where the first configuration mode may be associated with a reduced delay spread environment in comparison with an environment associated with the second configuration mode.

Some examples of the method, apparatuses, and non-transitory computer-readable medium described herein may further include operations, features, means, or instructions for transmitting, by the UE, a request for the first configuration mode or the second configuration mode based on the delay spread condition at the UE, where the control signaling selecting the first configuration mode or the second configuration mode may be based on the transmitted request.

Some examples of the method, apparatuses, and non-transitory computer-readable medium described herein may further include operations, features, means, or instructions for transmitting a report indicating a delay spread measurement at the UE, where the control signaling selecting the first configuration mode or the second configuration mode may be based on the transmitted indication.

In some examples of the method, apparatuses, and non-transitory computer-readable medium described herein, transmitting the report may include operations, features, means, or instructions for periodically transmitting the report indicating the delay spread measurement at the UE.

In some examples of the method, apparatuses, and non-transitory computer-readable medium described herein, receiving the control signal may include operations, features, means, or instructions for receiving an indication to switch from communicating according to the first configuration mode to the second configuration mode or from communicating according to the second configuration mode to the first configuration mode.

In some examples of the method, apparatuses, and non-transitory computer-readable medium described herein, the selected configuration mode may be applied to a set of multiple UEs included in a cell.

In some examples of the method, apparatuses, and non-transitory computer-readable medium described herein, the one or more additional cyclic prefixes in at least one transmission time interval of the set of multiple transmission time intervals may be reduced in duration in comparison with one or more cyclic prefixes associated with a remaining number of transmission time intervals of the set of multiple transmission time intervals.

In some examples of the method, apparatuses, and non-transitory computer-readable medium described herein, the control signal includes at least one of a radio resource control signal, a medium access control (MAC) control element, a downlink control information, or a combination thereof.

In some examples of the method, apparatuses, and non-transitory computer-readable medium described herein, the symbol duration may be inversely proportional to the subcarrier spacing.

In some examples of the method, apparatuses, and non-transitory computer-readable medium described herein, the transmission time interval of the set of multiple transmission time intervals includes a half subframe.

A method for wireless communication at a base station is described. The method may include transmitting, to a UE, an indication of a subcarrier spacing for communications in a set of multiple transmission time intervals, where a transmission time interval of the set of multiple transmission time intervals includes a set of multiple symbols, a corresponding set of multiple cyclic prefixes, and a padding duration, where a symbol duration of the set of multiple symbols is based on the subcarrier spacing and where the padding duration is longer than the symbol duration, transmitting, to the UE, a control signal indicating a configuration for the padding duration, where the configuration indicates that at least a first portion of the padding duration is to be reallocated as one or more additional symbols with corresponding one or more additional cyclic prefixes, and communicating during the padding duration using the one or more additional symbols and the corresponding one or more additional cyclic prefixes.

An apparatus for wireless communication at a base station is described. The apparatus may include a processor, memory coupled with the processor, and instructions stored in the memory. The instructions may be executable by the processor to cause the apparatus to transmit, to a UE, an indication of a subcarrier spacing for communications in a set of multiple transmission time intervals, where a transmission time interval of the set of multiple transmission time intervals includes a set of multiple symbols, a corresponding set of multiple cyclic prefixes, and a padding duration, where a symbol duration of the set of multiple symbols is based on the subcarrier spacing and where the padding duration is longer than the symbol duration, transmit, to the UE, a control signal indicating a configuration for the padding duration, where the configuration indicates that at least a first portion of the padding duration is to be reallocated as one or more additional symbols with corresponding one or more additional cyclic prefixes, and communicate during the padding duration using the one or more additional symbols and the corresponding one or more additional cyclic prefixes.

Another apparatus for wireless communication at a base station is described. The apparatus may include means for transmitting, to a UE, an indication of a subcarrier spacing for communications in a set of multiple transmission time intervals, where a transmission time interval of the set of multiple transmission time intervals includes a set of multiple symbols, a corresponding set of multiple cyclic prefixes, and a padding duration, where a symbol duration of the set of multiple symbols is based on the subcarrier spacing and where the padding duration is longer than the symbol duration, means for transmitting, to the UE, a control signal indicating a configuration for the padding duration, where the configuration indicates that at least a first portion of the padding duration is to be reallocated as one or more additional symbols with corresponding one or more additional cyclic prefixes, and means for communicating during the padding duration using the one or more additional symbols and the corresponding one or more additional cyclic prefixes.

A non-transitory computer-readable medium storing code for wireless communication at a base station is described. The code may include instructions executable by a processor to transmit, to a UE, an indication of a subcarrier spacing for communications in a set of multiple transmission time intervals, where a transmission time interval of the set of multiple transmission time intervals includes a set of multiple symbols, a corresponding set of multiple cyclic prefixes, and a padding duration, where a symbol duration of the set of multiple symbols is based on the subcarrier spacing and where the padding duration is longer than the symbol duration, transmit, to the UE, a control signal indicating a configuration for the padding duration, where the configuration indicates that at least a first portion of the padding duration is to be reallocated as one or more additional symbols with corresponding one or more additional cyclic prefixes, and communicate during the padding duration using the one or more additional symbols and the corresponding one or more additional cyclic prefixes.

Some examples of the method, apparatuses, and non-transitory computer-readable medium described herein may further include operations, features, means, or instructions for configuring the UE to apply the configuration for the padding duration by allocating an additional symbol to the padding duration, where the padding duration may be equal to the symbol duration of the set of multiple symbols.

Some examples of the method, apparatuses, and non-transitory computer-readable medium described herein may further include operations, features, means, or instructions for configuring the UE to apply the configuration for the padding duration by allocating an additional symbol and a corresponding cyclic prefix to at least a second portion of the padding duration, where the additional symbol duration may be less than the symbol duration of the set of multiple symbols.

Some examples of the method, apparatuses, and non-transitory computer-readable medium described herein may further include operations, features, means, or instructions for configuring the UE to apply the configuration for the padding duration by allocating an additional symbol and a corresponding additional cyclic prefix to the padding duration, where a remaining padding duration after applying the configuration includes an extended cyclic prefix and may be less than or equal to the symbol duration of the set of multiple symbols.

Some examples of the method, apparatuses, and non-transitory computer-readable medium described herein may further include operations, features, means, or instructions for configuring the UE to apply the configuration for the padding duration by allocating an additional symbol and an extended cyclic prefix to the padding duration, where a remaining padding duration includes the extended cyclic prefix.

In some examples of the method, apparatuses, and non-transitory computer-readable medium described herein, a duration of the extended cyclic prefix may be greater than a duration of a cyclic prefix of the set of multiple cyclic prefixes.

A method for wireless communication at a base station is described. The method may include transmitting, to a UE, an indication of a subcarrier spacing for communications in a set of multiple transmission time intervals, where a transmission time interval of the set of multiple transmission time intervals includes a set of multiple symbols, a corresponding set of multiple cyclic prefixes, and a padding duration, where a symbol duration of the set of multiple symbols is based on the subcarrier spacing and where the padding duration is at least as long as the symbol duration, transmitting, to the UE, a control signal indicating a configuration for the padding duration, where the configuration indicates that the padding duration is to be reallocated as one or more additional symbols with corresponding one or more additional cyclic prefixes, where the one or more additional cyclic prefixes and at least a first portion of the set of multiple cyclic prefixes are reduced in duration in comparison with a remaining portion of the set of multiple cyclic prefixes, and communicating during the transmission time interval using the one or more additional symbols and the set of multiple symbols with the corresponding one or more additional cyclic prefixes, the first portion of the set of multiple cyclic prefixes, and the remaining portion of the set of multiple cyclic prefixes.

An apparatus for wireless communication at a base station is described. The apparatus may include a processor, memory coupled with the processor, and instructions stored in the memory. The instructions may be executable by the processor to cause the apparatus to transmit, to a UE, an indication of a subcarrier spacing for communications in a set of multiple transmission time intervals, where a transmission time interval of the set of multiple transmission time intervals includes a set of multiple symbols, a corresponding set of multiple cyclic prefixes, and a padding duration, where a symbol duration of the set of multiple symbols is based on the subcarrier spacing and where the padding duration is at least as long as the symbol duration, transmit, to the UE, a control signal indicating a configuration for the padding duration, where the configuration indicates that the padding duration is to be reallocated as one or more additional symbols with corresponding one or more additional cyclic prefixes, where the one or more additional cyclic prefixes and at least a first portion of the set of multiple cyclic prefixes are reduced in duration in comparison with a remaining portion of the set of multiple cyclic prefixes, and communicate during the transmission time interval using the one or more additional symbols and the set of multiple symbols with the corresponding one or more additional cyclic prefixes, the first portion of the set of multiple cyclic prefixes, and the remaining portion of the set of multiple cyclic prefixes.

Another apparatus for wireless communication at a base station is described. The apparatus may include means for transmitting, to a UE, an indication of a subcarrier spacing for communications in a set of multiple transmission time intervals, where a transmission time interval of the set of multiple transmission time intervals includes a set of multiple symbols, a corresponding set of multiple cyclic prefixes, and a padding duration, where a symbol duration of the set of multiple symbols is based on the subcarrier spacing and where the padding duration is at least as long as the symbol duration, means for transmitting, to the UE, a control signal indicating a configuration for the padding duration, where the configuration indicates that the padding duration is to be reallocated as one or more additional symbols with corresponding one or more additional cyclic prefixes, where the one or more additional cyclic prefixes and at least a first portion of the set of multiple cyclic prefixes are reduced in duration in comparison with a remaining portion of the set of multiple cyclic prefixes, and means for communicating during the transmission time interval using the one or more additional symbols and the set of multiple symbols with the corresponding one or more additional cyclic prefixes, the first portion of the set of multiple cyclic prefixes, and the remaining portion of the set of multiple cyclic prefixes.

A non-transitory computer-readable medium storing code for wireless communication at a base station is described. The code may include instructions executable by a processor to transmit, to a UE, an indication of a subcarrier spacing for communications in a set of multiple transmission time intervals, where a transmission time interval of the set of multiple transmission time intervals includes a set of multiple symbols, a corresponding set of multiple cyclic prefixes, and a padding duration, where a symbol duration of the set of multiple symbols is based on the subcarrier spacing and where the padding duration is at least as long as the symbol duration, transmit, to the UE, a control signal indicating a configuration for the padding duration, where the configuration indicates that the padding duration is to be reallocated as one or more additional symbols with corresponding one or more additional cyclic prefixes, where the one or more additional cyclic prefixes and at least a first portion of the set of multiple cyclic prefixes are reduced in duration in comparison with a remaining portion of the set of multiple cyclic prefixes, and communicate during the transmission time interval using the one or more additional symbols and the set of multiple symbols with the corresponding one or more additional cyclic prefixes, the first portion of the set of multiple cyclic prefixes, and the remaining portion of the set of multiple cyclic prefixes.

In some examples of the method, apparatuses, and non-transitory computer-readable medium described herein, transmitting the control signal may include operations, features, means, or instructions for transmitting the control signal selecting a first configuration mode or a second configuration mode based on a delay spread condition at the UE, where, the first configuration mode may be associated with a reduced delay spread environment in comparison with an environment associated with the second configuration mode.

Some examples of the method, apparatuses, and non-transitory computer-readable medium described herein may further include operations, features, means, or instructions for receiving, from the UE, a request for the first configuration mode or the second configuration mode based on the delay spread condition at the UE, where the control signaling selecting the first configuration mode or the second configuration mode may be based on the transmitted request.

Some examples of the method, apparatuses, and non-transitory computer-readable medium described herein may further include operations, features, means, or instructions for receiving a report indicating a delay spread measurement at the UE, where the control signaling selecting the first configuration mode or the second configuration mode may be based on the transmitted indication.

In some examples of the method, apparatuses, and non-transitory computer-readable medium described herein, transmitting the control signal may include operations, features, means, or instructions for transmitting an indication to switch from communicating according to the first configuration mode to the second configuration mode or from communicating according to the second configuration mode to the first configuration mode.

In some examples of the method, apparatuses, and non-transitory computer-readable medium described herein, the selected configuration mode may be applied to a set of multiple UEs included in a cell.

DETAILED DESCRIPTION

In some wireless communications systems, a user equipment (UE) and a base station may communicate according to a subcarrier spacing (SCS) numerology. A configuration (length and number of symbols within a subframe) for a set of transmission time intervals (TTIs) (e.g., subframes, half-subframes, slots, or other TTIs) may be based on an SCS used for communication. For example, the UE and the base station may communicate via a set of TTIs that each include a quantity of symbols and a corresponding quantity of cyclic prefixes. The quantity of the symbols and cyclic prefixes in a TTI may be inversely proportional to the SCS numerology. That is, as the SCS increases, a duration of the symbols and cyclic prefixes may decrease and more symbols may fit in a TTI. While an integer number of symbols may fit within a TTI, the combination of symbols and cyclic prefixes may result in a portion of the TTI being otherwise unused.

To improve utilization of the padding duration for more efficient communications, a padding duration as described herein may be configured for transmission of additional symbols and corresponding cyclic prefix. For some SCS values, the padding duration may be the same as or greater than a symbol duration, such that the UE, the base station, or both may utilize the padding duration for transmitting an additional symbol and a corresponding cyclic prefix. For example, at higher SCS values (e.g., 1920 kHz, 3840 kHz, or other values), a transmitting wireless device, which may be the UE or the base station, may be able to use the padding duration by including one or more additional orthogonal frequency division multiplexing (OFDM) symbols and cyclic prefixes during at least part of the allocated padding duration. In some other cases, the transmitting wireless device may include one or more additional OFDM symbols and shortened cyclic prefix during the allocated padding duration (e.g., such that there is no padding duration left). A UE and a base station may thereby utilize a padding duration for one or more operations depicted herein to improve utilization of communication resources and reduce latency.

Aspects of the disclosure are initially described in the context of wireless communications systems. Additional aspects are described in the with reference to communication timelines, signal configurations, and process flows. Aspects of the disclosure are further illustrated by and described with reference to apparatus diagrams, system diagrams, and flowcharts that relate to techniques for symbol transmission with modified padding duration.

Figure 1:
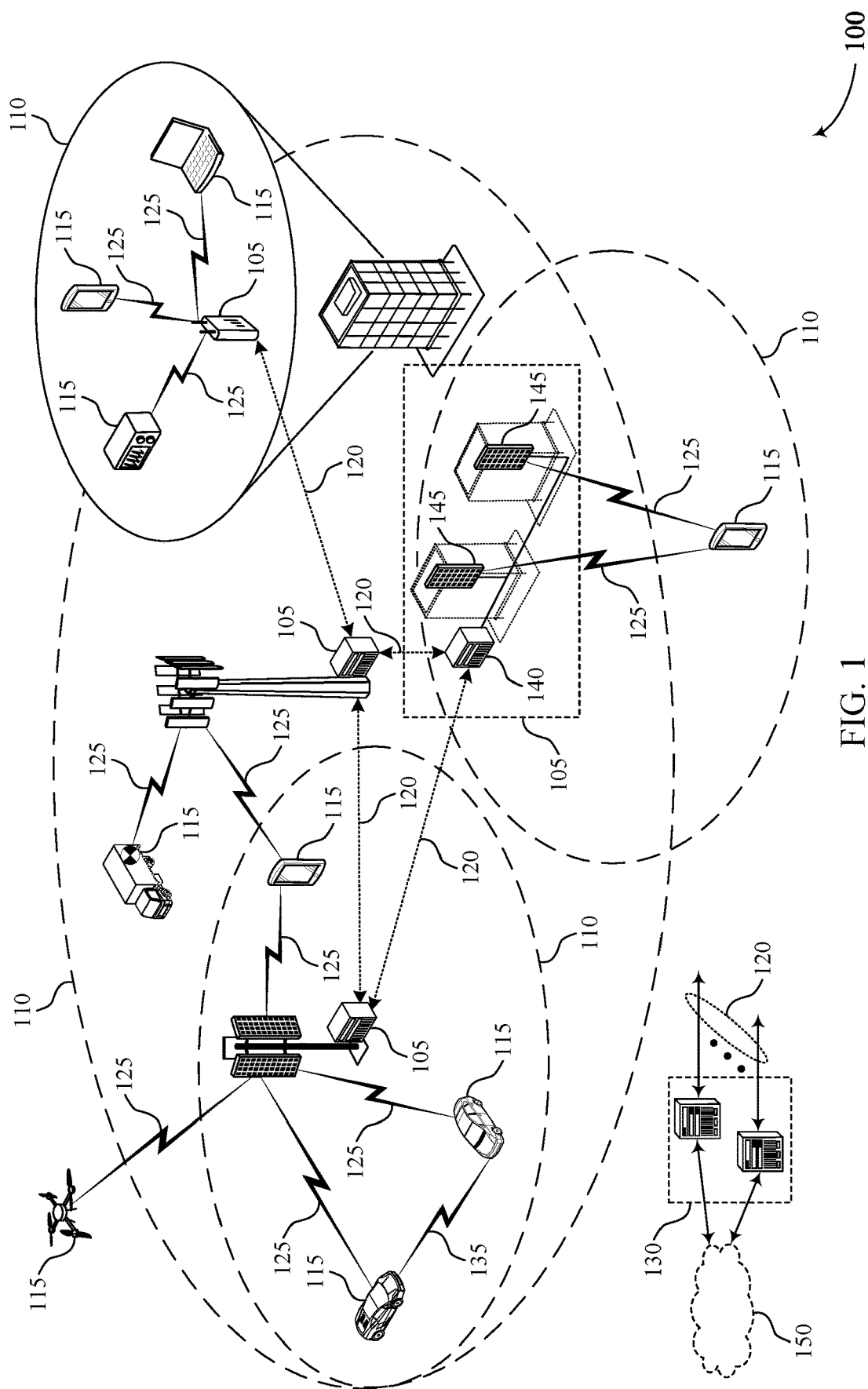
FIG. 1 illustrates an example of a wireless communications system that supports techniques for symbol transmission with modified padding duration in accordance with aspects of the present disclosure.

FIG. 1 illustrates an example of a wireless communications system 100 that supports techniques for symbol transmission with modified padding duration in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may consist of one symbol period (e.g., a duration of one modulation symbol) and one subcarrier, where the symbol period and SCS are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include an SCS ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported SCS, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on SCS. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the SCS or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User internet protocol (IP) packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 MHz to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Wireless communications system 100 may support techniques for symbol transmission with modified padding duration. For example, a UE 115 may receive, from a base station 105, an indication of an SCS spacing for communications in one or more TTIs. Each TTI may include one or more symbols, corresponding cyclic prefixes, and a padding duration. The UE 115 may receive a control signal indicating a configuration for the padding duration, where in some examples, the configuration may indicate that the padding duration or a first portion of the padding duration is to be reallocated as one or more additional symbols with corresponding one or more additional cyclic prefixes. In some examples, the one or more additional cyclic prefixes and a portion of the cyclic prefixes may be reduced in duration in comparison with a remaining portion of the cyclic prefixes. The UE 115 and base station 105 may then communicate during the padding duration using the one or more additional symbols and the corresponding one or more additional cyclic prefixes.

Figure 2:
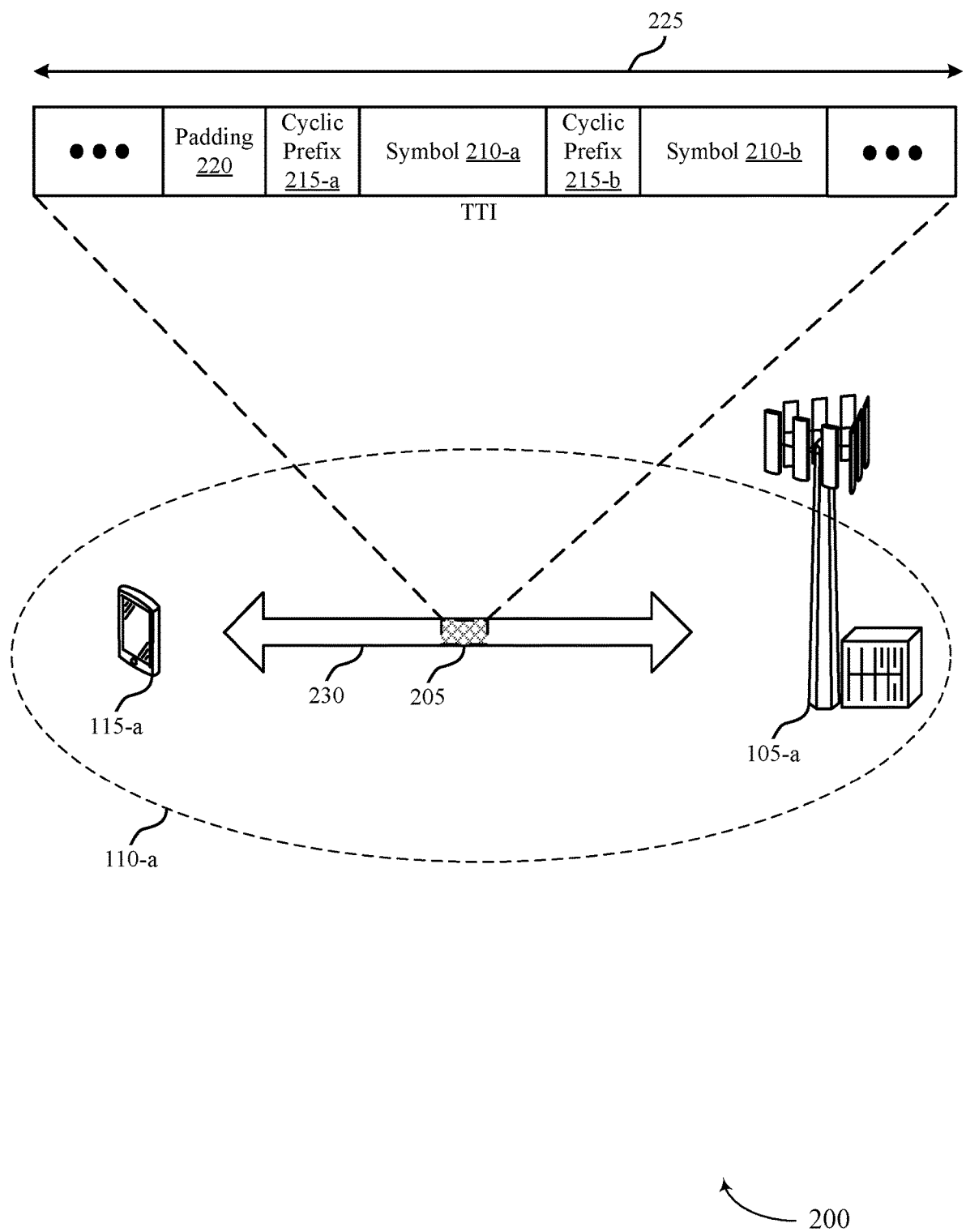
FIG. 2 illustrates an example of a wireless communications system 200 that supports techniques for symbol transmission with modified padding duration in accordance with aspects of the present disclosure.

FIG. 2 illustrates an example of a wireless communications system 200 that supports techniques for symbol transmission with modified padding duration in accordance with one or more aspects of the present disclosure. In some examples, wireless communications system 200 may include aspects of wireless communications system 100. For example, wireless communications system 200 may include a UE 115-a and a base station 105-a, which may be examples of a UE 115, a base station 105, or any other device as described with reference to FIG. 1. The UE 115-a and the base station 105-a may communicate via a communication link 230 in a geographic coverage area 110-a. In the example of the wireless communications system 200, the UE 115-a and the base station 105-a may communicate via one or more TTIs 225 according to a configured SCS.

The base station 105-a may transmit an indication of the SCS to the UE 115-a via the communication link 230. The SCS may correspond to a configuration for the TTI 225 (e.g., a half-subframe, a subframe, or some other TTI 225) and one or more other TTIs 225 used for communications between the UE 115-a and the base station 105-a. In addition, higher frequency SCSs result in more symbols of shorter durations within a subframe. Typically, the communications are organized so that each symbol is preceded by a cyclic prefix. For example, the TTI 225 may include a set of symbols 210 (e.g., the symbols 210-a, 210-b, and one or more other symbols 210), a set of cyclic prefixes 215 (e.g., the cyclic prefixes 215-a, 215-b, and one or more other cyclic prefixes 215) corresponding to the set of symbols 210, and a padding duration 220 in accordance with the SCS. The padding duration 220 may be the same as or greater than a duration of each symbol 210.

In some wireless communications systems, the UE 115-a may transmit a signal 205 to the base station 105-a. The signal 205 may include time and frequency resources, and the time resources may be divided into subframes. In particular, the UE 115-a and the base station 105-a may communicate via symbols within a subframe (e.g., 1 millisecond (ms) in duration) and the length and number of symbols within a subframe may be based in part on the SCS used in the communications. and each subframe may be 1 millisecond (ms) in duration. Higher frequency SCSs may result in more symbols of shorter durations within a subframe. As depicted in the example of FIG. 2, each TTI 225 may include an integer number of symbols 210. For example, half-subframes (e.g., 0.5 ms) may include an integer number (e.g., one or more) of OFDM symbols 210 each having a first duration, and each OFDM symbol 210 may correspond to a cyclic prefix 215, each cyclic prefix 215 having a second duration.

UE 115-a or base station 105-a may transmit the signal 205 according to a numerology, which may include a corresponding SCS. SCS may define a spacing in the frequency domain between subcarriers. For example, signal 320 with an SCS of 15 kilohertz (KHz) may include one or more subcarriers with a 15 kHz spacing between each subcarrier. In some examples, in 15 kHz numerology schemes, a padding duration may be allocated at the beginning of each half-subframe and may be used as an extended cyclic prefix for the first symbol of the half-subframe. As the SCS numerology increases, this padding duration may increase in comparison to the shrinking symbol size. In some cases, a symbol boundary at 0.5 ms (e.g., at the end of each half-subframe) may exist for one or more SCS values (e.g., any SCS from 15 kHz to 120 kHz). That is, the last symbol for a half-subframe may not extend beyond the boundary at 0.5 ms of the half-subframe. Thus, for some SCS numerologies (e.g., the numerology corresponding to the 15 kHz SCS), while an integer number of symbols 210 and corresponding cyclic prefix 215 for each symbol may fit into a half-subframe, there may exist a duration that is left over or not used. That is, a cumulative duration of symbols 210 and cyclic prefixes 215 may not equal (e.g., may fall short of) the 0.5 ms duration of the half-subframe. The duration left over may be relatively short, and may correspond to approximately 0.5 microseconds (μs) (e.g., 1024Tc, where, in some cases, $$Tc = \frac{1}{480\,\text{KHz} * 4096} = 0.509\,\text{ns}\bigg)$$

for each 0.5 ms (e.g., each half-subframe), resulting in a 0.1% wasted overhead. In some other cases, the duration left over may correspond to some other duration of time for each half-subframe or 0.5 ms. The extra duration in the half-subframe may be referred to as padding 220, and UE 115-*a*, base station 105-*a*, or some other device, may configure padding 220 to exist at the beginning (e.g., absorbed into the first symbol with cyclic prefix 215-*a* and symbol 210-*a*) of the half-subframe. In some cases, UE 115-*a* or device 105-*a* may use padding 220 to transmit a cyclic prefix. In some cases, UE 115-*a* or base station 105-*a* may change the symbol boundary or window every half-subframe, or every 0.5 ms as a result of padding 220. Details of the configuration of each symbol 210, cyclic prefix 215, and the padding duration 220 are described in further detail elsewhere herein, including with reference to FIGS. 3 and 4.

At high frequencies (e.g., greater than 71 GHz), the UE 115-*a* or the base station 105-*a* may transmit signaling according to higher SCS values (e.g., at or above 960 kHz). At the higher SCS values, the padding 220 duration may be greater than or equal to a symbol duration (e.g., an OFDM symbol 210, or both a cyclic prefix 215 and the OFDM symbol 210). In such cases, more efficient usage of the padding 220 duration may be desirable. To reduce the overhead and improve utilization of the communication resources, the base station 105-*a* as described herein may transmit a control signal indicating a configuration for the padding duration 220 to the UE 115-*a*. The configuration may allocate the padding duration 220 for additional symbols and cyclic prefixes. In some examples, such techniques may be able to maintain one or more OFDM symbol 210 durations without changes, and may be able to maintain one or more corresponding cyclic prefix 215 durations in a half-subframe without changes, or with relatively few changes. In some examples, such techniques may be used to maintain symbol boundary alignment in the half-subframe (e.g., at lower SCS values, or other SCS values) between different SCS configurations (e.g., values), which may enable the base station 105-*a*, the UE 115-*a*, or both, to switch SCS configurations (e.g., values) for various communications. The techniques depicted herein may reduce latency and improve utilization of the resources in each TTI 225.

In some examples, if the padding 220 duration equals or exceeds the combined duration of an OFDM symbol 210 and a cyclic prefix 215, the UE 115-*a* or the base station 105-*a* may add one or more additional OFDM symbols 210 and corresponding cyclic prefix 215 according to the configuration. In such examples, the remaining padding 220 duration may be zero or may be greater than zero. In cases where the remaining padding 220 duration is greater than zero, the remaining padding 220 duration may include extra cyclic prefix (e.g., for a next symbol). Additionally or alternatively, the remaining padding 220 duration may include an OFDM symbol 210 without corresponding cyclic prefix (e.g., depending one or more network characteristics or network configurations). Such allocation of the padding 220 duration may result in one or more benefits, such as an increased signal data rate (e.g., UE 115-*a* or base station 105-*a* may be able to transmit more information) at higher SCS values while maintaining symbol alignment (e.g., symbol boundary alignment) at lower SCS values (e.g., equal to or below 1920 kHz).

In some other examples, the UE 115-*a* or base station 105-*a* may be configured to allocate one or more OFDM symbols 210 and corresponding shortened cyclic prefix 215 in the padding duration 220. In some instances, cyclic prefix 215 associated with the added one or more OFDM symbols 210, and in some cases, additional cyclic prefix 215 associated with other OFDM symbols 210, may be shortened cyclic prefix, while one or more remaining cyclic prefix 215 (e.g., in a half-subframe) may be unchanged in duration. For example, if an additional OFDM symbol 210 and corresponding shortened cyclic prefix 215 replaced padding 220, UE 115-*a* or base station 105-*a* may also configure cyclic prefix 215-*a* to be a shortened cyclic prefix. The techniques may be used when a delay-spread at the UE 115-*a* or the base station 105-*a* is relatively small.

The UE 115-*a* and the base station 105-*a* described herein may thereby allocate a padding duration 220 of a TTI 225 according to a configuration. The whole padding duration 220 or at least a portion of the padding duration 220 may otherwise be unused. Accordingly, by transmitting the configuration for the padding duration 220, the base station 105-*a* may improve utilization of communication resources and improve communication reliability at higher SCS values.

Figure 3:
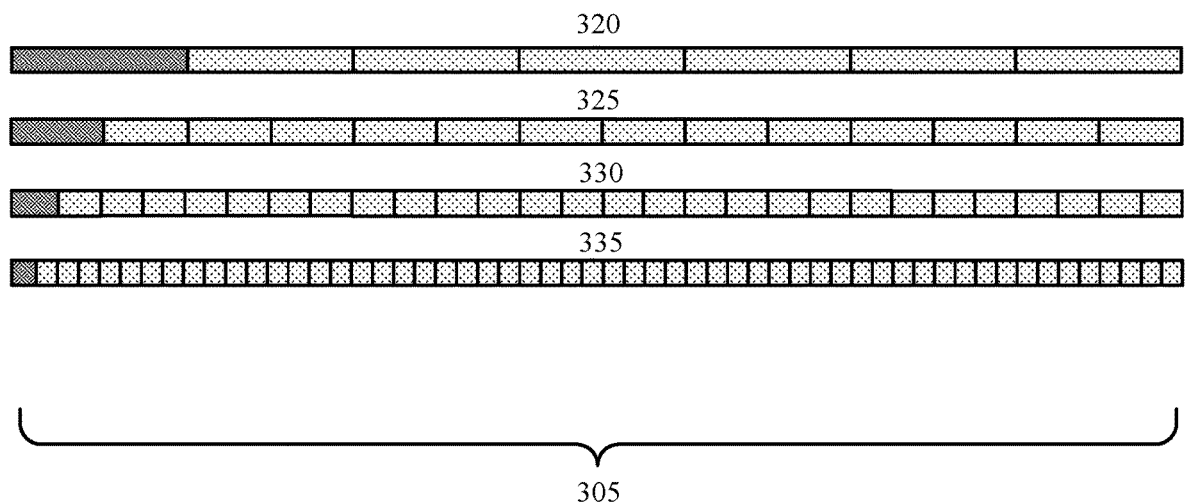
FIG. 3 illustrates an example of a symbol design that supports techniques for symbol transmission with modified padding duration in accordance with aspects of the present disclosure.

FIG. 3 illustrates an example of a symbol design 300 that support techniques for symbol transmission with modified padding duration in accordance with one or more aspects of the present disclosure. The half-subframes in the symbol design 300 may implement aspects of the wireless communications system 100, the wireless communications system 200, or both, or may be implemented by aspects of the wireless communications system 100, the wireless communications system 200, or both, as described with reference to FIG. 1 and FIG. 2.

As described with reference to FIGS. 1 and 2, a TTI 305 may include a quantity of symbols 310 in accordance with an SCS configured for communications between a UE 115 and a base station 105 via the TTI 305. In particular, FIG. 3 provides for a TTI 305 configuration according to multiple SCS numerologies. In the example of FIG. 3, the TTI 305 may include a half subframe. A duration and quantity of the symbols 310 and cyclic prefixes within each TTI 305 may be based on the configured SCS, and a remaining portion of the TTI 305 may be referred to as a padding duration.

In some wireless communications systems, a first device (e.g., a base station 105) may transmit a signal to a second device (e.g., a UE 115). The signal may include a configuration for time and frequency resources, where the configuration may indicate that the time resources may be divided into subframes, and each subframe may be 1 ms in duration. As depicted in FIG. 3, half-subframes (e.g., 0.5 ms) 305 may include one or more symbols 310 including corresponding OFDM symbols each having a first duration, and a corresponding cyclic prefix. Each cyclic prefix may have a second duration (e.g., shorter than the OFDM symbol duration). In some cases, a half-subframe may include an OFDM symbol and a corresponding extra cyclic prefix 315 (e.g., longer in duration than other cyclic prefix durations in the subframe). Such extra cyclic prefix may be included in or be otherwise referred to as an extra padding. In some cases, the OFDM symbol with the extra cyclic prefix may be included in the first symbol of the half-subframe (e.g., first symbol in time).

As depicted herein, an SCS may define a spacing in the frequency domain between subcarriers. For example, signal 320 with an SCS of 15 kHz may include one or more subcarriers with a 15 kHz spacing between each subcarrier. SCS may be associated with an OFDM symbol length with cyclic prefix such that a first signal having an SCS that is double a second SCS of a second signal may be associated with an OFDM symbol length and cyclic prefix length that is half that of the OFDM symbol length and cyclic prefix length of the second signal having the second SCS. However, the second signal may be associated with twice as many OFDM symbols and corresponding cyclic prefixes per half-subframe as that of the first signal. For example, a 15 kHz SCS signal may include 7 symbols per half-subframe, each symbol length being 66.67 µs, while signal 325 with 30 kHz may include 14 symbols per half-subframe, each symbol length being 33.3 µs. Other signals may include the same or other SCS configurations (e.g., signal 330 with 60 kHz, signal 335 with 120 kHz, or other signals with other SCS values). However, in some cases, an extra padding length may remain constant across different SCS for OFDM symbols with the extra padding length. For example, signal 320 having an SCS of 15 kHz may include an OFDM symbol with cyclic prefix with an extra padding duration of 5.2 µs, and signal 325 having an SCS of 30 kHz may include an OFDM symbol with cyclic prefix with an extra padding duration of 5.2 µs. Thus, a configuration (length and number of symbols within a subframe) for a set of TTIs (e.g., subframes, half-subframes, slots, or other TTIs) may be based on an SCS used for communication. As the SCS increases, a duration of the symbols and cyclic prefixes may decrease and more symbols may fit in a TTI. While an integer number of symbols may fit within a TTI, the combination of symbols and cyclic prefixes may result a portion of the TTI not being available for communication, or otherwise unused. Table 1 illustrates examples of SCS configurations, demonstrating the effects of increasing or decreasing SCS for some signals.

TABLE 1

Symbol, Cyclic Prefix, and Extra Padding Durations in NR up to 240 kHz SCS

| SCS (kHz) | Number of Symbols per 0.5 ms | Symbol Duration (µs) | Cyclic Prefix Duration (µs) | Extra Padding Duration (µs) |
|---|---|---|---|---|
| 15 | 7 | 66.67 | 4.69 | 5.2 |
| 30 | 14 | 33.33 | 2.34 | 5.2 |
| 60 | 28 | 16.67 | 1.17 | 5.2 |
| 120 | 56 | 8.33 | 0.59 | 5.2 |
| 240 | 112 | 4.17 | 0.29 | 5.2 |

Figure 4:
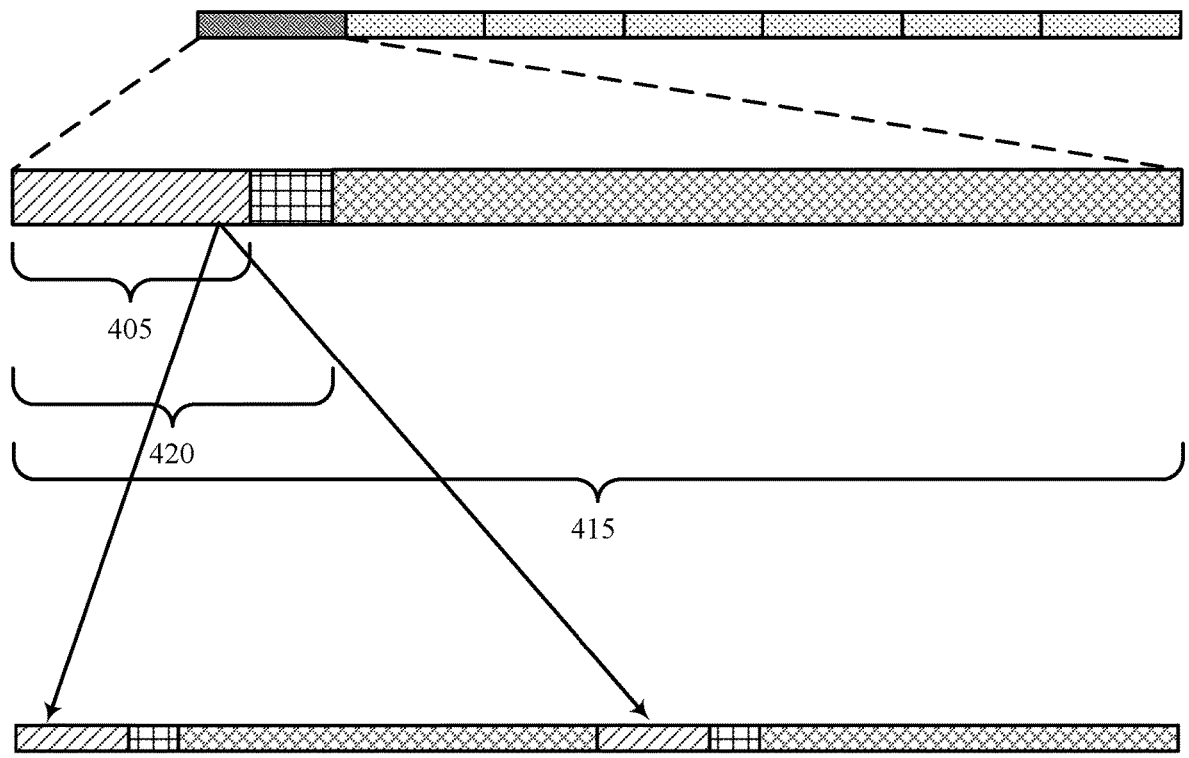
FIG. 4 illustrates an example of an extra padding duration that supports techniques for symbol transmission with modified padding duration in accordance with aspects of the present disclosure.

FIG. 4 illustrates an example of an extra padding duration 400 that support techniques for symbol transmission with modified padding duration in accordance with one or more aspects of the present disclosure. Extra padding duration 400 may implement aspects of the wireless communications system 100, the wireless communications system 200, or both, or may be implemented by aspects of the wireless communications system 100, the wireless communications system 200, or both, as described with reference to FIG. 1 and FIG. 2.

Extra padding 405 in addition to cyclic prefix 410 for a symbol with extra cyclic prefix 415 may be null resource (e.g., wasted resource) in cases where the extra padding 405 is used as extra cyclic prefix 420. Further, as illustrated in Tables 1 and 2, the extra padding 405 duration remains constant even as SCS increases.

TABLE 2

Symbol, Cyclic Prefix, and Extra Padding Durations in NR from 480 kHz to 3840 kHz

| SCS (kHz) | Fast Fourier Transform (FFT) Size ($N_{FFT}$) | Max Bandwidth (BW) (GHz) | Chip Duration (nanoseconds (ns)) | Symbol Duration (ns) | Cyclic Prefix and Extra Padding* Duration (ns) |
|---|---|---|---|---|---|
| 480 | 4096 | 1.97 | Tc | 4096Tc | 288Tc + 1024Tc* |
| 960 | 4096 | 3.93 | Tc/2 | 2048Tc | 144Tc + 1024Tc* |
| 1920 | 4096 | 7.86 | Tc/4 | 1024Tc | 72Tc + 1024Tc* |
| 3840 | 4096 | 15.73 | Tc/8 | 512Tc | 36Tc + 1024Tc* |
| 7680 | 4096 | 31.46 | Tc/16 | 256Tc | 18Tc + 1024Tc* |
| 15360 | 4096 | 62.92 | Tc/32 | 128Tc | 9Tc + 1024Tc* |

In particular, Table 2 illustrates that increasing SCS values for signals may correspond with decreasing symbol, chip, and cyclic prefix durations. In some cases, a chip time or duration may be a basic frame period for radio processing. In some cases, Table 4 may assume a fixed FFT size of 4096 (e.g., 4K), and that a symbol duration and a cyclic prefix duration may decrease along with corresponding increases in SCS values. However, increasing SCS values may correspond with a constant extra padding 405 duration (e.g., 1024Tc, where, in some cases $$T_C = \frac{1}{480 \text{ KHz} * 4096} = 0.509 \text{ ns}).$$

Thus, there may exist an SCS value for which the extra padding duration equals or approximately equals the symbol duration. For example, in Table 2, an SCS value of 1920 kHz includes a symbol duration of 1024Tc, and an extra padding duration of 1024Tc. However, for signals with relatively high SCS, and thus relatively low symbol durations, the extra padding 405 duration may exceed a symbol duration corresponding to the relatively high SCS. For example, for an SCS of 3840 kHz, the symbol duration and the cyclic prefix duration combined total 512Tc+36Tc=548Tc, while the extra padding duration equals 1024Tc. Higher SCS values may thus result in the extra padding 405 duration including a significant fraction of an OFDM symbol 425. Such a fraction may be illustrated in Table 3, showing that increased SCS may result in the extra padding 405 duration constituting an increasingly higher percentage of the symbol duration. Table 3 also illustrates that the cyclic prefix (e.g., cyclic prefix 410) duration remains relatively unchanged as SCS values increase.

TABLE 3

Cyclic Prefix and Extra Padding at various SCS

| Parameter | Value | Value | Value | Value | Value |
|---|---|---|---|---|---|
| SCS | 960 kHz | 1920 kHz | 3840 kHz | 7680 kHz | 15360 kHz |
| Chip/Sample Duration Tc | Tc/2 | Tc/4 | Tc/8 | Tc/16 | Tc/32 |
| $N_{FFT}$ | 4096 | 4096 | 4096 | 4096 | 4096 |
| OFDM Symbol Duration | 4096 chips | 4096 chips | 4096 chips | 4096 chips | 4096 chips |
| Cyclic Prefix Duration | 288 samples = 7% of symbol | 288 samples = 7% of symbol | 288 samples = 7% of symbol | 288 samples = 7% of symbol | 288 samples = 7% of symbol |
| Extra Cyclic Prefix Duration | 2048 + 288 samples = 57% of symbol | 4096 + 288 samples = 107% of symbol | 8192 + 288 samples = 207% of symbol | 16384 + 288 samples = 407% of symbol | 32768 + 288 samples = 807% of symbol |
| Number of Symbols in Half-Subframe | 488 | 996 | 1992 | 3984 | 7968 |

In some cases, such as for higher SCS scenarios, the extra padding 405 may be split into one or more padding durations, each padding duration corresponding to a symbol, as illustrated in FIG. 4. In some cases, such splitting of the extra padding 405 may allow for increased effectivity in beam switching at a UE (e.g., in downlink (DL) transmission), or at a base station (e.g., a gNB, in uplink (UL) transmission). Additionally or alternatively, the extra padding 405 may be split over two, four, eight, or other quantities of symbols. For example, Table 4 may illustrate that the extra padding 405 may be split over a first and a second symbol, the first through a fourth symbol, the first through an eighth symbol, or the like for 960 kHz SCS signals. Tables 5 and 6 may further illustrate scenarios for splitting the extra padding 405 over the first through a sixteenth symbol and the first through a thirty-second symbol for 1920 kHz SCS and 3840 kHz SCS signals, respectively. As depicted in Tables 4, 5, and 6, a device may sample a continuous-time signal a number of times during a sampling period to form a discrete-time signal depending on an SCS for the signal, which symbols include the distributed extra padding 405, which may include an extra cyclic prefix duration, and the like. Table 4 may also illustrate the reduction in duration of extra cyclic prefix as extra padding 405 (e.g., extra cyclic prefix) is distributed to an increasing number of symbols.

TABLE 4

Extra Padding Splitting Options at 960 kHz SCS

| Symbols to Distribute Extra Cyclic Prefix Over | Samples in Extra Cyclic Prefix at Sampling Period of (Tc/2, 8Tc) | Duration (ns) of extra Cyclic Prefix | Samples in Cyclic Prefix at Sampling Period of (Tc/2, 8Tc) | Duration (ns) of Cyclic Prefix |
|---|---|---|---|---|
| 1st symbol every 448 symbols | (2336, 146) | 594.1 | (288, 18) | 73.3 |
| 1st to 2nd symbols every 448 symbols | (1312, 82) | 333.7 | (288, 18) | 73.3 |
| 1st to 4th symbols every 448 symbols | (800, 50) | 203.4 | (288, 18) | 73.3 |
| 1st to 8th symbols every 448 symbols | (544, 34) | 138.3 | (288, 18) | 73.3 |

TABLE 5

Extra Padding Splitting Options at 1920 kHz SCS

| Symbols to Distribute Extra Cyclic Prefix Over | Samples in Extra Cyclic Prefix at Sampling Period of (Tc/4, 4Tc) | Duration (ns) of extra Cyclic Prefix | Samples in Cyclic Prefix at Sampling Period of (Tc/4, 4Tc) | Duration (ns) of Cyclic Prefix |
|---|---|---|---|---|
| 1st of 996 symbols every half-subframe | (4384, 274) | 557.4 | (288, 18) | 36.6 |
| 1st and 2nd of 996 symbols every half-subframe | (2336, 146) | 297.0 | (288, 18) | 36.6 |
| 1st to 4th of 996 symbols every half-subframe | (1312, 82) | 166.8 | (288, 18) | 36.6 |
| 1st to 8th of 996 symbols every half-subframe | (800, 50) | 101.7 | (288, 18) | 36.6 |
| 1st to 16th of 996 symbols every half-subframe | (544, 34) | 69.2 | (288, 18) | 36.6 |

TABLE 6

Extra Padding Splitting Options at 3840 kHz SCS

| Symbols to Distribute Extra Cyclic Prefix Over | Samples in Extra Cyclic Prefix at Sampling Period of (Tc/8, 2Tc) | Duration (ns) of extra Cyclic Prefix | Samples in Cyclic Prefix at Sampling Period of (Tc/8, 2Tc) | Duration (ns) of Cyclic Prefix |
|---|---|---|---|---|
| 1st of 1992 symbols every half-subframe | (8480, 530) | 539.1 | (288, 18) | 18.3 |
| 1st and 2nd of 1992 symbols every half-subframe | (4384, 274) | 278.7 | (288, 18) | 18.3 |
| 1st to 4th of 1992 symbols every half-subframe | (2336, 146) | 148.5 | (288, 18) | 18.3 |
| 1st to 8th of 1992 symbols every half-subframe | (1312, 82) | 83.4 | (288, 18) | 18.3 |
| 1st to 16th of 1992 symbols every half-subframe | (800, 50) | 50.9 | (288, 18) | 18.3 |

TABLE 6-continued

Extra Padding Splitting Options at 3840 kHz SCS

| Symbols to Distribute Extra Cyclic Prefix Over | Samples in Extra Cyclic Prefix at Sampling Period of (Tc/8, 2Tc) | Duration (ns) of extra Cyclic Prefix | Samples in Cyclic Prefix at Sampling Period of (Tc/8, 2Tc) | Duration (ns) of Cyclic Prefix |
|---|---|---|---|---|
| 1st to 32nd of 1992 symbols every half-subframe | (544, 34) | 34.6 | (288, 18) | 18.3 |

Figure 5:
FIG. 5 illustrates an example of a configuration that supports techniques for symbol transmission with modified padding duration in accordance with aspects of the present disclosure.

FIG. 5 illustrates an example of a configuration 500 that supports techniques for symbol transmission with modified padding duration in accordance with one or more aspects of the present disclosure. In some examples, the configuration 500 provides for signals at different SCS. The configuration 500 may be included in aspects of wireless communications system 100, wireless communications system 200, or both. The signals depicted in the example of FIG. 5 may each include symbol lengths and other characteristics at various SCS values. For example, the signal 505 may have an SCS of 960 kHz, the signal 510 may have an SCS of 1920 kHz, the signal 515 may have an SCS of 3840 kHz, the signal 520 may have an SCS of 7680 kHz, and the signal 525 may have an SCS of 15360 kHz.

In some examples, referring to Table 3 described with reference to FIG. 4, an extra padding duration may increase to or approximately to 200% of an OFDM symbol 535 at an SCS value of 3840 kHz, to or approximately to 400% at an SCS value of 7680 kHz, and to or approximately to 800% at an SCS value of 15360 kHz. That is, referring to Table 2 described with reference to FIG. 4, the extra padding duration may remain constant even as OFDM symbols 535 and cyclic prefix 540 half in duration as SCS values double. Thus, still referring to Table 2, at 3840 kHz SCS, the OFDM symbol 535 duration is 512Tc, and the extra padding duration is 1024Tc, resulting in the extra padding duration being 200% of an OFDM symbol 535 duration. In such cases, it may be possible to allocate an additional OFDM symbols 545 and cyclic prefix 540 during the extra padding duration (e.g., the padding 530 duration as shown for signals 505 or 510, which may remain constant for each of signals 515, 520, and 525).

A UE 115 or a base station 105 may add or configure additional OFDM symbols 545 and cyclic prefix 540 such that the remaining padding 530 duration may be less than the combined OFDM symbol 535 and cyclic prefix 540 duration for the SCS. For example, at 7680 kHz SCS, a UE 115 or base station 105 may add or configure three additional OFDM symbols 545 and cyclic prefix 540, each corresponding to OFDM symbol and cyclic prefix durations for the remainder of the OFDM symbols 535 and cyclic prefix 540 at the signal 520 having 7680 kHz SCS, where the remaining padding 530 duration may be less than the combined duration of the OFDM symbol 535 and cyclic prefix 540 duration at the 7680 kHz SCS. In some other examples, for the signal 510 having 1920 kHz SCS, one additional OFDM symbol 545 and cyclic prefix 540 may not be able to fit in the padding 530 duration. For SCS 3840 kHz, one additional OFDM symbol 545 and corresponding cyclic prefix 540 may be able to fit in the extra padding duration, leaving the remaining padding 530 duration as illustrated in the FIG. 5. That is, each OFDM symbol 535 and cyclic prefix 540 duration, including the additional OFDM symbols 545 and cyclic prefix 540, may be the same. Such a design may maintain alignment of a symbol boundary across SCS values (e.g., for lower, higher, or the same SCS values). That is, the additional one or more OFDM symbols 545 and cyclic prefix 540 may not affect the positioning in time of other OFDM symbols 535 and cyclic prefix 540 in the half-subframe.

Calculations of padding 530 durations (e.g., remaining padding) and a total number of symbols in a subframe including the additional OFDM symbols 545 and cyclic prefix 540 may be illustrated in the following Table 7. Tc may be calculated as depicted with reference to FIG. 4.

TABLE 7

New Padding Durations and Number of Symbols in a Subframe

| SCS | New Padding Duration (ns, number of samples) | First symbol of subframe length (padding + cyclic prefix + OFDM symbol durations = total nsec for the first symbol, number of samples) | Number of Symbols in Subframe = (existing + new symbols) |
|---|---|---|---|
| 3840 kHz | (476Tc, 3808) | (476Tc + 36Tc + 512Tc = 1024Tc, 8192) | (1992 + 1) |
| 7680 kHz | (202Tc, 3232) | (202Tc + 18Tc + 256Tc = 476Tc, 7616) | (3984 + 3) |
| 15360 kHz | (65Tc, 2080) | (65Tc + 9Tc + 128Tc = 202Tc, 6464) | (7968 + 7) |

Figure 6A:
FIGS. 6A, 6B, and 6C illustrate examples of configurations that support techniques for symbol transmission with modified padding duration in accordance with aspects of the present disclosure.
Figure 6B:
Figure 6C:

FIGS. 6A, 6B, and 6C illustrate examples of configurations 601, 602, and 603 for padding use 600 that support techniques for symbol transmission with modified padding duration in accordance with one or more aspects of the present disclosure. In some examples, configurations for padding use 600 may be included in aspects of wireless communications system 100, wireless communications system 200, or both. For example, one or more signals represented by FIGS. 6A, 6B, and 6C may be included in the signal 205. FIGS. 6A, 6B, and 6C may illustrate additional or alternative examples to one or more examples described in FIG. 5. For example, in FIG. 5, there may be a remaining padding 530 duration or any other padding duration (e.g., before or after an addition of extra OFDM symbols 545) that is equal to or less than an OFDM symbol 535 duration for a signal SCS. FIGS. 6A, 6B, and 6C may provide examples for use of such the remaining padding 530 duration or the any other padding duration.

In the example of FIG. 6A, a remaining padding duration may be equal to or approximately equal to a symbol duration (e.g., an OFDM symbol 605 duration). In such cases, a UE 115 or a base station 105 may configure the remaining padding duration to be allocated with an additional or extra OFDM symbol 610, without a corresponding cyclic prefix 615. Such a configuration 601 may be applied to signal 620 of 1920 kHz SCS, among other SCS values. In some examples, transmitting the additional OFDM symbol 610 without a corresponding cyclic prefix 615 may be an example of a best effort transmission. Such examples may be signal-to-interference and noise ratio (SINR) or modulation and coding scheme (MCS) dependent. For example, configuration 601 may be used at a relatively low MCS (e.g., when a SINR value to decode at least part of a signal is low, and when such decoding is less sensitive to errors in a signal).

In the example of FIG. 6B, a remaining padding duration may be equal to or less than a symbol duration (e.g., an OFDM symbol 605 duration). In such cases, a UE 115 or a base station 105 may configure the remaining padding duration to be allocated with cyclic prefix 615. Such a configuration 602 may be applied to signal 625 of 3840 kHz, among other SCS values. The technique of padding allocation as depicted in FIG. 6B may add little to no extra signal processing, and may maintain existing signal configurations of allocation of extra padding duration with cyclic prefix.

In the example of FIG. 6C, a remaining padding duration may be equal to or less than a symbol duration (e.g., an OFDM symbol 605 duration). In such cases, a UE 115 or base station 105 may configure the remaining padding duration to be allocated with a shortened OFDM symbol 630 with corresponding cyclic prefix 615 or, in some other examples, without corresponding cyclic prefix 615. The UE 115 or base station 105 may use a smaller FFT size, or some other method, to add or configure the shortened OFDM symbol 630 with or without the corresponding cyclic prefix 615. Such a configuration 603 may be applied to signal 635 of 3840 kHz SCS, for example.

Figure 7:
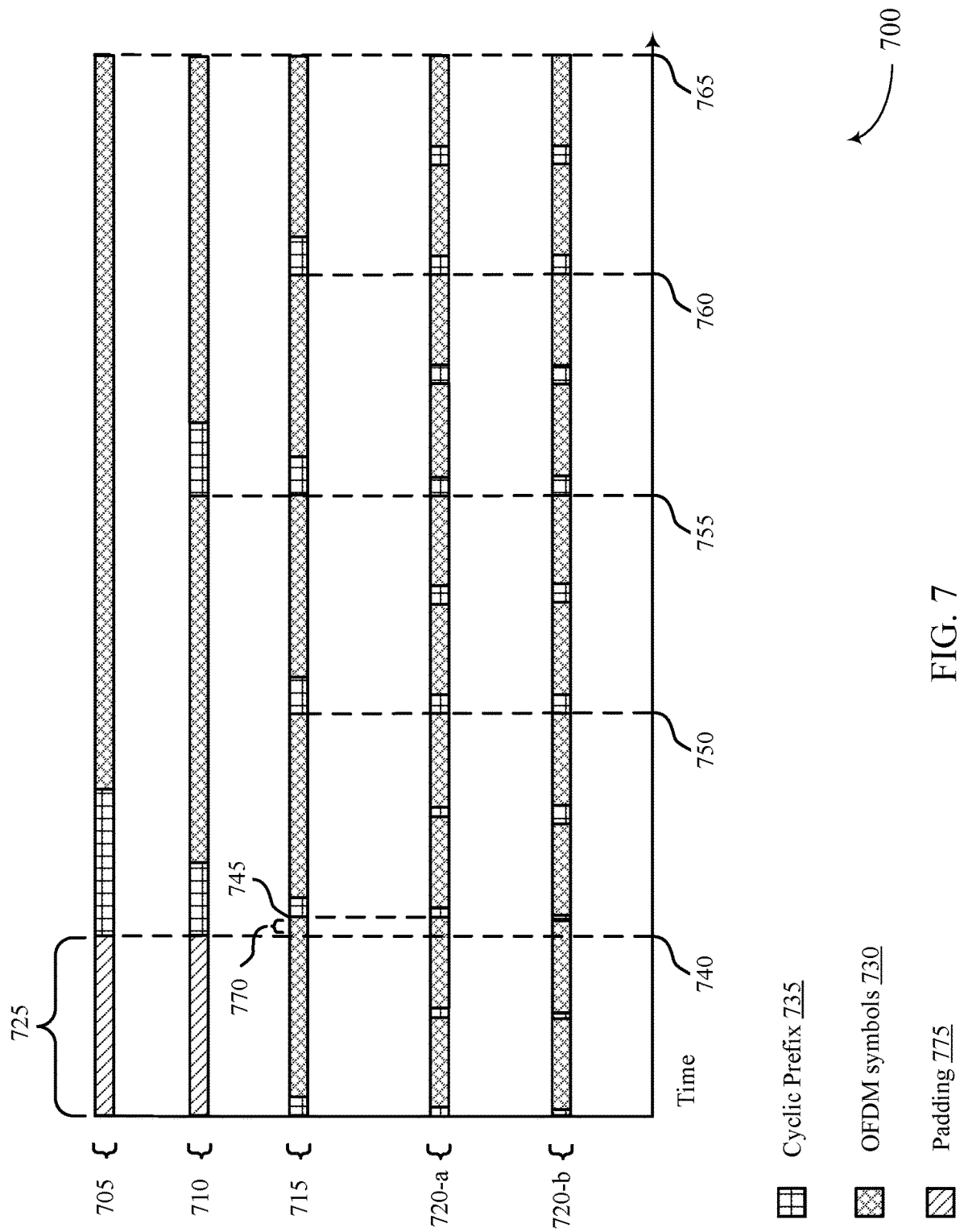
FIG. 7 illustrates an example of a signal configuration that supports techniques for symbol transmission with modified padding duration in accordance with aspects of the present disclosure.

FIG. 7 illustrates an example of signal configuration 700 that supports techniques for symbol transmission with modified padding duration in accordance with one or more aspects of the present disclosure. In some examples, signal configuration 700 for different SCSs may be included in aspects of wireless communications system 100, wireless communications system 200, or both. For example, one or more signals of the signals at different SCS may each include symbol lengths and other characteristics at various SCS values (such as at 480 kHz SCS, 960 kHz SCS, 1920 kHz SCS, and 3840 kHz SCS).

In some examples, a UE 115 or base station 105 may allocate an extra padding duration 725 (e.g., 1024Tc with reference to Table 2) with OFDM symbols 730, cyclic prefix 735, or both. For example, at some SCS values, the UE 115 or base station 105 may configure one or more cyclic prefix 735 durations to be shortened to accommodate one or more additional OFDM symbols 730 and one or more corresponding cyclic prefix 735, which may also be shortened cyclic prefixes. For example, at signal 715 of SCS 1920 kHz, the UE 115 or the base station 105 may reduce a cyclic prefix 735 duration by half, or some other reduced amount, add or configure an additional OFDM symbol 730 that may at least partially overlap the extra padding duration 725, and add or configure an additional cyclic prefix 735 at the beginning of the symbol, which may be half or otherwise reduced compared to other cyclic prefixes 735 for other symbols. Thus, each OFDM symbol 730 in a half-subframe may have a corresponding cyclic prefix 735, although some OFDM symbols 730 may have a corresponding reduced cyclic prefix 735. Reducing cyclic prefix 735 may result in misalignment in at least the symbol corresponding to the reduced cyclic prefix 735 in a different SCS. For example, at a time 740, a start of a second symbol at 745 of the signal 715 of SCS 1920 kHz may be misaligned at time 740. The alignment between symbols may return between time 750 and time 755 for signal 715 of SCS 1920 kHz. However, signal 715 of SCS 1920 kHz and signal 720 of SCS 3840 kHz may be aligned with at time 745 when halved OFDM symbols 730 and cyclic prefixes 735 are allocated at the extra padding duration. In some examples, both signals 720-a and 720-b may be misaligned at time 740, but may both be aligned with signal 715 at time 750. In some examples, signals 710, 715, and 720 may be aligned at time 755. In some examples, the signal 715, signals 720-a and 720-b may be aligned at time 760, and signals 705, 710, 715, 720-a and 720-b may be aligned at time 765. In some examples, a base station 105 may switch SCS configurations (e.g., values) at any time where there may be alignment between different SCS values. For example, if base station 105 communicates using signal 715 of SCS 1920 kHz, base station 105 may be able to switch to communicating using signal 720-a of SCS 3840 kHz at time 745 because signals 715 and 720 may be aligned at time 745.

In some examples, a UE 115 or base station 105 may configure one or more cyclic prefixes 735 to be shortened to half, one-third, one-quarter, three-quarters, or some other amount, with respect to remaining cyclic prefixes for an SCS. For example, in the signal 720-a of SCS 3840 kHz, a first four cyclic prefixes 735 may be reduced by one-half compared to remaining cyclic prefixes 735 for signal 720-a. In some other examples, in the signal 720-b of SCS 3840 kHz, a first three cyclic prefixes 735 may be reduced to one-third compared to remaining cyclic prefixes 735 for signal 720-b. Such reduction in cyclic prefix 735 duration may enable the UE 115 or base station 105 to configure one or more additional OFDM symbols 730 to be allocated in the extra padding 725 duration (e.g., one extra symbol at 1920 kHz SCS, two extra symbols at 3840 kHz SCS, and the like). For example, at the signal 715 of 1920 kHz SCS, the UE 115 or base station 105 may configure one additional OFDM symbol 730 within the extra padding 725 duration. To make space for corresponding cyclic prefix 735 for the additional OFDM symbol 730, the UE 115 or base station 105 may configure the cyclic prefix to be reduced by half for the next OFDM symbol 730 in time, and may allocate the remaining duration 770 to the previous OFDM symbol 730, as illustrated. Symbols after time 750 for signal 715 of 1920 kHz SCS may include or correspond to normal (e.g., not reduced) cyclic prefix 735 durations (e.g., corresponding to 288 samples). Such examples may enable higher data throughput and fewer wasted resources in transmitted signaling while maintaining a consistent symbol duration for OFDM symbols 730. In some examples, the UE 115 or base station 105 may select a reduced-duration cyclic prefix 735 duration such that alignment is maintained at boundaries of symbols including or corresponding to the reduced-duration cyclic prefix 735. For example, such a boundary may exist at 750 for the signal corresponding to 3840 kHz SCS.

In some examples, a shorter OFDM symbol 730 with corresponding cyclic prefix 735 may be able to fill the extra padding duration 725 in cases where a symbol length corresponding to an SCS configuration may be longer in duration than the extra padding duration 725 including padding 775 (e.g., for 960 kHz SCS).

In some examples, a UE 115 or base station 105 (e.g., a gNB) may operate with or without the extra OFDM symbols 730 in the extra padding duration 725 as described previously, corresponding to a first and a second mode. That is, the first mode may correspond to the extra padding duration 725 being allocated with additional OFDM symbols 730 and corresponding shortened or reduced cyclic prefix 735, such as at signal 715 and signal 720, and the second mode may correspond to extra cyclic prefix included instead at the extra padding duration 725. Such modes may be network-configurable at the UE 115. For example, the base station 105 may configure the UE 115 for the first mode or the second mode depending on a delay-spread scenario. In some examples, the UE 115 may transmit (e.g., periodically, dynamically, upon request from the base station 105, or the like) an indication of a delay-spread scenario, delay-spread measurements, or both, at the UE 115, and the indication may additionally or alternatively include whether the delay spread conditions correspond to or are capable of supporting shortened cyclic prefix 735. The base station 105 may configure the UE 115 with the first mode if the delay-spread scenario at the UE 115 is low (e.g., an indoor factory), or may configure the UE 115 with the second mode if the delay-spread scenario at the UE 115 is high (e.g., outdoors).

In some examples, the UE 115 may request (e.g., independently, dynamically request) to operate in the first mode or the second mode or to be configured in the first mode or the second mode (e.g., based on delay-spread conditions at the UE 115) at any time. In some examples, the network (e.g., the base station 105) may dynamically indicate to one or more UEs 115 to switch from the first mode to the second mode, or from the second mode to the first mode, based on one or more network conditions. In some examples, the mode indicated may apply to one or more (e.g., all) UEs 115 in one or more cells of one or more base stations 105 in the network.

In some examples, to reduce an impact of reduced cyclic prefix 735, the base station 105 may configure cyclic prefix 735 reduction over a number of symbols to increase the reduced cyclic prefix 735 duration per individual reduced cyclic prefix 735 durations and mitigate negative effects associated with reduced cyclic prefix duration (e.g., negative effects such as reduced effectiveness in reducing inter-symbol interference (ISI), among other effects). For example, at 3840 kHz SCS (e.g., signal 720-a), the base station 105 may configure four symbols with reduced cyclic prefix 735 (e.g., corresponding to 144 samples each cyclic prefix) instead of three symbols with reduced cyclic prefix 735 (e.g., corresponding to 96 samples each cyclic prefix) at 3840 kHz SCS (e.g., signal 720-b). In some examples, the base station 105 may indicate a number of symbols corresponding to reduced cyclic prefix 735 durations for a half-subframe, a subframe, a frame, or any other unit of time (e.g., TTI), to one or more UEs 115 which the base station 105 may be serving. The base station may transmit the indication via radio resource control (RRC) signaling, a downlink control information (DCI) message, a MAC control element, or the like. Further configurations may be illustrated in Table 8. However, Table 8 may not limit the configurations that may exist. The qualifier (new) in Table 8 may represent an extra symbol (e.g., an extra OFDM symbol 730 and corresponding cyclic prefix 735 which may be reduced in duration) included within the extra padding duration 725.

TABLE 8

Possible lengths of OFDM symbols with shortened cyclic prefix at different SCS values

| SCS (KHz), $N_{FFT}$ | Length in samples (Extra padding, normal cyclic prefix) | OFDM symbol lengths in samples with shortened cyclic prefix (data, shortened cyclic prefix) | Number of symbols with shortened cyclic prefix per subframe | Normal OFDM symbol lengths in samples (data, cyclic prefix) |
|---|---|---|---|---|
| 960, 4K (e.g., 4096) | 2048, 288 | May not be possible in some examples | 0 | (4096, 288) |
| 1920, 4K (e.g., 4096) | 4096, 288 | (4096, 144) (new), (4096, 144) | 2 | (4096, 288) |
| 1920, 4K (e.g., 4096) | 4096, 288 | (4096, 216) (new), (4096, 216), (4096, 216), (4096, 216) | 4 | (4096, 288) |
| 3840, 4K (e.g., 4096) | 8192, 288 | (4096, 96) (new), (4096, 96) (new), (4096, 96) | 3 | (4096, 288) |
| 3840, 4K (e.g., 4096) | 8192, 288 | (4096, 144) (new), (4096, 144) (new), (4096, 144), (4096, 144) | 4 | (4096, 288) |

Figure 8:
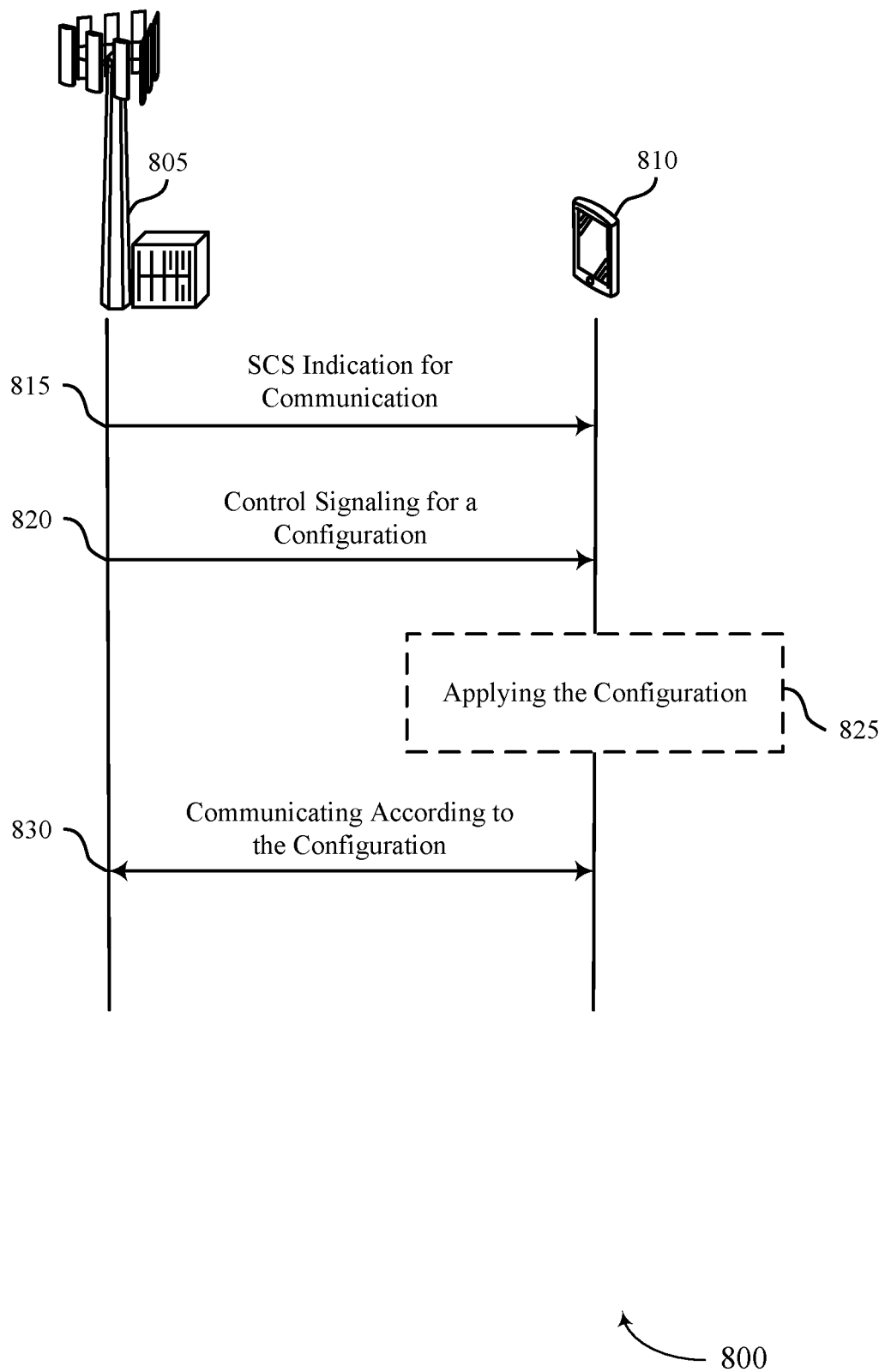
FIG. 8 illustrates an example of a process flow that supports techniques for symbol transmission with modified padding duration in accordance with aspects of the present disclosure.

FIG. 8 illustrates an example of a process flow 800 that supports techniques for symbol transmission with modified padding duration in accordance with one or more aspects of the present disclosure. The process flow 800 may implement aspects of the wireless communications system 100, the wireless communications system 200, or both, or may be implemented by aspects of the wireless communications system 100, the wireless communications system 200, or both, as described with reference to FIG. 1 and FIG. 2.

In the following description of the process flow 800, the operations between a base station 805 and a UE 810 may be performed in different orders or at different times. Base station 805 may be an example of base station 105 and UE 810 may be an example of UE 115. Base station 805 and UE 810 may be any other devices. That is, such devices may be provided merely as example devices. Some operations may also be omitted from the process flow 800, and other operations may be added to the process flow 800.

At 815, UE 810 may receive an indication of an SCS for communications in a set of TTIs, where a TTI of the set of TTIs includes a set of symbols, a corresponding set of cyclic prefixes, and a padding duration. In some examples, a symbol duration of the set of symbols is based on the SCS and the padding duration is longer than the symbol duration. In some examples, the symbol duration may be inversely proportional to the SCS. In some examples, the TTI of the set of TTIs may include a half subframe.

At 820, UE 810 may receive a control signal indicating a configuration for the padding duration, where the configuration may indicate that at least a portion of the padding duration may be reallocated as one or more additional symbols with corresponding one or more additional cyclic prefixes.

At 825, UE 810 may apply the configuration for the padding duration by allocating an additional symbol to the padding duration, where the padding duration may be equal to the symbol duration of the set of symbols. In some examples, UE 810 may apply the configuration for the padding duration by allocating an additional symbol and a corresponding cyclic prefix to at least a second portion of the padding duration, where the additional symbol duration may be less than the symbol duration of the set of symbols.

In some examples, UE 810 may apply the configuration for the padding duration by allocating an additional symbol and a corresponding additional cyclic prefix to the padding duration, where a remaining padding duration after applying the configuration may be less than or equal to the symbol duration of the set of symbols. In some examples, UE 810 may apply the configuration for the padding duration by allocating an additional symbol and a corresponding additional cyclic prefix to the padding duration, where a remaining padding duration may include a second cyclic prefix subsequent to the additional cyclic prefix in time. In some examples, a duration of the second cyclic prefix may be greater than a duration of the additional cyclic prefix allocated to the padding duration.

At 830, base station 805 and UE 810 may communicate during the padding duration using the one or more additional symbols and the corresponding one or more additional cyclic prefixes.

Figure 9:
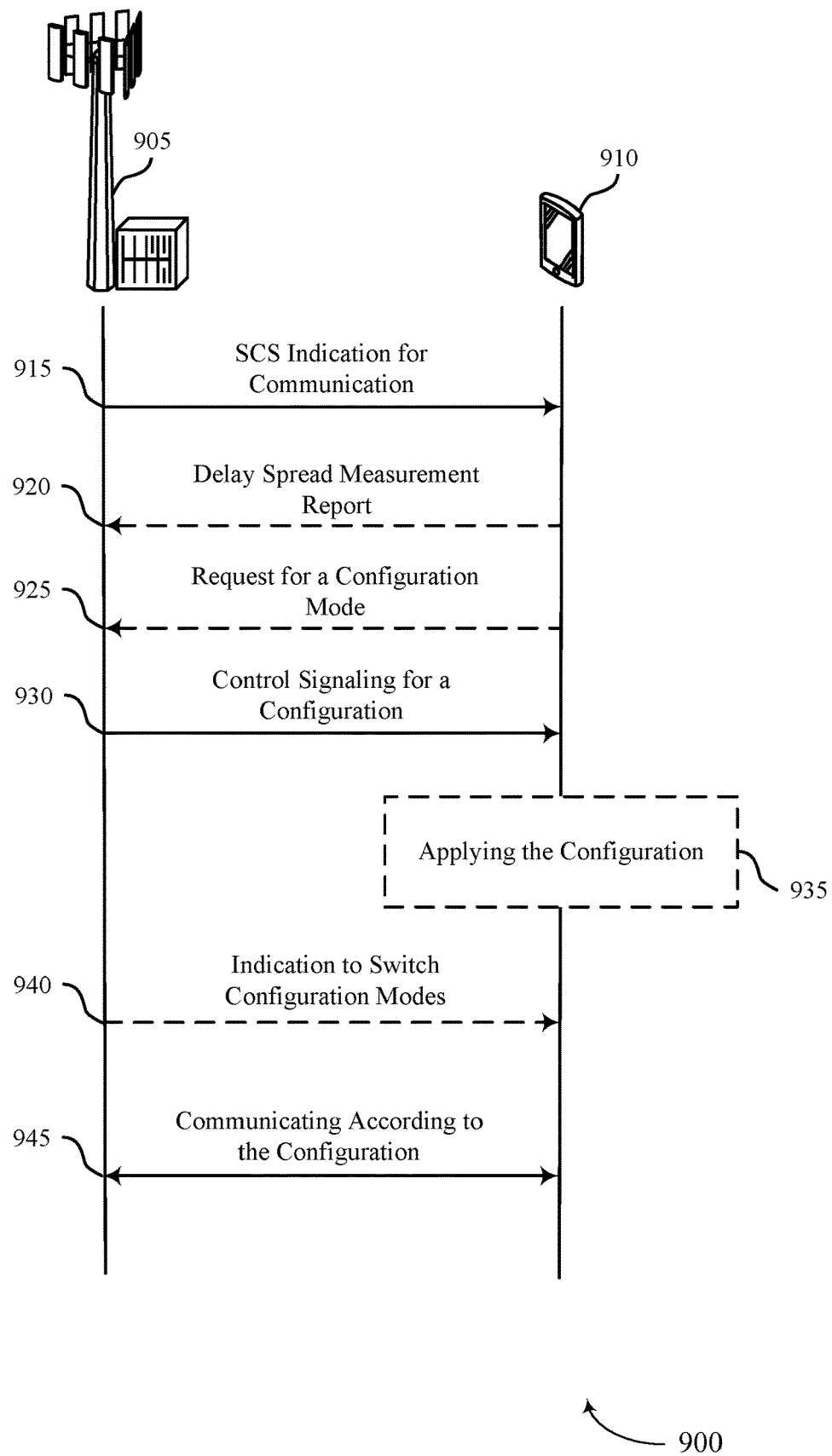
FIG. 9 illustrates an example of a process flow that supports techniques for symbol transmission with modified padding duration in accordance with aspects of the present disclosure.

FIG. 9 illustrates an example of a process flow 900 that supports techniques for symbol transmission with modified padding duration in accordance with one or more aspects of the present disclosure. The process flow 900 may implement aspects of the wireless communications system 100, the wireless communications system 200, or both, or may be implemented by aspects of the wireless communications system 100, the wireless communications system 200, or both, as described with reference to FIG. 1 and FIG. 2.

In the following description of the process flow 900, the operations between a base station 905 and a UE 910 may be performed in different orders or at different times. Base station 905 may be an example of base station 105 and UE 910 may be an example of UE 115. Base station 905 and UE 910 may be any other devices. That is, such devices may be provided merely as example devices. Some operations may also be omitted from the process flow 900, and other operations may be added to the process flow 900.

At 915, UE 910 may receive an indication of an SCS for communications in a set of TTIs, where a TTI of the set of TTIs may include a set of symbols, a corresponding set of cyclic prefixes, and a padding duration, where a symbol duration of the set of symbols may be based on the SCS and where the padding duration may be at least as long as the symbol duration. In some examples, the symbol duration may be inversely proportional to the SCS. In some examples, the TTI of the set of TTIs may include a half subframe.

At 920, UE 910 may optionally transmit a report indicating a delay spread measurement at the UE 910. In some examples, UE 910 may periodically transmit the report indicating the delay spread measurement at the UE 910. At 925, UE 910 may optionally transmit a request for the first configuration mode or the second configuration mode based on the delay spread condition at the UE 910.

At 930, UE 910 may receive control signal indicating a configuration for the padding duration, where the configuration may indicate that the padding duration may be reallocated as one or more additional symbols with corresponding one or more additional cyclic prefixes, where the one or more additional cyclic prefixes and at least a first portion of the set of cyclic prefixes may be reduced in duration in comparison with a remaining portion of the set of cyclic prefixes. In some examples, the UE 910 may receive the control signal selecting the first configuration mode or the second configuration mode based on a delay spread condition at the UE 910, where the first configuration mode may be associated with a reduced delay spread environment in comparison with an environment associated with the second first configuration mode.

In some examples, UE 910 may receive an indication, as a part of receiving the control signal, to switch from communicating according to the first configuration mode to the second configuration mode or from communicating according to the second configuration mode to the first configuration mode. In some examples, control signaling selecting a first configuration mode or a second configuration mode may be based on the transmitted indication. In some examples, the control signaling selecting the first configuration mode or the second configuration mode may be based on the transmitted request. In some examples, the selected configuration mode may be applied to a set of UE 910 included in a cell. In some examples, the one or more additional cyclic prefixes in at least one TTI of the set of TTIs may be reduced in duration in comparison with one or more cyclic prefixes associated with a remaining number of TTIs of the set of TTIs. In some examples, the control signal may include at least one of an RRC signal, a MAC control element, a DCI message, or a combination thereof.

At 935, UE 910 may apply the configuration for the padding duration based on one or more aspects as described at 825 in FIG. 8. At 940, UE 910 may receive an indication to switch from communicating according to the first configuration mode to the second configuration mode or from communicating according to the second configuration mode to the first configuration mode.

At 945, base station 905 and UE 910 may communicate during the TTI using the one or more additional symbols and the set of symbols with the corresponding one or more additional cyclic prefixes, the first portion of the set of cyclic prefixes, and the remaining portion of the set of cyclic prefixes.

Figure 10:
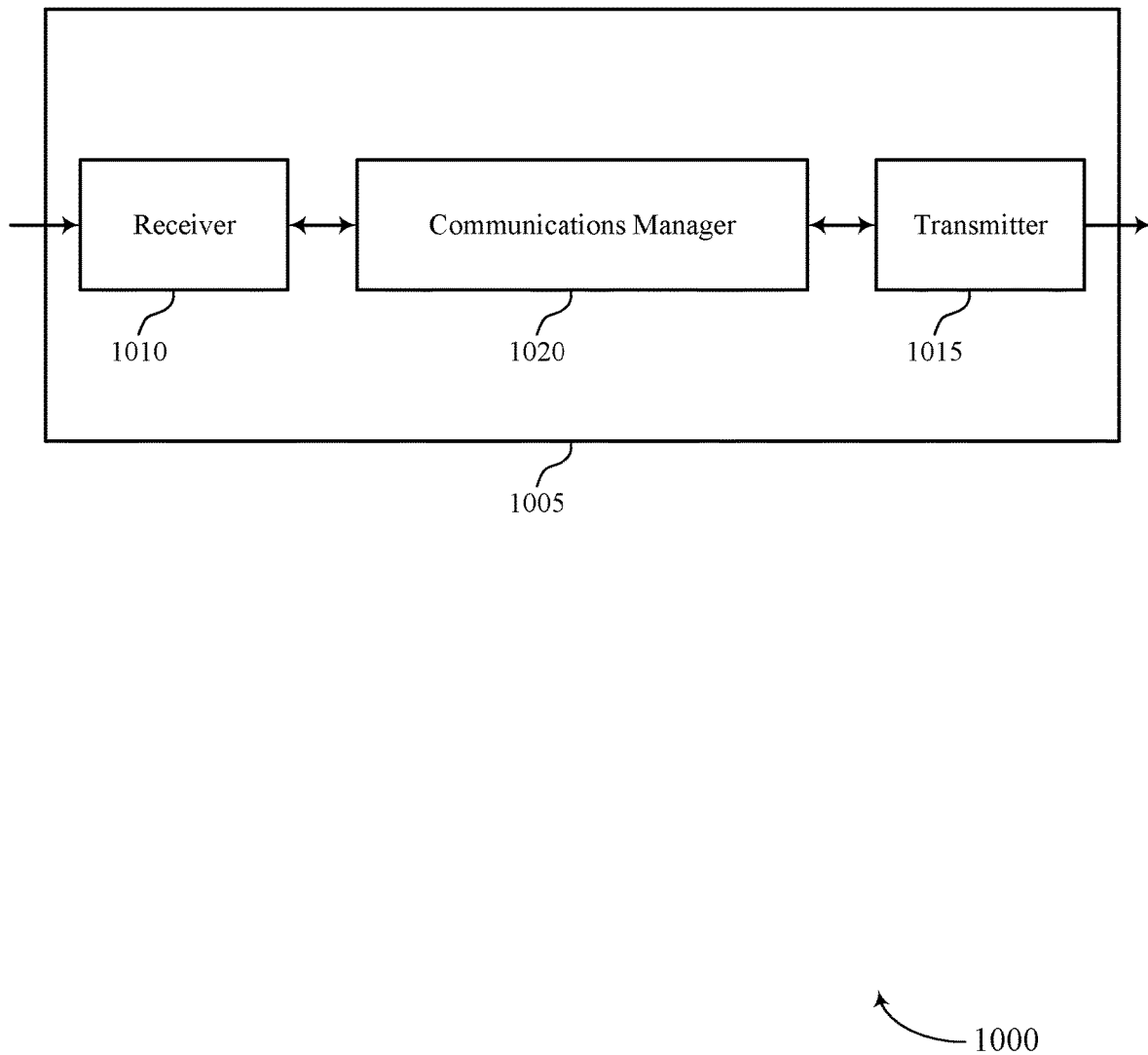
FIGS. 10 and 11 show block diagrams of devices that support techniques for symbol transmission with modified padding duration in accordance with aspects of the present disclosure.

FIG. 10 shows a block diagram 1000 of a device 1005 that supports techniques for symbol transmission with modified padding duration in accordance with aspects of the present disclosure. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for symbol transmission with modified padding duration). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for symbol transmission with modified padding duration). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for symbol transmission with modified padding duration as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. For example, the communications manager 1020 may be configured as or otherwise support a means for receiving an indication of an SCS for communications in a set of multiple TTIs, where a TTI of the set of multiple TTIs includes a set of multiple symbols, a corresponding set of multiple cyclic prefixes, and a padding duration, where a symbol duration of the set of multiple symbols is based on the SCS and where the padding duration is longer than the symbol duration. The communications manager 1020 may be configured as or otherwise support a means for receiving a control signal indicating a configuration for the padding duration, where the configuration indicates that at least a first portion of the padding duration is to be reallocated as one or more additional symbols with corresponding one or more additional cyclic prefixes. The communications manager 1020 may be configured as or otherwise support a means for communicating during the padding duration using the one or more additional symbols and the corresponding one or more additional cyclic prefixes.

Additionally or alternatively, the communications manager 1020 may support wireless communication at a UE in accordance with examples as disclosed herein. For example, the communications manager 1020 may be configured as or otherwise support a means for receiving an indication of an SCS for communications in a set of multiple TTIs, where a TTI of the set of multiple TTIs includes a set of multiple symbols, a corresponding set of multiple cyclic prefixes, and a padding duration, where a symbol duration of the set of multiple symbols is based on the SCS and where the padding duration is at least as long as the symbol duration. The communications manager 1020 may be configured as or otherwise support a means for receiving a control signal indicating a configuration for the padding duration, where the configuration indicates that the padding duration is to be reallocated as one or more additional symbols with corresponding one or more additional cyclic prefixes, where the one or more additional cyclic prefixes and at least a first portion of the set of multiple cyclic prefixes are reduced in duration in comparison with a remaining portion of the set of multiple cyclic prefixes. The communications manager 1020 may be configured as or otherwise support a means for communicating during the TTI using the one or more additional symbols and the set of multiple symbols with the corresponding one or more additional cyclic prefixes, the first portion of the set of multiple cyclic prefixes, and the remaining portion of the set of multiple cyclic prefixes.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for reduced processing, reduced power consumption, and more efficient utilization of communication resources.

Figure 11:
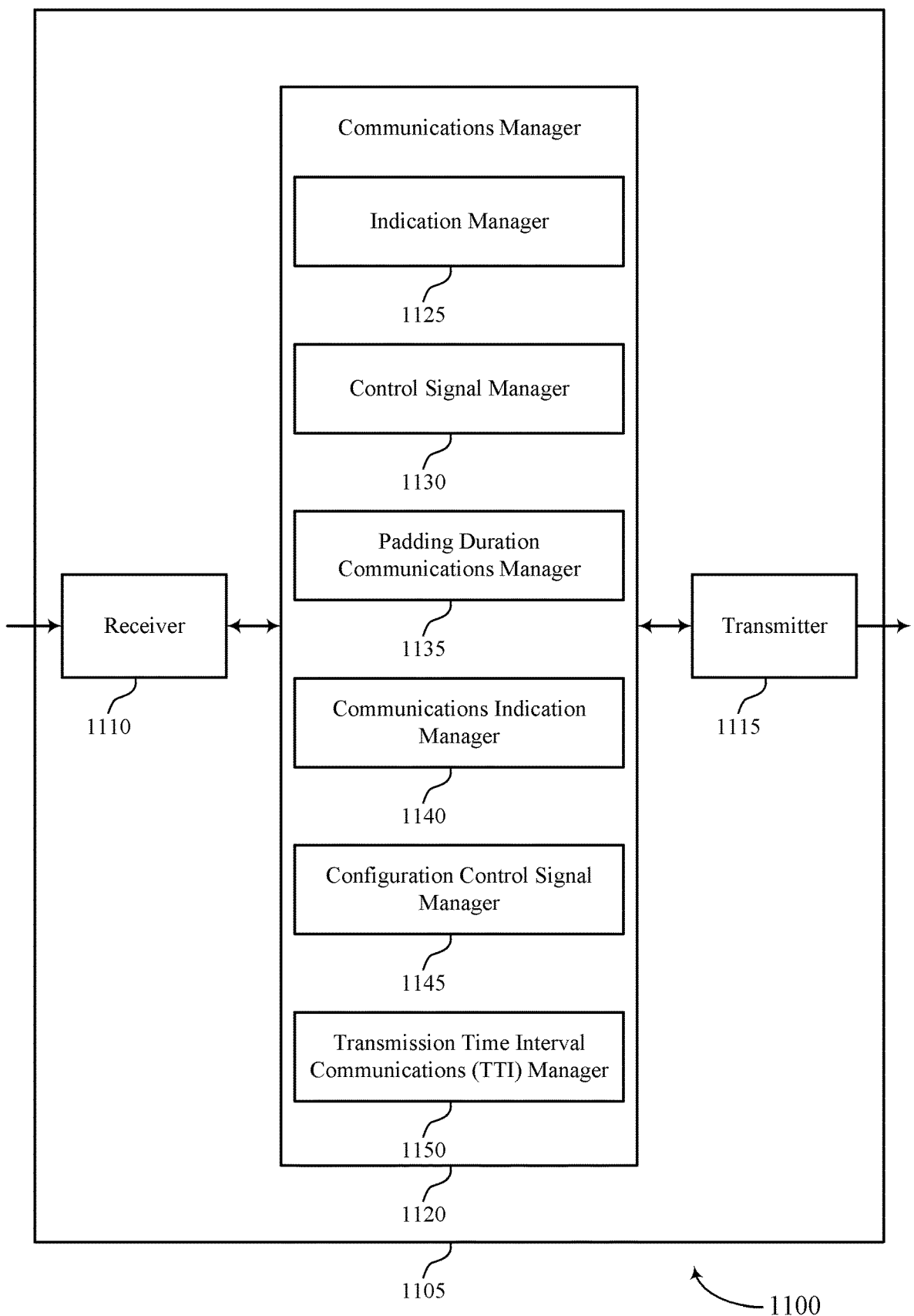

FIG. 11 shows a block diagram 1100 of a device 1105 that supports techniques for symbol transmission with modified padding duration in accordance with aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for symbol transmission with modified padding duration). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for symbol transmission with modified padding duration). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for symbol transmission with modified padding duration as described herein. For example, the communications manager 1120 may include an indication manager 1125, a control signal manager 1130, a padding duration communications manager 1135, a communications indication manager 1140, a configuration control signal manager 1145, a TTI communications manager 1150, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a UE in accordance with examples as disclosed herein. The indication manager 1125 may be configured as or otherwise support a means for receiving an indication of an SCS for communications in a set of multiple TTIs, where a TTI of the set of multiple TTIs includes a set of multiple symbols, a corresponding set of multiple cyclic prefixes, and a padding duration, where a symbol duration of the set of multiple symbols is based on the SCS and where the padding duration is longer than the symbol duration. The control signal manager 1130 may be configured as or otherwise support a means for receiving a control signal indicating a configuration for the padding duration, where the configuration indicates that at least a first portion of the padding duration is to be reallocated as one or more additional symbols with corresponding one or more additional cyclic prefixes. The padding duration communications manager 1135 may be configured as or otherwise support a means for communicating during the padding duration using the one or more additional symbols and the corresponding one or more additional cyclic prefixes.

Additionally or alternatively, the communications manager 1120 may support wireless communication at a UE in accordance with examples as disclosed herein. The communications indication manager 1140 may be configured as or otherwise support a means for receiving an indication of an SCS for communications in a set of multiple TTIs, where a TTI of the set of multiple TTIs includes a set of multiple symbols, a corresponding set of multiple cyclic prefixes, and a padding duration, where a symbol duration of the set of multiple symbols is based on the SCS and where the padding duration is at least as long as the symbol duration. The configuration control signal manager 1145 may be configured as or otherwise support a means for receiving a control signal indicating a configuration for the padding duration, where the configuration indicates that the padding duration is to be reallocated as one or more additional symbols with corresponding one or more additional cyclic prefixes, where the one or more additional cyclic prefixes and at least a first portion of the set of multiple cyclic prefixes are reduced in duration in comparison with a remaining portion of the set of multiple cyclic prefixes. The TTI communications manager 1150 may be configured as or otherwise support a means for communicating during the TTI using the one or more additional symbols and the set of multiple symbols with the corresponding one or more additional cyclic prefixes, the first portion of the set of multiple cyclic prefixes, and the remaining portion of the set of multiple cyclic prefixes.

Figure 12:
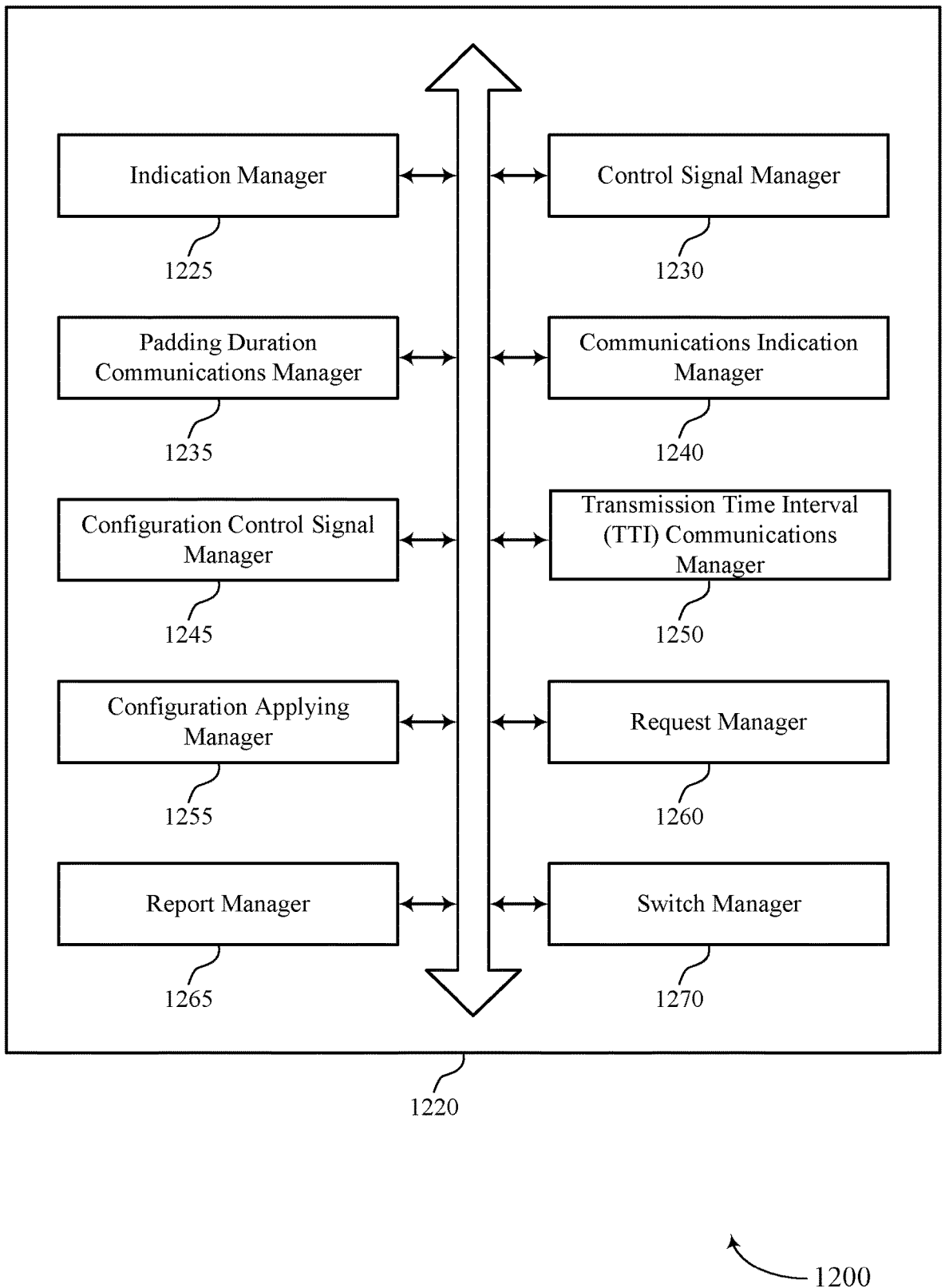
FIG. 12 shows a block diagram of a communications manager that supports techniques for symbol transmission with modified padding duration in accordance with aspects of the present disclosure.

FIG. 12 shows a block diagram 1200 of a communications manager 1220 that supports techniques for symbol transmission with modified padding duration in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of techniques for symbol transmission with modified padding duration as described herein. For example, the communications manager 1220 may include an indication manager 1225, a control signal manager 1230, a padding duration communications manager 1235, a communications indication manager 1240, a configuration control signal manager 1245, a TTI communications manager 1250, a configuration applying manager 1255, a request manager 1260, a report manager 1265, a switch manager 1270, or any combination thereof. Each of these components may communicate, directly or indirectly, with one another (e.g., via one or more buses).

The communications manager 1220 may support wireless communication at a UE in accordance with examples as disclosed herein. The indication manager 1225 may be configured as or otherwise support a means for receiving an indication of an SCS for communications in a set of multiple TTIs, where a TTI of the set of multiple TTIs includes a set of multiple symbols, a corresponding set of multiple cyclic prefixes, and a padding duration, where a symbol duration of the set of multiple symbols is based on the SCS and where the padding duration is longer than the symbol duration. The control signal manager 1230 may be configured as or otherwise support a means for receiving a control signal indicating a configuration for the padding duration, where the configuration indicates that at least a first portion of the padding duration is to be reallocated as one or more additional symbols with corresponding one or more additional cyclic prefixes. The padding duration communications manager 1235 may be configured as or otherwise support a means for communicating during the padding duration using the one or more additional symbols and the corresponding one or more additional cyclic prefixes.

In some examples, the configuration applying manager 1255 may be configured as or otherwise support a means for applying the configuration for the padding duration by allocating an additional symbol to the padding duration, where the padding duration is equal to the symbol duration of the set of multiple symbols.

In some examples, the configuration applying manager 1255 may be configured as or otherwise support a means for applying the configuration for the padding duration by allocating an additional symbol and a corresponding cyclic prefix to at least a second portion of the padding duration, where the additional symbol duration is less than the symbol duration of the set of multiple symbols.

In some examples, the configuration applying manager 1255 may be configured as or otherwise support a means for applying the configuration for the padding duration by allocating an additional symbol and a corresponding additional cyclic prefix to the padding duration, where a remaining padding duration after applying the configuration includes an extended cyclic prefix and is less than or equal to the symbol duration of the set of multiple symbols.

In some examples, the configuration applying manager 1255 may be configured as or otherwise support a means for applying the configuration for the padding duration by allocating an additional symbol and an extended cyclic prefix to the padding duration, where a remaining padding duration includes the extended cyclic prefix.

In some examples, a duration of the extended cyclic prefix is greater than a duration of a cyclic prefix of the set of multiple cyclic prefixes. In some examples, the symbol duration is inversely proportional to the SCS. In some examples, the TTI of the set of multiple TTIs includes a half subframe.

Additionally or alternatively, the communications manager 1220 may support wireless communication at a UE in accordance with examples as disclosed herein. The communications indication manager 1240 may be configured as or otherwise support a means for receiving an indication of an SCS for communications in a set of multiple TTIs, where a TTI of the set of multiple TTIs includes a set of multiple symbols, a corresponding set of multiple cyclic prefixes, and a padding duration, where a symbol duration of the set of multiple symbols is based on the SCS and where the padding duration is at least as long as the symbol duration. The configuration control signal manager 1245 may be configured as or otherwise support a means for receiving a control signal indicating a configuration for the padding duration, where the configuration indicates that the padding duration is to be reallocated as one or more additional symbols with corresponding one or more additional cyclic prefixes, where the one or more additional cyclic prefixes and at least a first portion of the set of multiple cyclic prefixes are reduced in duration in comparison with a remaining portion of the set of multiple cyclic prefixes. The TTI communications manager 1250 may be configured as or otherwise support a means for communicating during the TTI using the one or more additional symbols and the set of multiple symbols with the corresponding one or more additional cyclic prefixes, the first portion of the set of multiple cyclic prefixes, and the remaining portion of the set of multiple cyclic prefixes.

In some examples, to support receiving the control signal, the control signal manager 1230 may be configured as or otherwise support a means for receiving the control signal selecting a first configuration mode or a second configuration mode based on a delay spread condition at the UE, where the first configuration mode is associated with a reduced delay spread environment in comparison with an environment associated with the second configuration mode.

In some examples, the request manager 1260 may be configured as or otherwise support a means for transmitting, by the UE, a request for the first configuration mode or the second configuration mode based on the delay spread condition at the UE, where the control signaling selecting the first configuration mode or the second configuration mode is based on the transmitted request.

In some examples, the report manager 1265 may be configured as or otherwise support a means for transmitting a report indicating a delay spread measurement at the UE, where the control signaling selecting the first configuration mode or the second configuration mode is based on the transmitted indication.

In some examples, to support transmitting the report, the report manager 1265 may be configured as or otherwise support a means for periodically transmitting the report indicating the delay spread measurement at the UE.

In some examples, to support receiving the control signal, the switch manager 1270 may be configured as or otherwise support a means for receiving an indication to switch from communicating according to the first configuration mode to the second configuration mode or from communicating according to the second configuration mode to the first configuration mode.

In some examples, the selected configuration mode is applied to a set of multiple UEs included in a cell. In some examples, the one or more additional cyclic prefixes in at least one TTI of the set of multiple TTIs are reduced in duration in comparison with one or more cyclic prefixes associated with a remaining number of TTIs of the set of multiple TTIs.

In some examples, the control signal includes at least one of a radio resource control signal, a MAC control element, a downlink control information, or a combination thereof. In some examples, the symbol duration is inversely proportional to the SCS. In some examples, the TTI of the set of multiple TTIs includes a half subframe.

Figure 13:
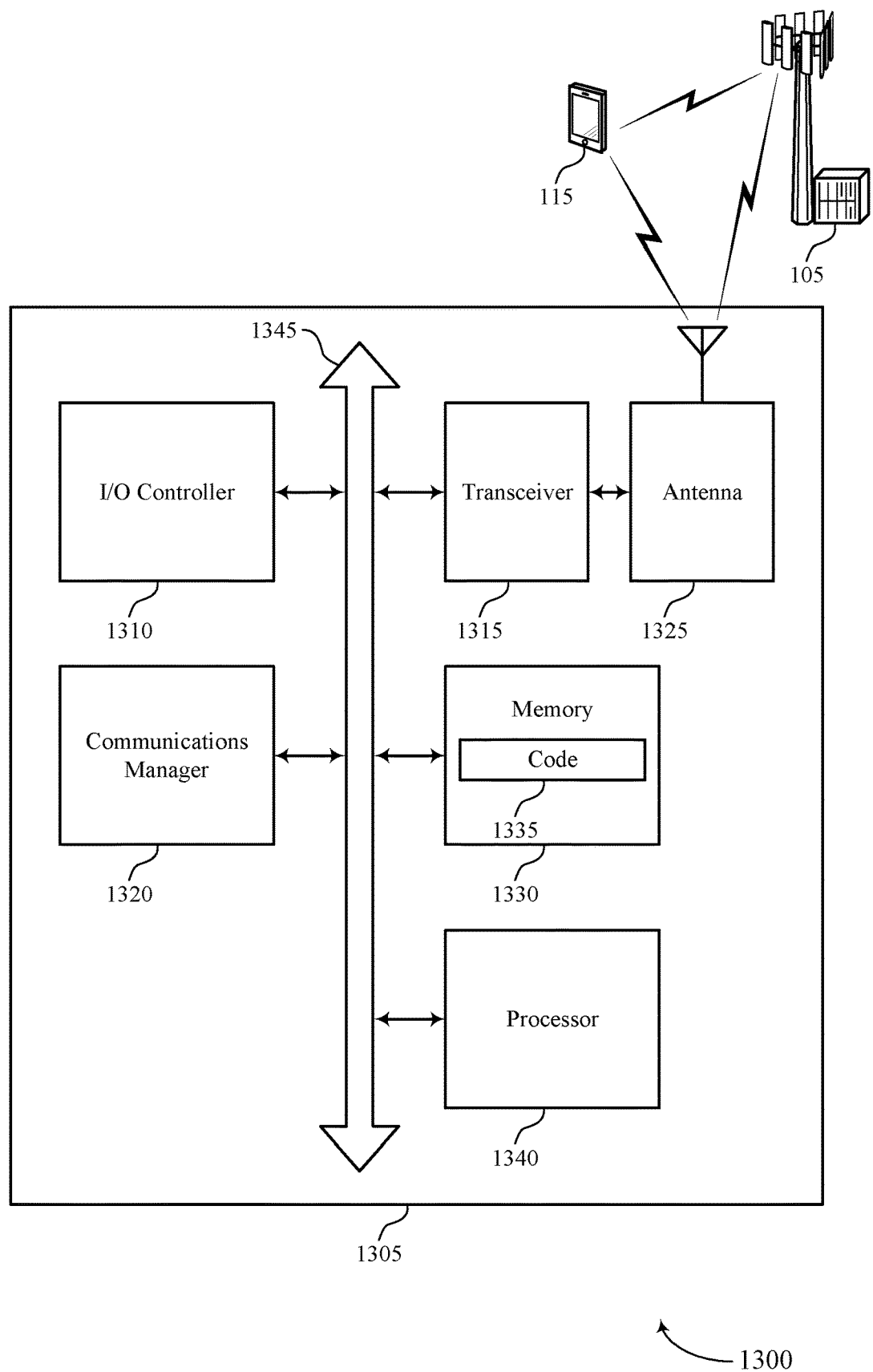
FIG. 13 shows a diagram of a system including a device that supports techniques for symbol transmission with modified padding duration in accordance with aspects of the present disclosure.

FIG. 13 shows a diagram of a system 1300 including a device 1305 that supports techniques for symbol transmission with modified padding duration in accordance with aspects of the present disclosure. The device 1305 may be an example of or include the components of a device 1005, a device 1105, or a UE 115 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for symbol transmission with modified padding duration). For example, the device 1305 or a component of the device 1305 may include a processor 1340 and memory 1330 coupled to the processor 1340, the processor 1340 and memory 1330 configured to perform various functions described herein.

The communications manager 1320 may support wireless communication at a UE in accordance with examples as disclosed herein. For example, the communications manager 1320 may be configured as or otherwise support a means for receiving an indication of an SCS for communications in a set of multiple TTIs, where a TTI of the set of multiple TTIs includes a set of multiple symbols, a corresponding set of multiple cyclic prefixes, and a padding duration, where a symbol duration of the set of multiple symbols is based on the SCS and where the padding duration is longer than the symbol duration. The communications manager 1320 may be configured as or otherwise support a means for receiving a control signal indicating a configuration for the padding duration, where the configuration indicates that at least a first portion of the padding duration is to be reallocated as one or more additional symbols with corresponding one or more additional cyclic prefixes. The communications manager 1320 may be configured as or otherwise support a means for communicating during the padding duration using the one or more additional symbols and the corresponding one or more additional cyclic prefixes.

Additionally or alternatively, the communications manager 1320 may support wireless communication at a UE in accordance with examples as disclosed herein. For example, the communications manager 1320 may be configured as or otherwise support a means for receiving an indication of an SCS for communications in a set of multiple TTIs, where a TTI of the set of multiple TTIs includes a set of multiple symbols, a corresponding set of multiple cyclic prefixes, and a padding duration, where a symbol duration of the set of multiple symbols is based on the SCS and where the padding duration is at least as long as the symbol duration. The communications manager 1320 may be configured as or otherwise support a means for receiving a control signal indicating a configuration for the padding duration, where the configuration indicates that the padding duration is to be reallocated as one or more additional symbols with corresponding one or more additional cyclic prefixes, where the one or more additional cyclic prefixes and at least a first portion of the set of multiple cyclic prefixes are reduced in duration in comparison with a remaining portion of the set of multiple cyclic prefixes. The communications manager 1320 may be configured as or otherwise support a means for communicating during the TTI using the one or more additional symbols and the set of multiple symbols with the corresponding one or more additional cyclic prefixes, the first portion of the set of multiple cyclic prefixes, and the remaining portion of the set of multiple cyclic prefixes.

By including or configuring the communications manager 1320 in accordance with examples as described herein, the device 1305 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for symbol transmission with modified padding duration as described herein, or the processor 1340 and the memory 1330 may be otherwise configured to perform or support such operations.

Figure 14:
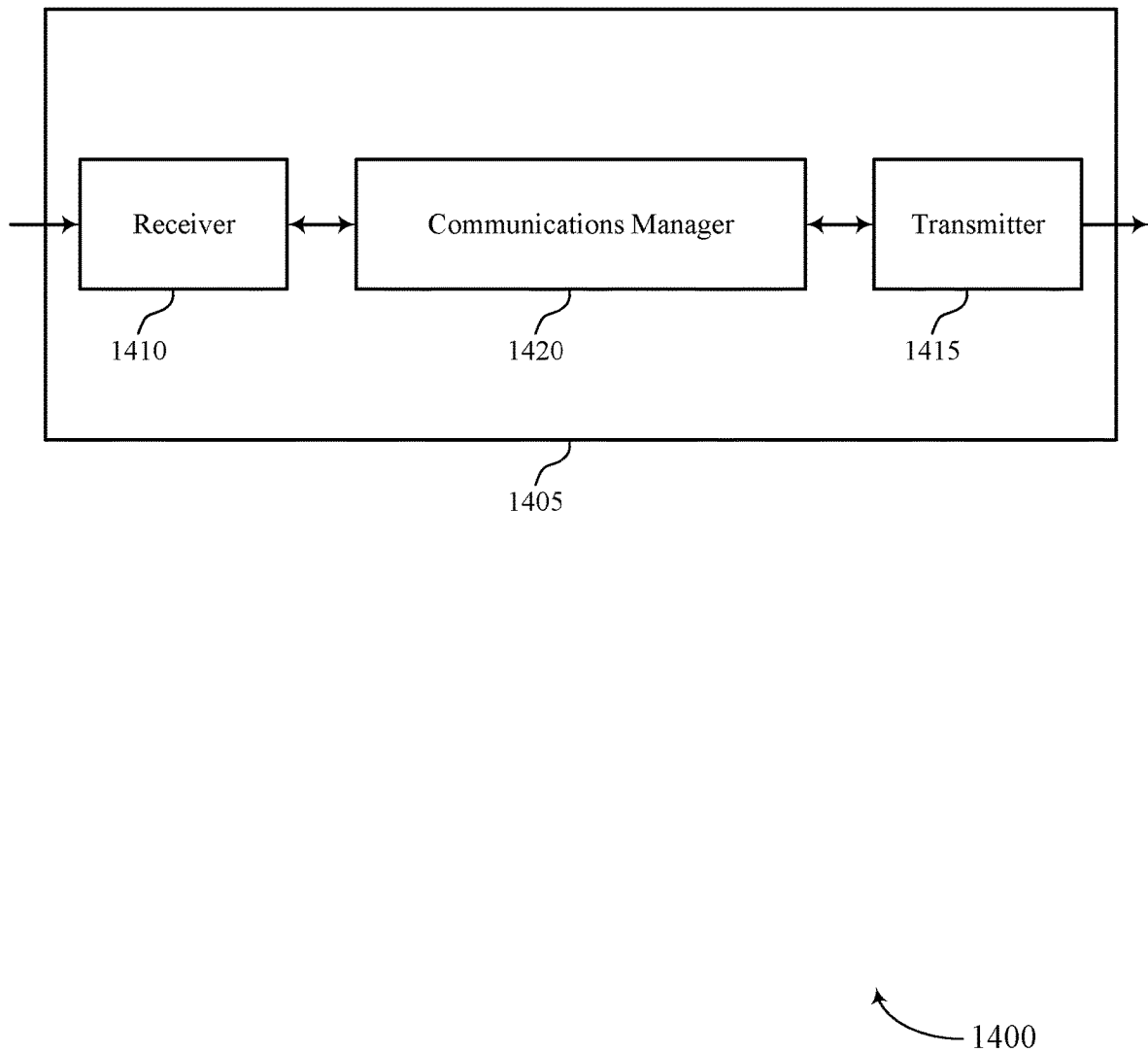
FIGS. 14 and 15 show block diagrams of devices that support techniques for symbol transmission with modified padding duration in accordance with aspects of the present disclosure.

FIG. 14 shows a block diagram 1400 of a device 1405 that supports techniques for symbol transmission with modified padding duration in accordance with aspects of the present disclosure. The device 1405 may be an example of aspects of a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to techniques for symbol transmission with modified padding duration). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to techniques for symbol transmission with modified padding duration). In some examples, the transmitter 1415 may be co-located with a receiver 1410 in a transceiver module. The transmitter 1415 may utilize a single antenna or a set of multiple antennas.

The communications manager 1420, the receiver 1410, the transmitter 1415, or various combinations thereof or various components thereof may be examples of means for performing various aspects of techniques for symbol transmission with modified padding duration as described herein.

For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1420 may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a base station in accordance with examples as disclosed herein. For example, the communications manager 1420 may be configured as or otherwise support a means for transmitting, to a UE, an indication of an SCS for communications in a set of multiple TTIs, where a TTI of the set of multiple TTIs includes a set of multiple symbols, a corresponding set of multiple cyclic prefixes, and a padding duration, where a symbol duration of the set of multiple symbols is based on the SCS and where the padding duration is longer than the symbol duration. The communications manager 1420 may be configured as or otherwise support a means for transmitting, to the UE, a control signal indicating a configuration for the padding duration, where the configuration indicates that at least a first portion of the padding duration is to be reallocated as one or more additional symbols with corresponding one or more additional cyclic prefixes. The communications manager 1420 may be configured as or otherwise support a means for communicating during the padding duration using the one or more additional symbols and the corresponding one or more additional cyclic prefixes.

Additionally or alternatively, the communications manager 1420 may support wireless communication at a base station in accordance with examples as disclosed herein. For example, the communications manager 1420 may be configured as or otherwise support a means for transmitting, to a UE, an indication of an SCS for communications in a set of multiple TTIs, where a TTI of the set of multiple TTIs includes a set of multiple symbols, a corresponding set of multiple cyclic prefixes, and a padding duration, where a symbol duration of the set of multiple symbols is based on the SCS and where the padding duration is at least as long as the symbol duration. The communications manager 1420 may be configured as or otherwise support a means for transmitting, to the UE, a control signal indicating a configuration for the padding duration, where the configuration indicates that the padding duration is to be reallocated as one or more additional symbols with corresponding one or more additional cyclic prefixes, where the one or more additional cyclic prefixes and at least a first portion of the set of multiple cyclic prefixes are reduced in duration in comparison with a remaining portion of the set of multiple cyclic prefixes. The communications manager 1420 may be configured as or otherwise support a means for communicating during the TTI using the one or more additional symbols and the set of multiple symbols with the corresponding one or more additional cyclic prefixes, the first portion of the set of multiple cyclic prefixes, and the remaining portion of the set of multiple cyclic prefixes.

By including or configuring the communications manager 1420 in accordance with examples as described herein, the device 1405 (e.g., a processor controlling or otherwise coupled to the receiver 1410, the transmitter 1415, the communications manager 1420, or a combination thereof) may support techniques for reduced processing, reduced power consumption, and more efficient utilization of communication resources.

Figure 15:
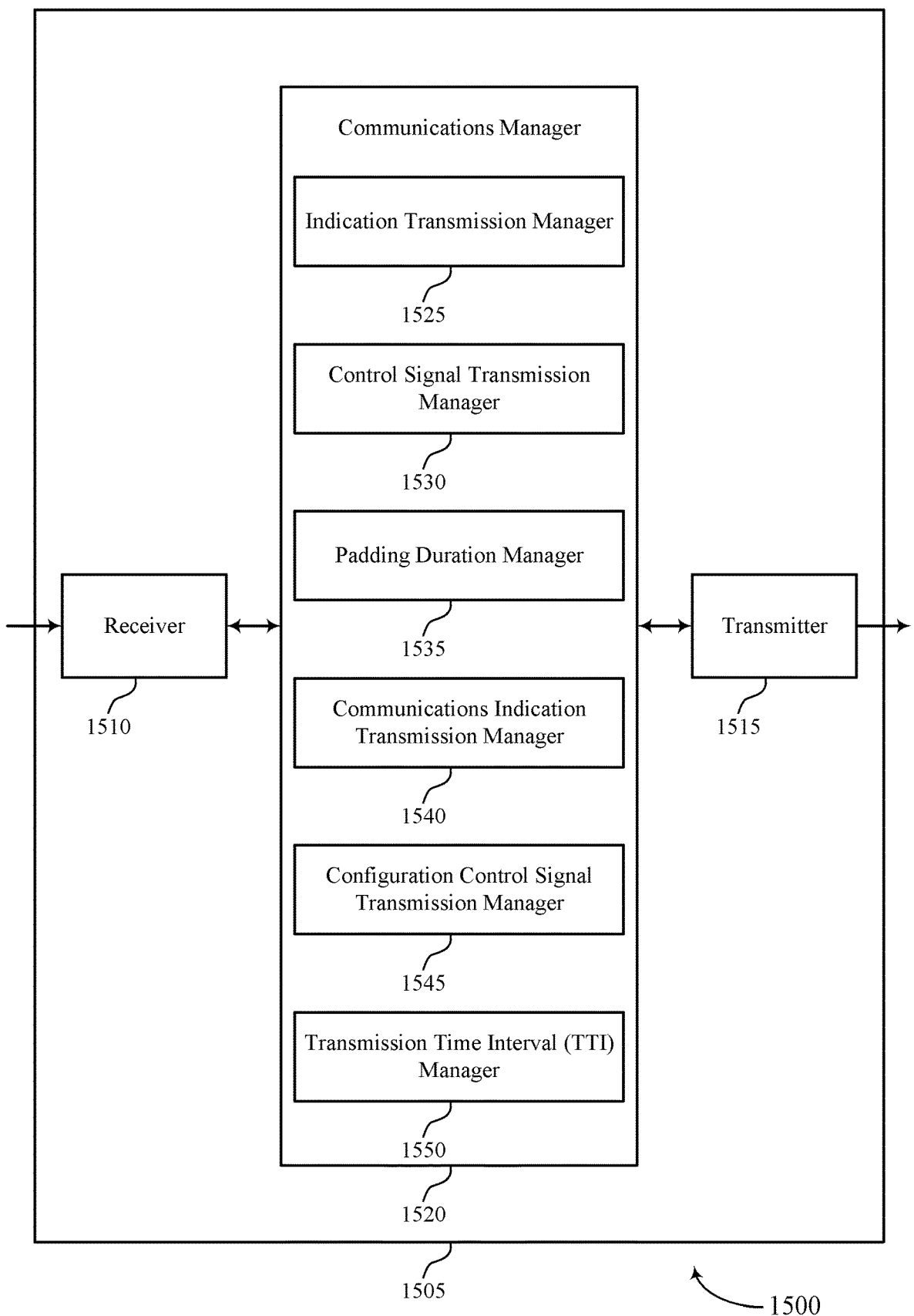

FIG. 15 shows a block diagram 1500 of a device 1505 that supports techniques for symbol transmission with modified padding duration in accordance with aspects of the present disclosure. The device 1505 may be an example of aspects of a device 1405 or a base station 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to techniques for symbol transmission with modified padding duration). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to techniques for symbol transmission with modified padding duration). In some examples, the transmitter 1515 may be co-located with a receiver 1510 in a transceiver module. The transmitter 1515 may utilize a single antenna or a set of multiple antennas.

The device 1505, or various components thereof, may be an example of means for performing various aspects of techniques for symbol transmission with modified padding duration as described herein. For example, the communications manager 1520 may include an indication transmission manager 1525, a control signal transmission manager 1530, a padding duration manager 1535, a communications indication transmission manager 1540, a configuration control signal transmission manager 1545, a TTI manager 1550, or any combination thereof. The communications manager 1520 may be an example of aspects of a communications manager 1420 as described herein. In some examples, the communications manager 1520, or various components thereof, may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communication at a base station in accordance with examples as disclosed herein. The indication transmission manager 1525 may be configured as or otherwise support a means for transmitting, to a UE, an indication of an SCS for communications in a set of multiple TTIs, where a TTI of the set of multiple TTIs includes a set of multiple symbols, a corresponding set of multiple cyclic prefixes, and a padding duration, where a symbol duration of the set of multiple symbols is based on the SCS and where the padding duration is longer than the symbol duration. The control signal transmission manager 1530 may be configured as or otherwise support a means for transmitting, to the UE, a control signal indicating a configuration for the padding duration, where the configuration indicates that at least a first portion of the padding duration is to be reallocated as one or more additional symbols with corresponding one or more additional cyclic prefixes. The padding duration manager 1535 may be configured as or otherwise support a means for communicating during the padding duration using the one or more additional symbols and the corresponding one or more additional cyclic prefixes.

Additionally or alternatively, the communications manager 1520 may support wireless communication at a base station in accordance with examples as disclosed herein. The communications indication transmission manager 1540 may be configured as or otherwise support a means for transmitting, to a UE, an indication of an SCS for communications in a set of multiple TTIs, where a TTI of the set of multiple TTIs includes a set of multiple symbols, a corresponding set of multiple cyclic prefixes, and a padding duration, where a symbol duration of the set of multiple symbols is based on the SCS and where the padding duration is at least as long as the symbol duration.

The configuration control signal transmission manager 1545 may be configured as or otherwise support a means for transmitting, to the UE, a control signal indicating a configuration for the padding duration, where the configuration indicates that the padding duration is to be reallocated as one or more additional symbols with corresponding one or more additional cyclic prefixes, where the one or more additional cyclic prefixes and at least a first portion of the set of multiple cyclic prefixes are reduced in duration in comparison with a remaining portion of the set of multiple cyclic prefixes. The TTI manager 1550 may be configured as or otherwise support a means for communicating during the TTI using the one or more additional symbols and the set of multiple symbols with the corresponding one or more additional cyclic prefixes, the first portion of the set of multiple cyclic prefixes, and the remaining portion of the set of multiple cyclic prefixes.

Figure 16:
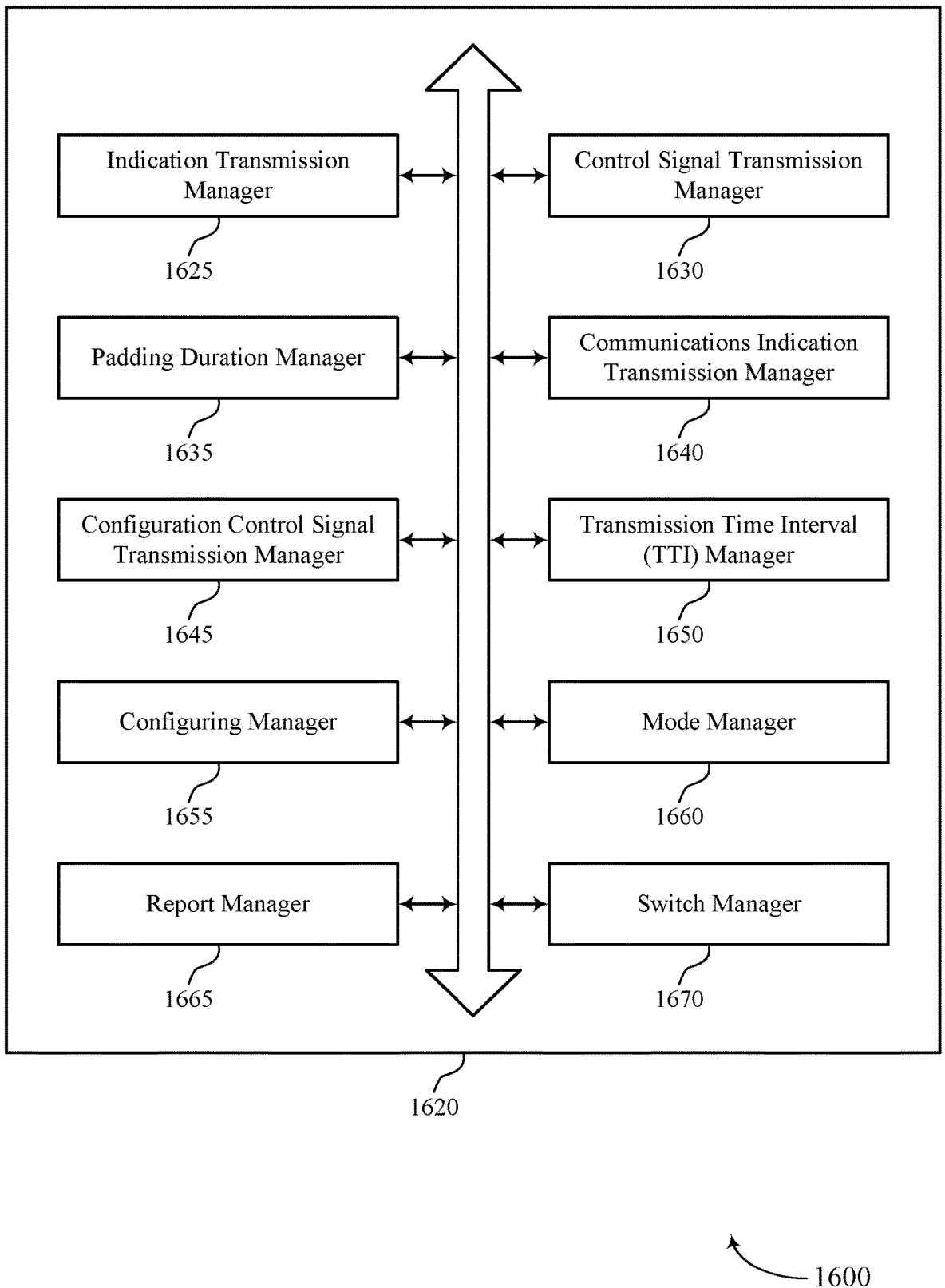
FIG. 16 shows a block diagram of a communications manager that supports techniques for symbol transmission with modified padding duration in accordance with aspects of the present disclosure.

FIG. 16 shows a block diagram 1600 of a communications manager 1620 that supports techniques for symbol transmission with modified padding duration in accordance with aspects of the present disclosure. The communications manager 1620 may be an example of aspects of a communications manager 1420, a communications manager 1520, or both, as described herein. The communications manager 1620, or various components thereof, may be an example of means for performing various aspects of techniques for symbol transmission with modified padding duration as described herein. For example, the communications manager 1620 may include an indication transmission manager 1625, a control signal transmission manager 1630, a padding duration manager 1635, a communications indication transmission manager 1640, a configuration control signal transmission manager 1645, a TTI manager 1650, a configuring manager 1655, a mode manager 1660, a report manager 1665, a switch manager 1670, or any combination thereof. Each of these components may communicate, directly or indirectly, with one another (e.g., via one or more buses).

The communications manager 1620 may support wireless communication at a base station in accordance with examples as disclosed herein. The indication transmission manager 1625 may be configured as or otherwise support a means for transmitting, to a UE, an indication of an SCS for communications in a set of multiple TTIs, where a TTI of the set of multiple TTIs includes a set of multiple symbols, a corresponding set of multiple cyclic prefixes, and a padding duration, where a symbol duration of the set of multiple symbols is based on the SCS and where the padding duration is longer than the symbol duration. The control signal transmission manager 1630 may be configured as or otherwise support a means for transmitting, to the UE, a control signal indicating a configuration for the padding duration, where the configuration indicates that at least a first portion of the padding duration is to be reallocated as one or more additional symbols with corresponding one or more additional cyclic prefixes. The padding duration manager 1635 may be configured as or otherwise support a means for communicating during the padding duration using the one or more additional symbols and the corresponding one or more additional cyclic prefixes.

In some examples, the configuring manager 1655 may be configured as or otherwise support a means for configuring the UE to apply the configuration for the padding duration by allocating an additional symbol to the padding duration, where the padding duration is equal to the symbol duration of the set of multiple symbols.

In some examples, the configuring manager 1655 may be configured as or otherwise support a means for configuring the UE to apply the configuration for the padding duration by allocating an additional symbol and a corresponding cyclic prefix to at least a second portion of the padding duration, where the additional symbol duration is less than the symbol duration of the set of multiple symbols.

In some examples, the configuring manager 1655 may be configured as or otherwise support a means for configuring the UE to apply the configuration for the padding duration by allocating an additional symbol and a corresponding additional cyclic prefix to the padding duration, where a remaining padding duration after applying the configuration includes an extended cyclic prefix and is less than or equal to the symbol duration of the set of multiple symbols.

In some examples, the configuring manager 1655 may be configured as or otherwise support a means for configuring the UE to apply the configuration for the padding duration by allocating an additional symbol and an extended cyclic prefix to the padding duration, where a remaining padding duration includes the extended cyclic prefix. In some examples, a duration of the extended cyclic prefix is greater than a duration of a cyclic prefix of the set of multiple cyclic prefixes.

Additionally or alternatively, the communications manager 1620 may support wireless communication at a base station in accordance with examples as disclosed herein. The communications indication transmission manager 1640 may be configured as or otherwise support a means for transmitting, to a UE, an indication of an SCS for communications in a set of multiple TTIs, where a TTI of the set of multiple TTIs includes a set of multiple symbols, a corresponding set of multiple cyclic prefixes, and a padding duration, where a symbol duration of the set of multiple symbols is based on the SCS and where the padding duration is at least as long as the symbol duration. The configuration control signal transmission manager 1645 may be configured as or otherwise support a means for transmitting, to the UE, a control signal indicating a configuration for the padding duration, where the configuration indicates that the padding duration is to be reallocated as one or more additional symbols with corresponding one or more additional cyclic prefixes, where the one or more additional cyclic prefixes and at least a first portion of the set of multiple cyclic prefixes are reduced in duration in comparison with a remaining portion of the set of multiple cyclic prefixes. The TTI manager 1650 may be configured as or otherwise support a means for communicating during the TTI using the one or more additional symbols and the set of multiple symbols with the corresponding one or more additional cyclic prefixes, the first portion of the set of multiple cyclic prefixes, and the remaining portion of the set of multiple cyclic prefixes.

In some examples, to support transmitting the control signal, the control signal transmission manager 1630 may be configured as or otherwise support a means for transmitting the control signal selecting a first configuration mode or a second configuration mode based on a delay spread condition at the UE, where, the first configuration mode is associated with a reduced delay spread environment in comparison with an environment associated with the second configuration mode.

In some examples, the mode manager 1660 may be configured as or otherwise support a means for receiving, from the UE, a request for the first configuration mode or the second configuration mode based on the delay spread condition at the UE, where the control signaling selecting the first configuration mode or the second configuration mode is based on the transmitted request.

In some examples, the report manager 1665 may be configured as or otherwise support a means for receiving a report indicating a delay spread measurement at the UE, where the control signaling selecting the first configuration mode or the second configuration mode is based on the transmitted indication.

In some examples, to support transmitting the control signal, the switch manager 1670 may be configured as or otherwise support a means for transmitting an indication to switch from communicating according to the first configuration mode to the second configuration mode or from communicating according to the second configuration mode to the first configuration mode. In some examples, the selected configuration mode is applied to a set of multiple UEs included in a cell.

Figure 17:
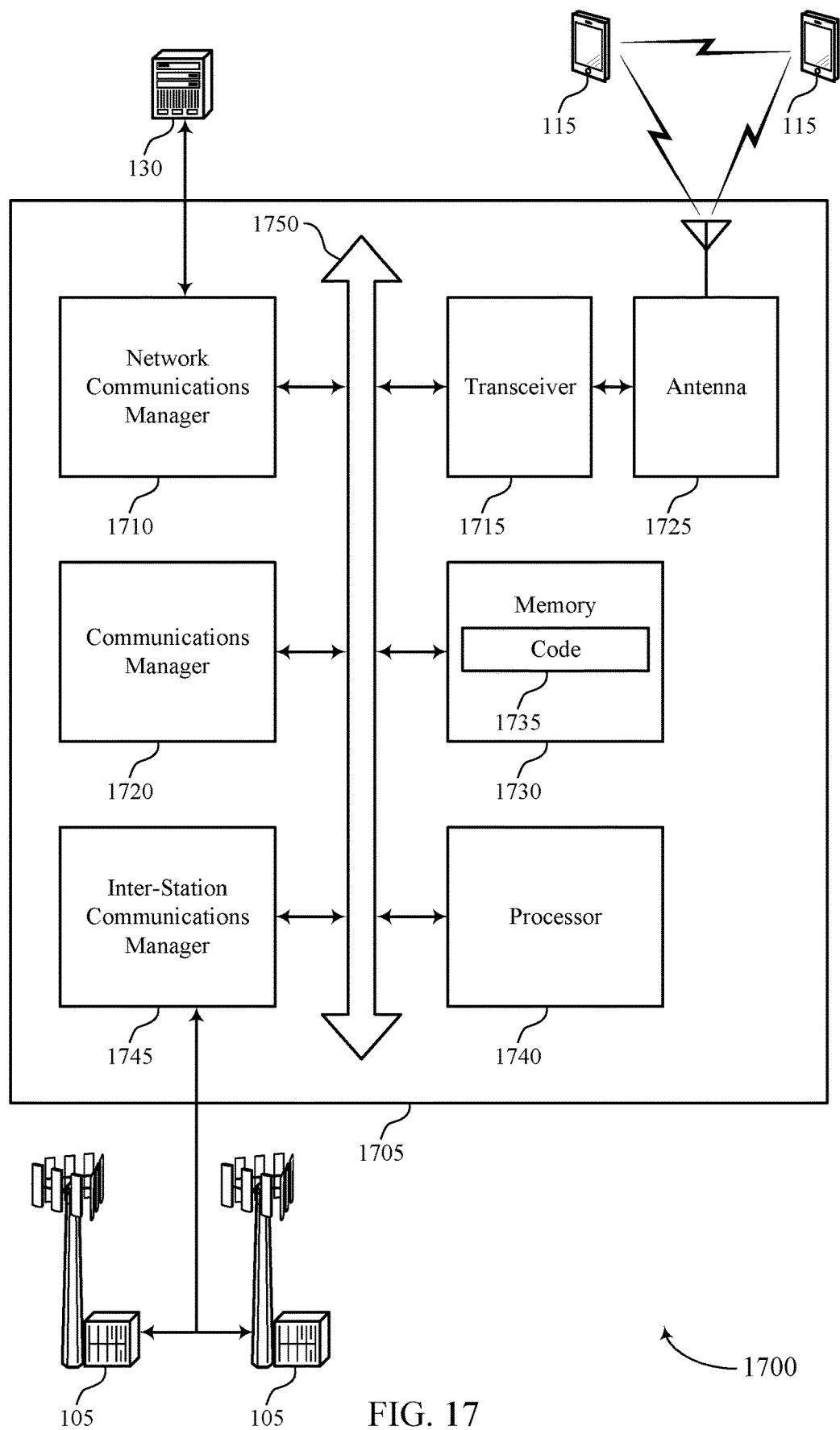
FIG. 17 shows a diagram of a system including a device that supports techniques for symbol transmission with modified padding duration in accordance with aspects of the present disclosure.

FIG. 17 shows a diagram of a system 1700 including a device 1705 that supports techniques for symbol transmission with modified padding duration in accordance with aspects of the present disclosure. The device 1705 may be an example of or include the components of a device 1405, a device 1505, or a base station 105 as described herein. The device 1705 may communicate wirelessly with one or more base stations 105, UEs 115, or any combination thereof. The device 1705 may include components for bi-directional voice and data communications including components for transmitting and receiving communications, such as a communications manager 1720, a network communications manager 1710, a transceiver 1715, an antenna 1725, a memory 1730, code 1735, a processor 1740, and an interstation communications manager 1745. These components may be in electronic communication or otherwise coupled (e.g., operatively, communicatively, functionally, electronically, electrically) via one or more buses (e.g., a bus 1750).

The network communications manager 1710 may manage communications with a core network 130 (e.g., via one or more wired backhaul links). For example, the network communications manager 1710 may manage the transfer of data communications for client devices, such as one or more UEs 115.

In some cases, the device 1705 may include a single antenna 1725. However, in some other cases the device 1705 may have more than one antenna 1725, which may be capable of concurrently transmitting or receiving multiple wireless transmissions. The transceiver 1715 may communicate bi-directionally, via the one or more antennas 1725, wired, or wireless links as described herein. For example, the transceiver 1715 may represent a wireless transceiver and may communicate bi-directionally with another wireless transceiver. The transceiver 1715 may also include a modem to modulate the packets, to provide the modulated packets to one or more antennas 1725 for transmission, and to demodulate packets received from the one or more antennas 1725. The transceiver 1715, or the transceiver 1715 and one or more antennas 1725, may be an example of a transmitter 1415, a transmitter 1515, a receiver 1410, a receiver 1510, or any combination thereof or component thereof, as described herein.

The memory 1730 may include RAM and ROM. The memory 1730 may store computer-readable, computer-executable code 1735 including instructions that, when executed by the processor 1740, cause the device 1705 to perform various functions described herein. The code 1735 may be stored in a non-transitory computer-readable medium such as system memory or another type of memory. In some cases, the code 1735 may not be directly executable by the processor 1740 but may cause a computer (e.g., when compiled and executed) to perform functions described herein. In some cases, the memory 1730 may contain, among other things, a BIOS which may control basic hardware or software operation such as the interaction with peripheral components or devices.

The processor 1740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting techniques for symbol transmission with modified padding duration). For example, the device 1705 or a component of the device 1705 may include a processor 1740 and memory 1730 coupled to the processor 1740, the processor 1740 and memory 1730 configured to perform various functions described herein.

The inter-station communications manager 1745 may manage communications with other base stations 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communications network technology to provide communication between base stations 105.

The communications manager 1720 may support wireless communication at a base station in accordance with examples as disclosed herein. For example, the communications manager 1720 may be configured as or otherwise support a means for transmitting, to a UE, an indication of an SCS for communications in a set of multiple TTIs, where a TTI of the set of multiple TTIs includes a set of multiple symbols, a corresponding set of multiple cyclic prefixes, and a padding duration, where a symbol duration of the set of multiple symbols is based on the SCS and where the padding duration is longer than the symbol duration. The communications manager 1720 may be configured as or otherwise support a means for transmitting, to the UE, a control signal indicating a configuration for the padding duration, where the configuration indicates that at least a first portion of the padding duration is to be reallocated as one or more additional symbols with corresponding one or more additional cyclic prefixes. The communications manager 1720 may be configured as or otherwise support a means for communicating during the padding duration using the one or more additional symbols and the corresponding one or more additional cyclic prefixes.

Additionally or alternatively, the communications manager 1720 may support wireless communication at a base station in accordance with examples as disclosed herein. For example, the communications manager 1720 may be configured as or otherwise support a means for transmitting, to a UE, an indication of an SCS for communications in a set of multiple TTIs, where a TTI of the set of multiple TTIs includes a set of multiple symbols, a corresponding set of multiple cyclic prefixes, and a padding duration, where a symbol duration of the set of multiple symbols is based on the SCS and where the padding duration is at least as long as the symbol duration. The communications manager 1720 may be configured as or otherwise support a means for transmitting, to the UE, a control signal indicating a configuration for the padding duration, where the configuration indicates that the padding duration is to be reallocated as one or more additional symbols with corresponding one or more additional cyclic prefixes, where the one or more additional cyclic prefixes and at least a first portion of the set of multiple cyclic prefixes are reduced in duration in comparison with a remaining portion of the set of multiple cyclic prefixes. The communications manager 1720 may be configured as or otherwise support a means for communicating during the TTI using the one or more additional symbols and the set of multiple symbols with the corresponding one or more additional cyclic prefixes, the first portion of the set of multiple cyclic prefixes, and the remaining portion of the set of multiple cyclic prefixes.

By including or configuring the communications manager 1720 in accordance with examples as described herein, the device 1705 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1720 may be configured to perform various operations (e.g., receiving, monitoring, transmitting) using or otherwise in cooperation with the transceiver 1715, the one or more antennas 1725, or any combination thereof. Although the communications manager 1720 is illustrated as a separate component, in some examples, one or more functions described with reference to the communications manager 1720 may be supported by or performed by the processor 1740, the memory 1730, the code 1735, or any combination thereof. For example, the code 1735 may include instructions executable by the processor 1740 to cause the device 1705 to perform various aspects of techniques for symbol transmission with modified padding duration as described herein, or the processor 1740 and the memory 1730 may be otherwise configured to perform or support such operations.

Figure 18:
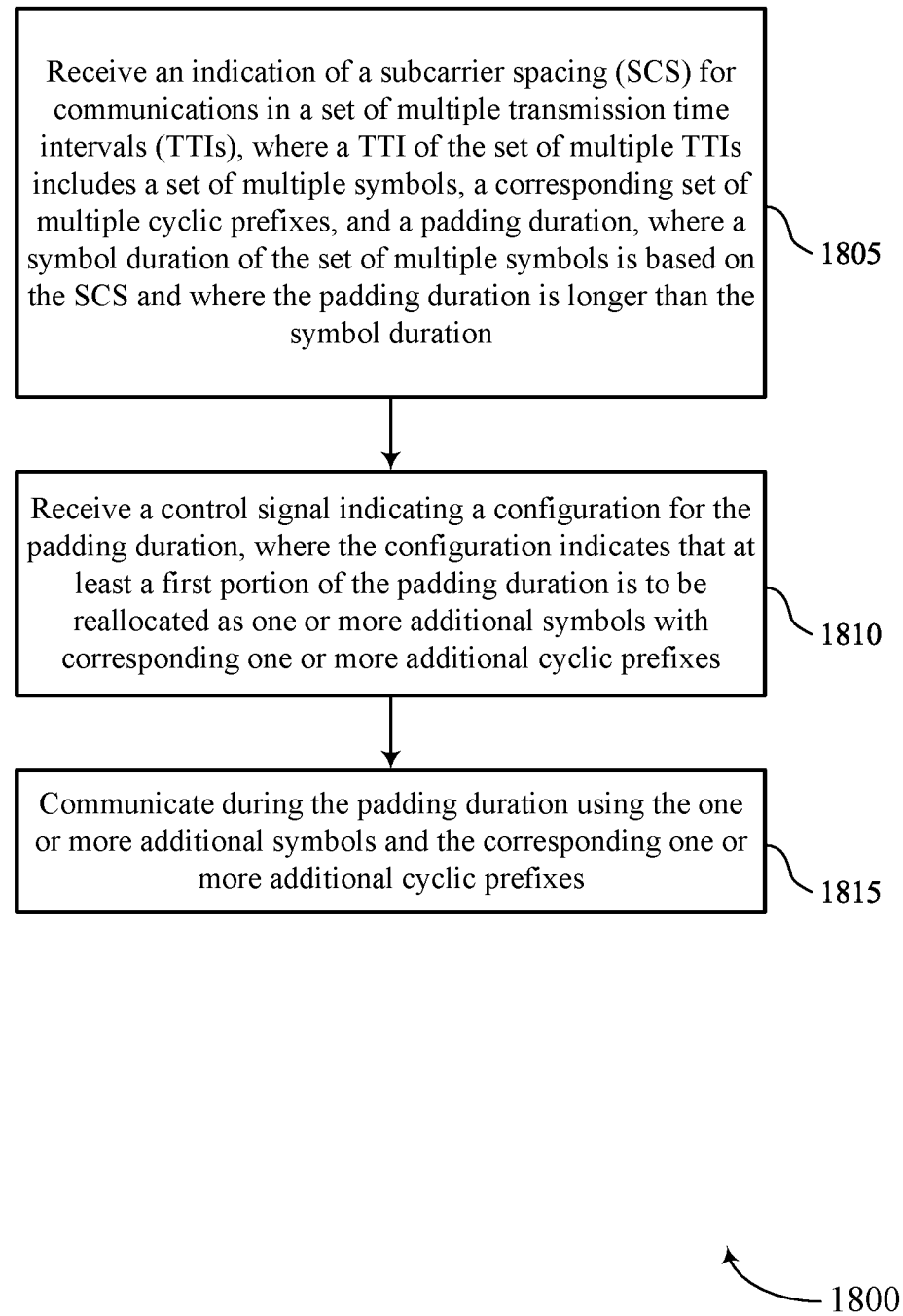
FIGS. 18 through 25 show flowcharts illustrating methods that support techniques for symbol transmission with modified padding duration in accordance with aspects of the present disclosure.

FIG. 18 shows a flowchart illustrating a method 1800 that supports techniques for symbol transmission with modified padding duration in accordance with aspects of the present disclosure. The operations of the method 1800 may be implemented by a UE or its components as described herein. For example, the operations of the method 1800 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1805, the method may include receiving an indication of an SCS for communications in a set of multiple TTIs, where a TTI of the set of multiple TTIs includes a set of multiple symbols, a corresponding set of multiple cyclic prefixes, and a padding duration, where a symbol duration of the set of multiple symbols is based on the SCS and where the padding duration is longer than the symbol duration. The operations of 1805 may be performed in accordance with examples as disclosed herein. In some examples, aspects of the operations of 1805 may be performed by an indication manager 1225 as described with reference to FIG. 12.

At 1810, the method may include receiving a control signal indicating a configuration for the padding duration, where the configuration indicates that at least a first portion of the padding duration is to be reallocated as one or more additional symbols with corresponding one or more additional cyclic prefixes. The operations of 1810 may be performed in accordance with examples as disclosed herein. In some examples, aspects of the operations of 1810 may be performed by a control signal manager 1230 as described with reference to FIG. 12.

At 1815, the method may include communicating during the padding duration using the one or more additional symbols and the corresponding one or more additional cyclic prefixes. The operations of 1815 may be performed in accordance with examples as disclosed herein. In some examples, aspects of the operations of 1815 may be performed by a padding duration communications manager 1235 as described with reference to FIG. 12.

Figure 19:
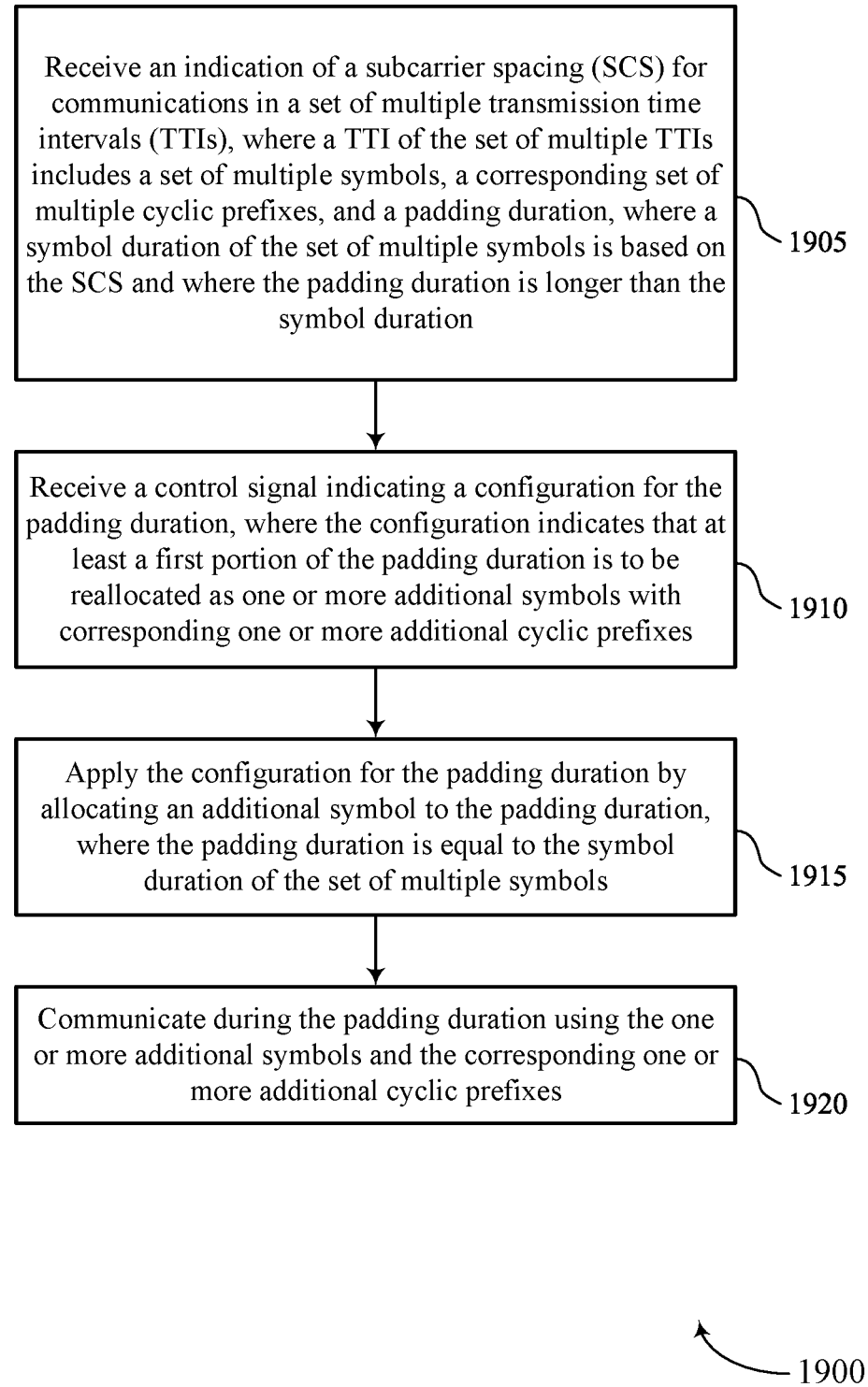

FIG. 19 shows a flowchart illustrating a method 1900 that supports techniques for symbol transmission with modified padding duration in accordance with aspects of the present disclosure. The operations of the method 1900 may be implemented by a UE or its components as described herein. For example, the operations of the method 1900 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1905, the method may include receiving an indication of an SCS for communications in a set of multiple TTIs, where a TTI of the set of multiple TTIs includes a set of multiple symbols, a corresponding set of multiple cyclic prefixes, and a padding duration, where a symbol duration of the set of multiple symbols is based on the SCS and where the padding duration is longer than the symbol duration. The operations of 1905 may be performed in accordance with examples as disclosed herein. In some examples, aspects of the operations of 1905 may be performed by an indication manager 1225 as described with reference to FIG. 12.

At 1910, the method may include receiving a control signal indicating a configuration for the padding duration, where the configuration indicates that at least a first portion of the padding duration is to be reallocated as one or more additional symbols with corresponding one or more additional cyclic prefixes. The operations of 1910 may be performed in accordance with examples as disclosed herein. In some examples, aspects of the operations of 1910 may be performed by a control signal manager 1230 as described with reference to FIG. 12.

At 1915, the method may include applying the configuration for the padding duration by allocating an additional symbol to the padding duration, where the padding duration is equal to the symbol duration of the set of multiple symbols. The operations of 1915 may be performed in accordance with examples as disclosed herein. In some examples, aspects of the operations of 1915 may be performed by a configuration applying manager 1255 as described with reference to FIG. 12.

At 1920, the method may include communicating during the padding duration using the one or more additional symbols and the corresponding one or more additional cyclic prefixes. The operations of 1920 may be performed in accordance with examples as disclosed herein. In some examples, aspects of the operations of 1920 may be performed by a padding duration communications manager 1235 as described with reference to FIG. 12.

Figure 20:
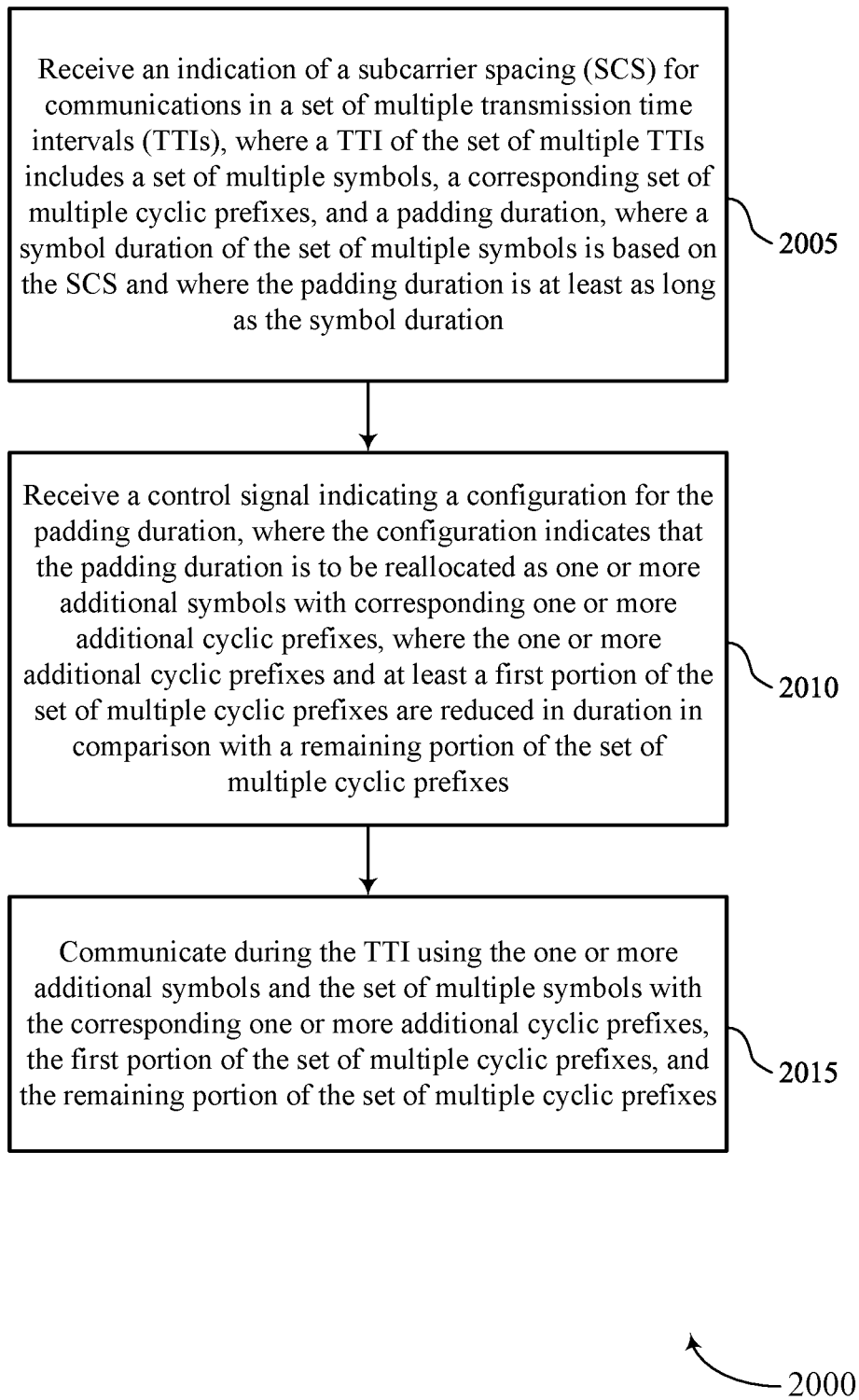

FIG. 20 shows a flowchart illustrating a method 2000 that supports techniques for symbol transmission with modified padding duration in accordance with aspects of the present disclosure. The operations of the method 2000 may be implemented by a UE or its components as described herein. For example, the operations of the method 2000 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 2005, the method may include receiving an indication of an SCS for communications in a set of multiple TTIs, where a TTI of the set of multiple TTIs includes a set of multiple symbols, a corresponding set of multiple cyclic prefixes, and a padding duration, where a symbol duration of the set of multiple symbols is based on the SCS and where the padding duration is at least as long as the symbol duration. The operations of 2005 may be performed in accordance with examples as disclosed herein. In some examples, aspects of the operations of 2005 may be performed by a communications indication manager 1240 as described with reference to FIG. 12.

At 2010, the method may include receiving a control signal indicating a configuration for the padding duration, where the configuration indicates that the padding duration is to be reallocated as one or more additional symbols with corresponding one or more additional cyclic prefixes, where the one or more additional cyclic prefixes and at least a first portion of the set of multiple cyclic prefixes are reduced in duration in comparison with a remaining portion of the set of multiple cyclic prefixes. The operations of 2010 may be performed in accordance with examples as disclosed herein. In some examples, aspects of the operations of 2010 may be performed by a configuration control signal manager 1245 as described with reference to FIG. 12.

At 2015, the method may include communicating during the TTI using the one or more additional symbols and the set of multiple symbols with the corresponding one or more additional cyclic prefixes, the first portion of the set of multiple cyclic prefixes, and the remaining portion of the set of multiple cyclic prefixes. The operations of 2015 may be performed in accordance with examples as disclosed herein. In some examples, aspects of the operations of 2015 may be performed by a TTI communications manager 1250 as described with reference to FIG. 12.

Figure 21:
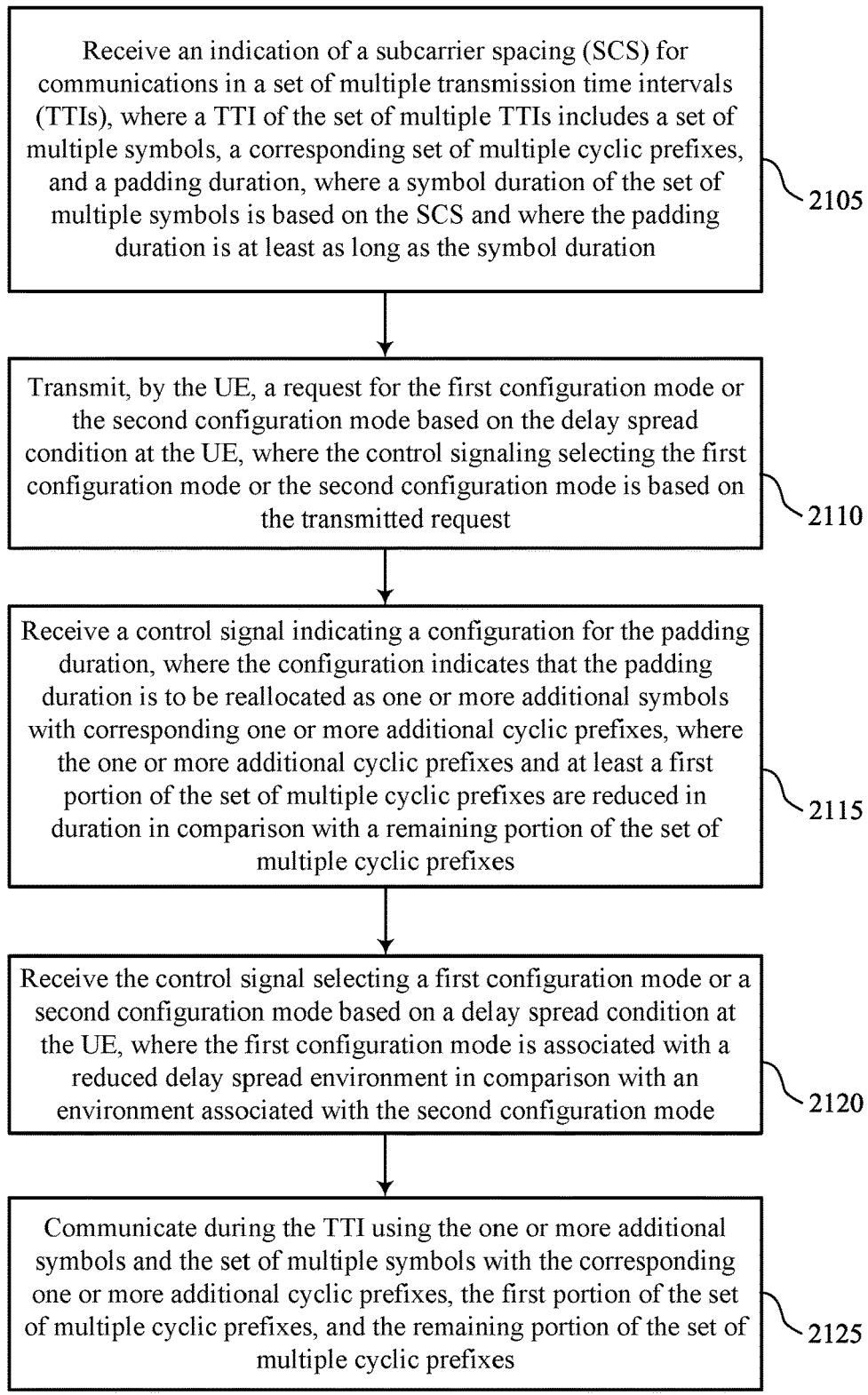

FIG. 21 shows a flowchart illustrating a method 2100 that supports techniques for symbol transmission with modified padding duration in accordance with aspects of the present disclosure. The operations of the method 2100 may be implemented by a UE or its components as described herein. For example, the operations of the method 2100 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 2105, the method may include receiving an indication of an SCS for communications in a set of multiple TTIs, where a TTI of the set of multiple TTIs includes a set of multiple symbols, a corresponding set of multiple cyclic prefixes, and a padding duration, where a symbol duration of the set of multiple symbols is based on the SCS and where the padding duration is at least as long as the symbol duration. The operations of 2105 may be performed in accordance with examples as disclosed herein. In some examples, aspects of the operations of 2105 may be performed by a communications indication manager 1240 as described with reference to FIG. 12.

At 2110, the method may include transmitting, by the UE, a request for the first configuration mode or the second configuration mode based on the delay spread condition at the UE, where the control signaling selecting the first configuration mode or the second configuration mode is based on the transmitted request. The operations of 2110 may be performed in accordance with examples as disclosed herein. In some examples, aspects of the operations of 2110 may be performed by a request manager 1260 as described with reference to FIG. 12.

At 2115, the method may include receiving a control signal indicating a configuration for the padding duration, where the configuration indicates that the padding duration is to be reallocated as one or more additional symbols with corresponding one or more additional cyclic prefixes, where the one or more additional cyclic prefixes and at least a first portion of the set of multiple cyclic prefixes are reduced in duration in comparison with a remaining portion of the set of multiple cyclic prefixes. The operations of 2115 may be performed in accordance with examples as disclosed herein. In some examples, aspects of the operations of 2115 may be performed by a configuration control signal manager 1245 as described with reference to FIG. 12.

At 2120, the method may include receiving the control signal selecting a first configuration mode or a second configuration mode based on a delay spread condition at the UE, where the first configuration mode is associated with a reduced delay spread environment in comparison with an environment associated with the second configuration mode. The operations of 2120 may be performed in accordance with examples as disclosed herein. In some examples, aspects of the operations of 2120 may be performed by a control signal manager 1230 as described with reference to FIG. 12.

At 2125, the method may include communicating during the TTI using the one or more additional symbols and the set of multiple symbols with the corresponding one or more additional cyclic prefixes, the first portion of the set of multiple cyclic prefixes, and the remaining portion of the set of multiple cyclic prefixes. The operations of 2125 may be performed in accordance with examples as disclosed herein. In some examples, aspects of the operations of 2125 may be performed by a TTI communications manager 1250 as described with reference to FIG. 12.

Figure 22:
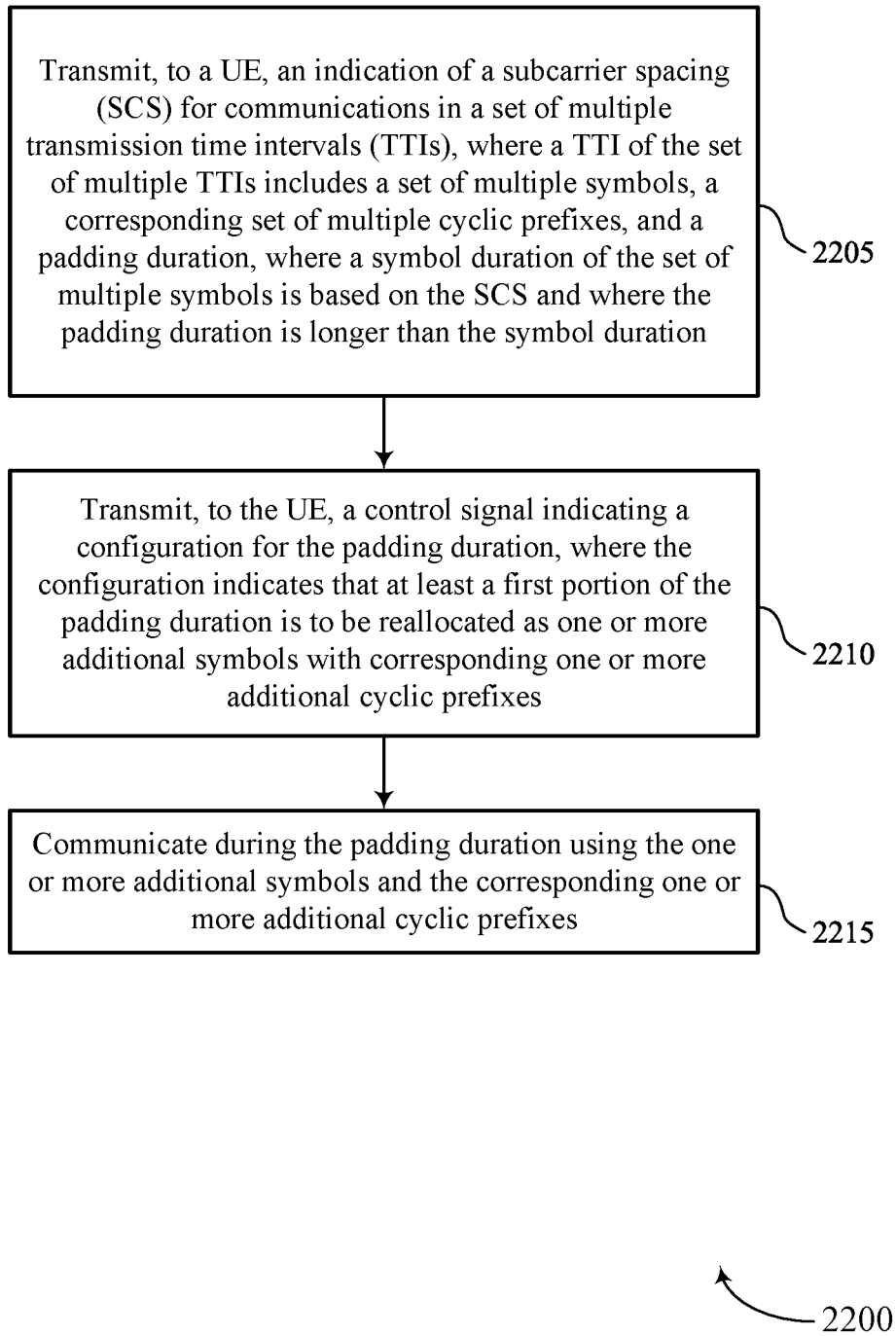

FIG. 22 shows a flowchart illustrating a method 2200 that supports techniques for symbol transmission with modified padding duration in accordance with aspects of the present disclosure. The operations of the method 2200 may be implemented by a base station or its components as described herein. For example, the operations of the method 2200 may be performed by a base station 105 as described with reference to FIGS. 1 through 9 and 14 through 17. In some examples, a base station may execute a set of instructions to control the functional elements of the base station to perform the described functions. Additionally or alternatively, the base station may perform aspects of the described functions using special-purpose hardware.

At 2205, the method may include transmitting, to a UE, an indication of an SCS for communications in a set of multiple TTIs, where a TTI of the set of multiple TTIs includes a set of multiple symbols, a corresponding set of multiple cyclic prefixes, and a padding duration, where a symbol duration of the set of multiple symbols is based on the SCS and where the padding duration is longer than the symbol duration. The operations of 2205 may be performed in accordance with examples as disclosed herein. In some examples, aspects of the operations of 2205 may be performed by an indication transmission manager 1625 as described with reference to FIG. 16.

At 2210, the method may include transmitting, to the UE, a control signal indicating a configuration for the padding duration, where the configuration indicates that at least a first portion of the padding duration is to be reallocated as one or more additional symbols with corresponding one or more additional cyclic prefixes. The operations of 2210 may be performed in accordance with examples as disclosed herein. In some examples, aspects of the operations of 2210 may be performed by a control signal transmission manager 1630 as described with reference to FIG. 16.

At 2215, the method may include communicating during the padding duration using the one or more additional symbols and the corresponding one or more additional cyclic prefixes. The operations of 2215 may be performed in accordance with examples as disclosed herein. In some examples, aspects of the operations of 2215 may be performed by a padding duration manager 1635 as described with reference to FIG. 16.

Figure 23:
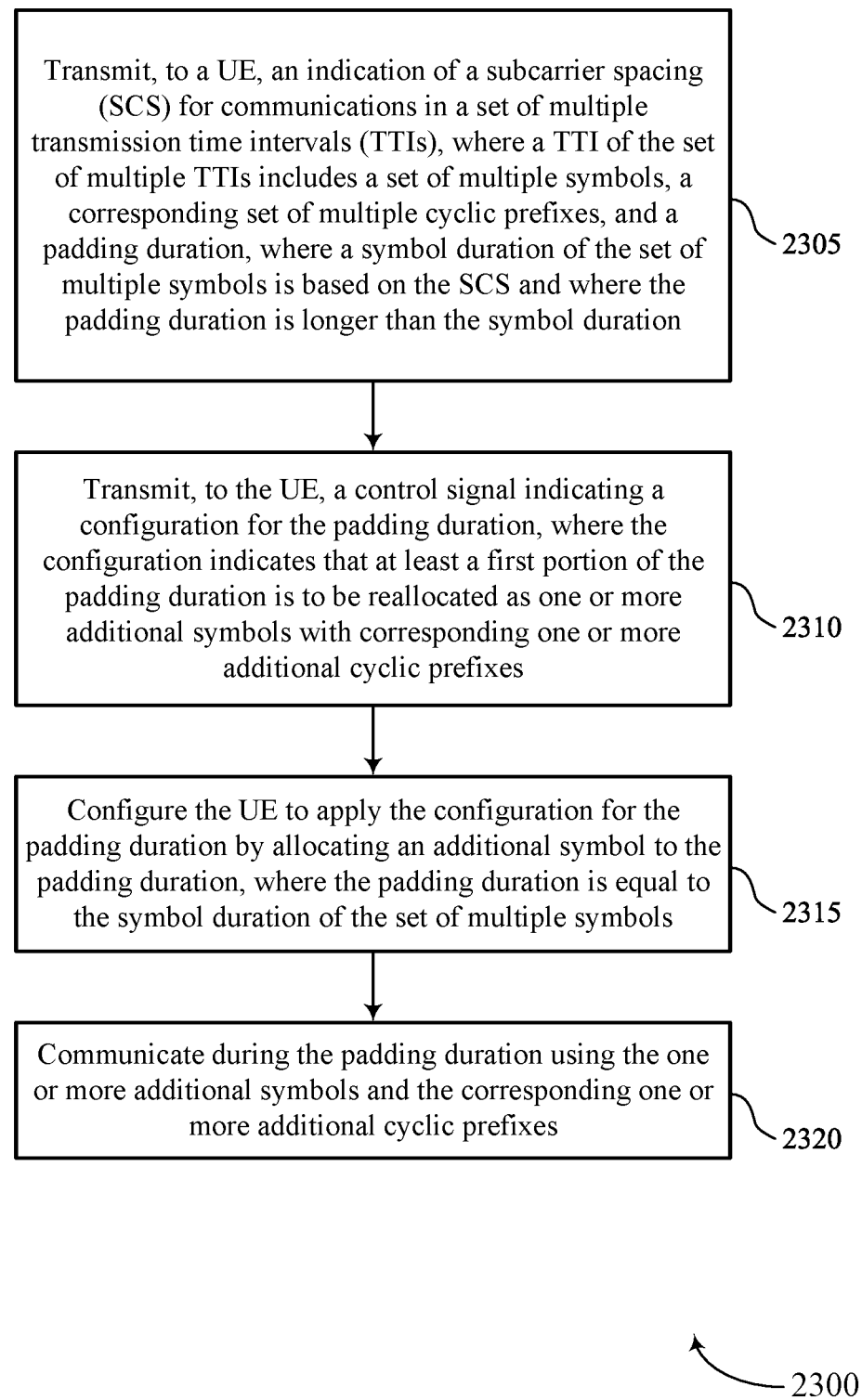

FIG. 23 shows a flowchart illustrating a method 2300 that supports techniques for symbol transmission with modified padding duration in accordance with aspects of the present disclosure. The operations of the method 2300 may be implemented by a base station or its components as described herein. For example, the operations of the method 2300 may be performed by a base station 105 as described with reference to FIGS. 1 through 9 and 14 through 17. In some examples, a base station may execute a set of instructions to control the functional elements of the base station to perform the described functions. Additionally or alternatively, the base station may perform aspects of the described functions using special-purpose hardware.

At 2305, the method may include transmitting, to a UE, an indication of an SCS for communications in a set of multiple TTIs, where a TTI of the set of multiple TTIs includes a set of multiple symbols, a corresponding set of multiple cyclic prefixes, and a padding duration, where a symbol duration of the set of multiple symbols is based on the SCS and where the padding duration is longer than the symbol duration. The operations of 2305 may be performed in accordance with examples as disclosed herein. In some examples, aspects of the operations of 2305 may be performed by an indication transmission manager 1625 as described with reference to FIG. 16.

At 2310, the method may include transmitting, to the UE, a control signal indicating a configuration for the padding duration, where the configuration indicates that at least a first portion of the padding duration is to be reallocated as one or more additional symbols with corresponding one or more additional cyclic prefixes. The operations of 2310 may be performed in accordance with examples as disclosed herein. In some examples, aspects of the operations of 2310 may be performed by a control signal transmission manager 1630 as described with reference to FIG. 16.

At 2315, the method may include configuring the UE to apply the configuration for the padding duration by allocating an additional symbol to the padding duration, where the padding duration is equal to the symbol duration of the set of multiple symbols. The operations of 2315 may be performed in accordance with examples as disclosed herein. In some examples, aspects of the operations of 2315 may be performed by a configuring manager 1655 as described with reference to FIG. 16.

At 2320, the method may include communicating during the padding duration using the one or more additional symbols and the corresponding one or more additional cyclic prefixes. The operations of 2320 may be performed in accordance with examples as disclosed herein. In some examples, aspects of the operations of 2320 may be performed by a padding duration manager 1635 as described with reference to FIG. 16.

Figure 24:
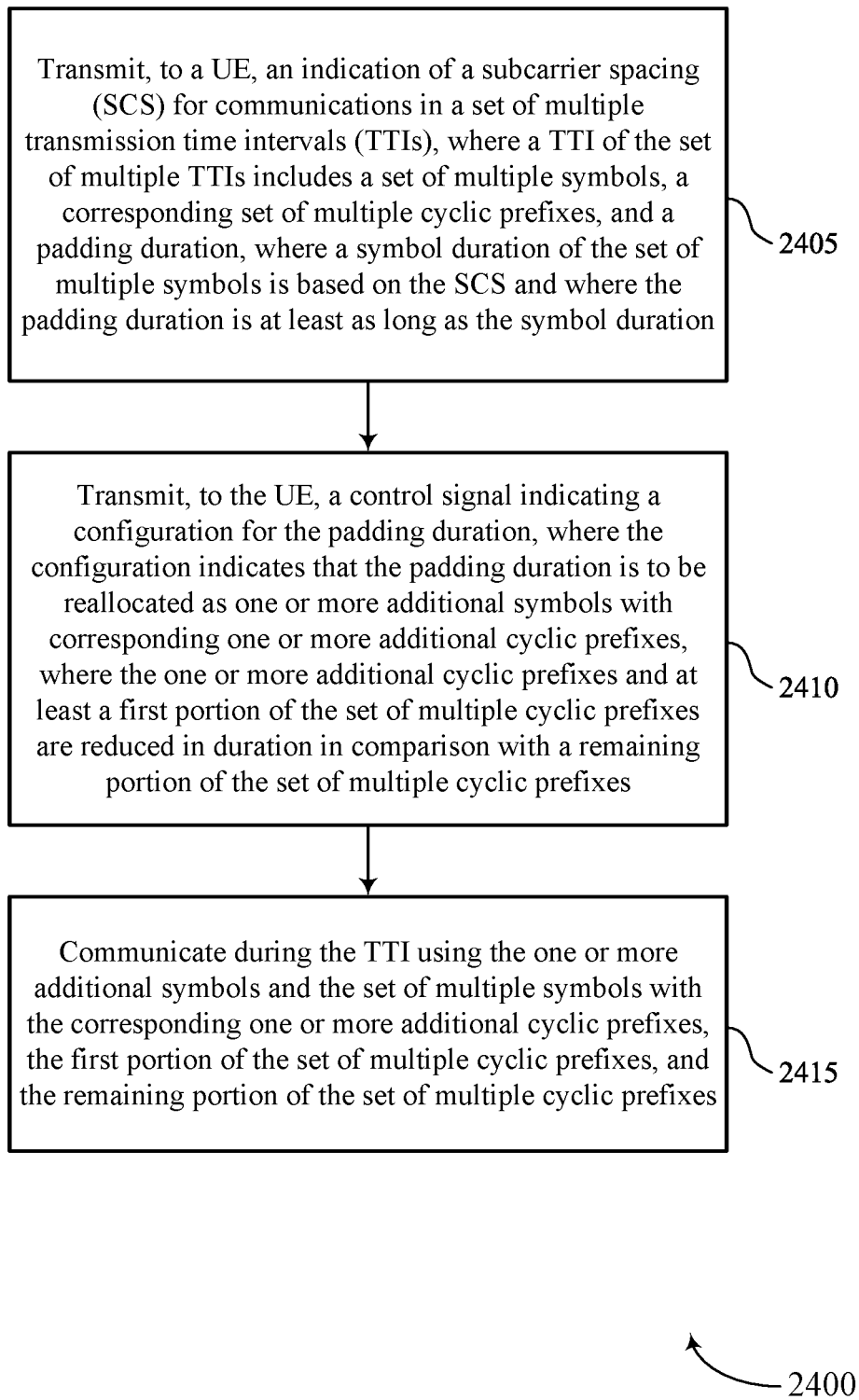

FIG. 24 shows a flowchart illustrating a method 2400 that supports techniques for symbol transmission with modified padding duration in accordance with aspects of the present disclosure. The operations of the method 2400 may be implemented by a base station or its components as described herein. For example, the operations of the method 2400 may be performed by a base station 105 as described with reference to FIGS. 1 through 9 and 14 through 17. In some examples, a base station may execute a set of instructions to control the functional elements of the base station to perform the described functions. Additionally or alternatively, the base station may perform aspects of the described functions using special-purpose hardware.

At 2405, the method may include transmitting, to a UE, an indication of an SCS for communications in a set of multiple TTIs, where a TTI of the set of multiple TTIs includes a set of multiple symbols, a corresponding set of multiple cyclic prefixes, and a padding duration, where a symbol duration of the set of multiple symbols is based on the SCS and where the padding duration is at least as long as the symbol duration. The operations of 2405 may be performed in accordance with examples as disclosed herein. In some examples, aspects of the operations of 2405 may be performed by a communications indication transmission manager 1640 as described with reference to FIG. 16.

At 2410, the method may include transmitting, to the UE, a control signal indicating a configuration for the padding duration, where the configuration indicates that the padding duration is to be reallocated as one or more additional symbols with corresponding one or more additional cyclic prefixes, where the one or more additional cyclic prefixes and at least a first portion of the set of multiple cyclic prefixes are reduced in duration in comparison with a remaining portion of the set of multiple cyclic prefixes. The operations of 2410 may be performed in accordance with examples as disclosed herein. In some examples, aspects of the operations of 2410 may be performed by a configuration control signal transmission manager 1645 as described with reference to FIG. 16.

At 2415, the method may include communicating during the TTI using the one or more additional symbols and the set of multiple symbols with the corresponding one or more additional cyclic prefixes, the first portion of the set of multiple cyclic prefixes, and the remaining portion of the set of multiple cyclic prefixes. The operations of 2415 may be performed in accordance with examples as disclosed herein. In some examples, aspects of the operations of 2415 may be performed by a TTI manager 1650 as described with reference to FIG. 16.

Figure 25:
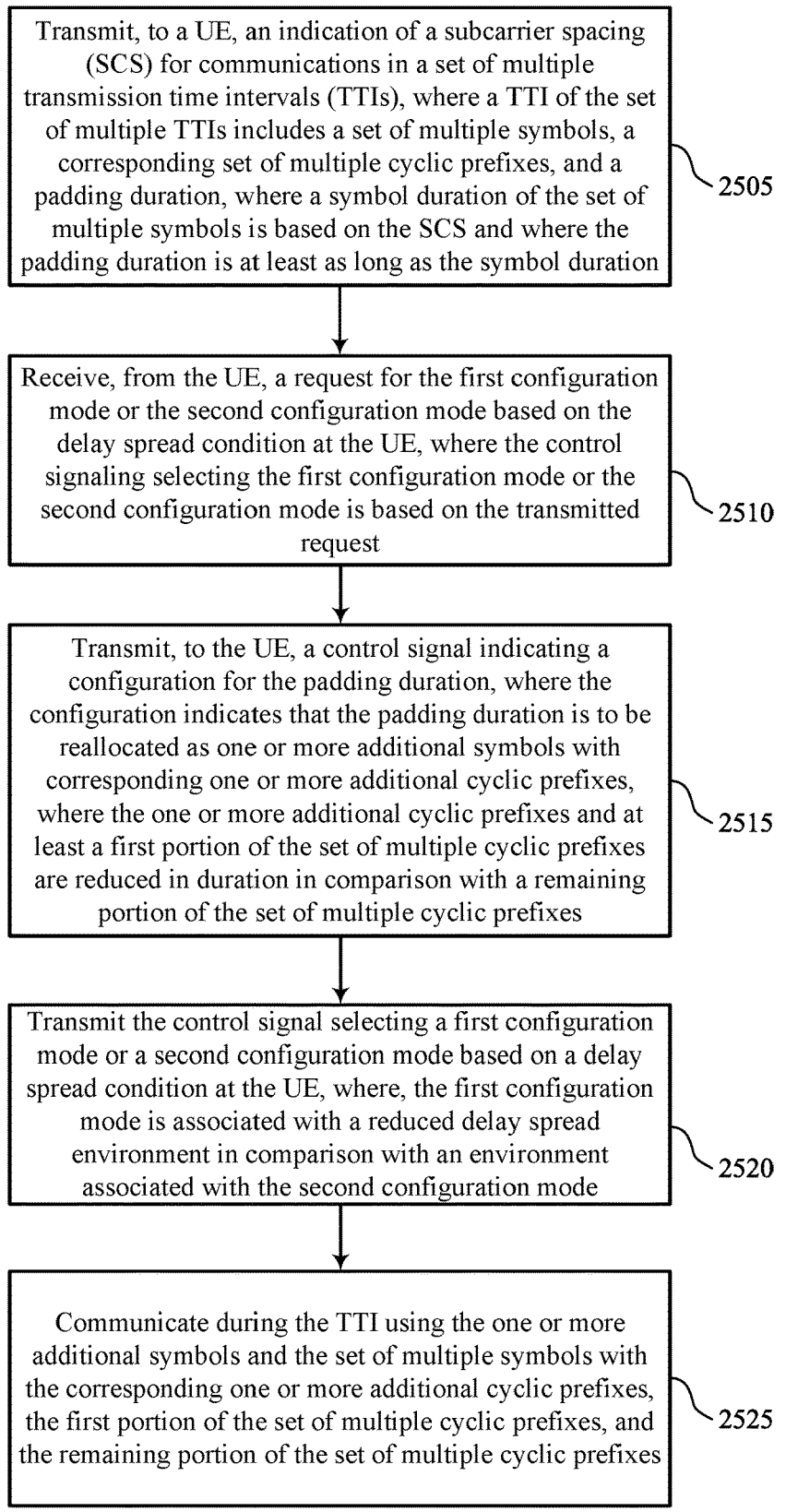

FIG. 25 shows a flowchart illustrating a method 2500 that supports techniques for symbol transmission with modified padding duration in accordance with aspects of the present disclosure. The operations of the method 2500 may be implemented by a base station or its components as described herein. For example, the operations of the method 2500 may be performed by a base station 105 as described with reference to FIGS. 1 through 9 and 14 through 17. In some examples, a base station may execute a set of instructions to control the functional elements of the base station to perform the described functions. Additionally or alternatively, the base station may perform aspects of the described functions using special-purpose hardware.

At 2505, the method may include transmitting, to a UE, an indication of an SCS for communications in a set of multiple TTIs, where a TTI of the set of multiple TTIs includes a set of multiple symbols, a corresponding set of multiple cyclic prefixes, and a padding duration, where a symbol duration of the set of multiple symbols is based on the SCS and where the padding duration is at least as long as the symbol duration. The operations of 2505 may be performed in accordance with examples as disclosed herein. In some examples, aspects of the operations of 2505 may be performed by a communications indication transmission manager 1640 as described with reference to FIG. 16.

At 2510, the method may include receiving, from the UE, a request for the first configuration mode or the second configuration mode based on the delay spread condition at the UE, where the control signaling selecting the first configuration mode or the second configuration mode is based on the transmitted request. The operations of 2510 may be performed in accordance with examples as disclosed herein. In some examples, aspects of the operations of 2510 may be performed by a mode manager 1660 as described with reference to FIG. 16.

At 2515, the method may include transmitting, to the UE, a control signal indicating a configuration for the padding duration, where the configuration indicates that the padding duration is to be reallocated as one or more additional symbols with corresponding one or more additional cyclic prefixes, where the one or more additional cyclic prefixes and at least a first portion of the set of multiple cyclic prefixes are reduced in duration in comparison with a remaining portion of the set of multiple cyclic prefixes. The operations of 2515 may be performed in accordance with examples as disclosed herein. In some examples, aspects of the operations of 2515 may be performed by a configuration control signal transmission manager 1645 as described with reference to FIG. 16.

At 2520, the method may include transmitting the control signal selecting a first configuration mode or a second configuration mode based on a delay spread condition at the UE, where, the first configuration mode is associated with a reduced delay spread environment in comparison with an environment associated with the second configuration mode. The operations of 2520 may be performed in accordance with examples as disclosed herein. In some examples, aspects of the operations of 2520 may be performed by a control signal transmission manager 1630 as described with reference to FIG. 16.

At 2525, the method may include communicating during the TTI using the one or more additional symbols and the set of multiple symbols with the corresponding one or more additional cyclic prefixes, the first portion of the set of multiple cyclic prefixes, and the remaining portion of the set of multiple cyclic prefixes. The operations of 2525 may be performed in accordance with examples as disclosed herein. In some examples, aspects of the operations of 2525 may be performed by a TTI manager 1650 as described with reference to FIG. 16.

The following provides an overview of aspects of the present disclosure:

Aspect 1: A method for wireless communication at a UE, comprising: receiving an indication of a subcarrier spacing for communications in a plurality of transmission time intervals, wherein a transmission time interval of the plurality of transmission time intervals comprises a plurality of symbols, a corresponding plurality of cyclic prefixes, and a padding duration, wherein a symbol duration of the plurality of symbols is based at least in part on the subcarrier spacing and wherein the padding duration is longer than the symbol duration; receiving a control signal indicating a configuration for the padding duration, wherein the configuration indicates that at least a first portion of the padding duration is to be reallocated as one or more additional symbols with corresponding one or more additional cyclic prefixes; and communicating during the padding duration using the one or more additional symbols and the corresponding one or more additional cyclic prefixes.

Aspect 2: The method of aspect 1, further comprising: applying the configuration for the padding duration by allocating an additional symbol to the padding duration, wherein the padding duration is equal to the symbol duration of the plurality of symbols.

Aspect 3: The method of any of aspects 1 through 2, further comprising: applying the configuration for the padding duration by allocating an additional symbol and a corresponding cyclic prefix to at least a second portion of the padding duration, wherein the additional symbol duration is less than the symbol duration of the plurality of symbols.

Aspect 4: The method of any of aspects 1 through 3, further comprising: applying the configuration for the padding duration by allocating an additional symbol and a corresponding additional cyclic prefix to the padding duration, wherein a remaining padding duration after applying the configuration comprises an extended cyclic prefix and is less than or equal to the symbol duration of the plurality of symbols.

Aspect 5: The method of any of aspects 1 through 4, further comprising: applying the configuration for the padding duration by allocating an additional symbol and an extended cyclic prefix to the padding duration, wherein a remaining padding duration comprises the extended cyclic prefix.

Aspect 6: The method of aspect 5, wherein a duration of the extended cyclic prefix is greater than a duration of a cyclic prefix of the plurality of cyclic prefixes.

Aspect 7: The method of any of aspects 1 through 6, wherein the symbol duration is inversely proportional to the subcarrier spacing.

Aspect 8: The method of any of aspects 1 through 7, wherein the transmission time interval of the plurality of transmission time intervals comprises a half subframe.

Aspect 9: A method for wireless communication at a UE, comprising: receiving an indication of a subcarrier spacing for communications in a plurality of transmission time intervals, wherein a transmission time interval of the plurality of transmission time intervals comprises a plurality of symbols, a corresponding plurality of cyclic prefixes, and a padding duration, wherein a symbol duration of the plurality of symbols is based at least in part on the subcarrier spacing and wherein the padding duration is at least as long as the symbol duration; receiving a control signal indicating a configuration for the padding duration, wherein the configuration indicates that the padding duration is to be reallocated as one or more additional symbols with corresponding one or more additional cyclic prefixes, wherein the one or more additional cyclic prefixes and at least a first portion of the plurality of cyclic prefixes are reduced in duration in comparison with a remaining portion of the plurality of cyclic prefixes; and communicating during the transmission time interval using the one or more additional symbols and the plurality of symbols with the corresponding one or more additional cyclic prefixes, the first portion of the plurality of cyclic prefixes, and the remaining portion of the plurality of cyclic prefixes.

Aspect 10: The method of aspect 9, wherein receiving the control signal further comprises: receiving the control signal selecting a first configuration mode or a second configuration mode based at least in part on a delay spread condition at the UE, wherein the first configuration mode is associated with a reduced delay spread environment in comparison with an environment associated with the second configuration mode.

Aspect 11: The method of aspect 10, further comprising: transmitting, by the UE, a request for the first configuration mode or the second configuration mode based at least in part on the delay spread condition at the UE, wherein the control signaling selecting the first configuration mode or the second configuration mode is based at least in part on the transmitted request.

Aspect 12: The method of any of aspects 10 through 11, further comprising: transmitting a report indicating a delay spread measurement at the UE, wherein the control signaling selecting the first configuration mode or the second configuration mode is based at least in part on the transmitted indication.

Aspect 13: The method of aspect 12, wherein transmitting the report further comprises: periodically transmitting the report indicating the delay spread measurement at the UE.

Aspect 14: The method of any of aspects 10 through 13, wherein receiving the control signal further comprises: receiving an indication to switch from communicating according to the first configuration mode to the second configuration mode or from communicating according to the second configuration mode to the first configuration mode.

Aspect 15: The method of any of aspects 10 through 14, wherein the selected configuration mode is applied to a plurality of UEs included in a cell.

Aspect 16: The method of any of aspects 9 through 15, wherein the one or more additional cyclic prefixes in at least one transmission time interval of the plurality of transmission time intervals are reduced in duration in comparison with one or more cyclic prefixes associated with a remaining number of transmission time intervals of the plurality of transmission time intervals.

Aspect 17: The method of any of aspects 9 through 16, wherein the control signal comprises at least one of a radio resource control signal, a medium access control (MAC) control element, a downlink control information, or a combination thereof.

Aspect 18: The method of any of aspects 9 through 17, wherein the symbol duration is inversely proportional to the subcarrier spacing.

Aspect 19: The method of any of aspects 9 through 18, wherein the transmission time interval of the plurality of transmission time intervals comprises a half subframe.

Aspect 20: A method for wireless communication at a base station, comprising: transmitting, to a UE, an indication of a subcarrier spacing for communications in a plurality of transmission time intervals, wherein a transmission time interval of the plurality of transmission time intervals comprises a plurality of symbols, a corresponding plurality of cyclic prefixes, and a padding duration, wherein a symbol duration of the plurality of symbols is based at least in part on the subcarrier spacing and wherein the padding duration is longer than the symbol duration; transmitting, to the UE, a control signal indicating a configuration for the padding duration, wherein the configuration indicates that at least a first portion of the padding duration is to be reallocated as one or more additional symbols with corresponding one or more additional cyclic prefixes; and communicating during the padding duration using the one or more additional symbols and the corresponding one or more additional cyclic prefixes.

Aspect 21: The method of aspect 20, further comprising: configuring the UE to apply the configuration for the padding duration by allocating an additional symbol to the padding duration, wherein the padding duration is equal to the symbol duration of the plurality of symbols.

Aspect 22: The method of any of aspects 20 through 21, further comprising: configuring the UE to apply the configuration for the padding duration by allocating an additional symbol and a corresponding cyclic prefix to at least a second portion of the padding duration, wherein the additional symbol duration is less than the symbol duration of the plurality of symbols.

Aspect 23: The method of any of aspects 20 through 22, further comprising: configuring the UE to apply the configuration for the padding duration by allocating an additional symbol and a corresponding additional cyclic prefix to the padding duration, wherein a remaining padding duration after applying the configuration comprises an extended cyclic prefix and is less than or equal to the symbol duration of the plurality of symbols.

Aspect 24: The method of any of aspects 20 through 23, further comprising: configuring the UE to apply the configuration for the padding duration by allocating an additional symbol and an extended cyclic prefix to the padding duration, wherein a remaining padding duration comprises the extended cyclic prefix.

Aspect 25: The method of aspect 24, wherein a duration of the extended cyclic prefix is greater than a duration of a cyclic prefix of the plurality of cyclic prefixes.

Aspect 26: A method for wireless communication at a base station, comprising: transmitting, to a UE, an indication of a subcarrier spacing for communications in a plurality of transmission time intervals, wherein a transmission time interval of the plurality of transmission time intervals comprises a plurality of symbols, a corresponding plurality of cyclic prefixes, and a padding duration, wherein a symbol duration of the plurality of symbols is based at least in part on the subcarrier spacing and wherein the padding duration is at least as long as the symbol duration; transmitting, to the UE, a control signal indicating a configuration for the padding duration, wherein the configuration indicates that the padding duration is to be reallocated as one or more additional symbols with corresponding one or more additional cyclic prefixes, wherein the one or more additional cyclic prefixes and at least a first portion of the plurality of cyclic prefixes are reduced in duration in comparison with a remaining portion of the plurality of cyclic prefixes; and communicating during the transmission time interval using the one or more additional symbols and the plurality of symbols with the corresponding one or more additional cyclic prefixes, the first portion of the plurality of cyclic prefixes, and the remaining portion of the plurality of cyclic prefixes.

Aspect 27: The method of aspect 26, wherein transmitting the control signal further comprises: transmitting the control signal selecting a first configuration mode or a second configuration mode based at least in part on a delay spread condition at the UE, wherein, the first configuration mode is associated with a reduced delay spread environment in comparison with an environment associated with the second configuration mode.

Aspect 28: The method of aspect 27, further comprising: receiving, from the UE, a request for the first configuration mode or the second configuration mode based at least in part on the delay spread condition at the UE, wherein the control signaling selecting the first configuration mode or the second configuration mode is based at least in part on the transmitted request.

Aspect 29: The method of any of aspects 27 through 28, further comprising: receiving a report indicating a delay spread measurement at the UE, wherein the control signaling selecting the first configuration mode or the second configuration mode is based at least in part on the transmitted indication.

Aspect 30: The method of any of aspects 27 through 29, wherein transmitting the control signal further comprises: transmitting an indication to switch from communicating according to the first configuration mode to the second configuration mode or from communicating according to the second configuration mode to the first configuration mode.

Aspect 31: The method of any of aspects 27 through 30, wherein the selected configuration mode is applied to a plurality of UEs included in a cell.

Aspect 32: An apparatus for wireless communication at a UE, comprising a processor; memory coupled with the processor; and instructions stored in the memory and executable by the processor to cause the apparatus to perform a method of any of aspects 1 through 8.

Aspect 33: An apparatus for wireless communication at a UE, comprising at least one means for performing a method of any of aspects 1 through 8.

Aspect 34: A non-transitory computer-readable medium storing code for wireless communication at a UE, the code comprising instructions executable by a processor to perform a method of any of aspects 1 through 8.

Aspect 35: An apparatus for wireless communication at a UE, comprising a processor; memory coupled with the processor; and instructions stored in the memory and executable by the processor to cause the apparatus to perform a method of any of aspects 9 through 19.

Aspect 36: An apparatus for wireless communication at a UE, comprising at least one means for performing a method of any of aspects 9 through 19.

Aspect 37: A non-transitory computer-readable medium storing code for wireless communication at a UE, the code comprising instructions executable by a processor to perform a method of any of aspects 9 through 19.

Aspect 38: An apparatus for wireless communication at a base station, comprising a processor; memory coupled with the processor; and instructions stored in the memory and executable by the processor to cause the apparatus to perform a method of any of aspects 20 through 25.

Aspect 39: An apparatus for wireless communication at a base station, comprising at least one means for performing a method of any of aspects 20 through 25.

Aspect 40: A non-transitory computer-readable medium storing code for wireless communication at a base station, the code comprising instructions executable by a processor to perform a method of any of aspects 20 through 25.

Aspect 41: An apparatus for wireless communication at a base station, comprising a processor; memory coupled with the processor; and instructions stored in the memory and executable by the processor to cause the apparatus to perform a method of any of aspects 26 through 31.

Aspect 42: An apparatus for wireless communication at a base station, comprising at least one means for performing a method of any of aspects 26 through 31.

Aspect 43: A non-transitory computer-readable medium storing code for wireless communication at a base station, the code comprising instructions executable by a processor to perform a method of any of aspects 26 through 31.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving an indication of a subcarrier spacing for communications in a plurality of transmission time intervals, wherein a transmission time interval of the plurality of transmission time intervals comprises a plurality of symbols, a corresponding plurality of cyclic prefixes, and a padding duration, wherein a symbol duration of the plurality of symbols is based at least in part on the subcarrier spacing and wherein the padding duration is longer than the symbol duration;

receiving a control signal indicating a configuration for the padding duration, wherein the configuration indicates that at least a first portion of the padding duration is to be reallocated as one or more additional symbols with corresponding one or more additional cyclic prefixes; and communicating during the padding duration using the one or more additional symbols and the corresponding one or more additional cyclic prefixes.

2. The method of claim 1, further comprising:
applying the configuration for the padding duration by allocating an additional symbol to the padding duration, wherein the padding duration is equal to the symbol duration of the plurality of symbols.

3. The method of claim 1, further comprising:
applying the configuration for the padding duration by allocating an additional symbol and a corresponding cyclic prefix to at least a second portion of the padding duration, wherein the additional symbol duration is less than the symbol duration of the plurality of symbols.

4. The method of claim 1, further comprising:
applying the configuration for the padding duration by allocating an additional symbol and a corresponding additional cyclic prefix to the padding duration, wherein a remaining padding duration after applying the configuration comprises an extended cyclic prefix and is less than or equal to the symbol duration of the plurality of symbols.

5. The method of claim 1, further comprising:
applying the configuration for the padding duration by allocating an additional symbol and an extended cyclic prefix to the padding duration, wherein a remaining padding duration comprises the extended cyclic prefix.

6. The method of claim 5, wherein a duration of the extended cyclic prefix is greater than a duration of a cyclic prefix of the plurality of cyclic prefixes.

7. The method of claim 1, wherein the symbol duration is inversely proportional to the subcarrier spacing.

8. The method of claim 1, wherein the transmission time interval of the plurality of transmission time intervals comprises a half subframe.

9. A method for wireless communication at a user equipment (UE), comprising:

receiving an indication of a subcarrier spacing for communications in a plurality of transmission time intervals, wherein a transmission time interval of the plurality of transmission time intervals comprises a plurality of symbols, a corresponding plurality of cyclic prefixes, and a padding duration, wherein a symbol duration of the plurality of symbols is based at least in part on the subcarrier spacing and wherein the padding duration is at least as long as the symbol duration;

receiving a control signal indicating a configuration for the padding duration, wherein the configuration indicates that the padding duration is to be reallocated as one or more additional symbols with corresponding one or more additional cyclic prefixes, wherein the one or more additional cyclic prefixes and at least a first portion of the plurality of cyclic prefixes are reduced in duration in comparison with a remaining portion of the plurality of cyclic prefixes; and communicating during the transmission time interval using the one or more additional symbols and the plurality of symbols with the corresponding one or more additional cyclic prefixes, the first portion of the plurality of cyclic prefixes, and the remaining portion of the plurality of cyclic prefixes.

10. The method of claim 9, wherein receiving the control signal further comprises:
receiving the control signal selecting a first configuration mode or a second configuration mode based at least in part on a delay spread condition at the UE, wherein the first configuration mode is associated with a reduced delay spread environment in comparison with an environment associated with the second configuration mode.

11. The method of claim 10, further comprising:
transmitting, by the UE, a request for the first configuration mode or the second configuration mode based at least in part on the delay spread condition at the UE, wherein the control signaling selecting the first configuration mode or the second configuration mode is based at least in part on the transmitted request.

12. The method of claim 10, further comprising:
transmitting a report indicating a delay spread measurement at the UE, wherein the control signaling selecting the first configuration mode or the second configuration mode is based at least in part on the transmitted indication.

13. The method of claim 12, wherein transmitting the report further comprises:
periodically transmitting the report indicating the delay spread measurement at the UE.

14. The method of claim 10, wherein receiving the control signal further comprises:
receiving an indication to switch from communicating according to the first configuration mode to the second configuration mode or from communicating according to the second configuration mode to the first configuration mode.

15. The method of claim 10, wherein the selected configuration mode is applied to a plurality of UEs included in a cell.

16. The method of claim 9, wherein the one or more additional cyclic prefixes in at least one transmission time interval of the plurality of transmission time intervals are reduced in duration in comparison with one or more cyclic prefixes associated with a remaining number of transmission time intervals of the plurality of transmission time intervals.

17. The method of claim 9, wherein the control signal comprises at least one of a radio resource control signal, a medium access control (MAC) control element, a downlink control information, or a combination thereof.

18. The method of claim 9, wherein the symbol duration is inversely proportional to the subcarrier spacing.

19. The method of claim 9, wherein the transmission time interval of the plurality of transmission time intervals comprises a half subframe.

20. A method for wireless communication at a base station, comprising:
transmitting, to a user equipment (UE), an indication of a subcarrier spacing for communications in a plurality of transmission time intervals, wherein a transmission time interval of the plurality of transmission time intervals comprises a plurality of symbols, a corresponding plurality of cyclic prefixes, and a padding duration, wherein a symbol duration of the plurality of symbols is based at least in part on the subcarrier spacing and wherein the padding duration is longer than the symbol duration;

transmitting, to the UE, a control signal indicating a configuration for the padding duration, wherein the configuration indicates that at least a first portion of the padding duration is to be reallocated as one or more additional symbols with corresponding one or more additional cyclic prefixes; and communicating during the padding duration using the one or more additional symbols and the corresponding one or more additional cyclic prefixes.

21. The method of claim 20, further comprising:
configuring the UE to apply the configuration for the padding duration by allocating an additional symbol to the padding duration, wherein the padding duration is equal to the symbol duration of the plurality of symbols.

22. The method of claim 20, further comprising:
configuring the UE to apply the configuration for the padding duration by allocating an additional symbol and a corresponding cyclic prefix to at least a second portion of the padding duration, wherein the additional symbol duration is less than the symbol duration of the plurality of symbols.

23. The method of claim 20, further comprising:
configuring the UE to apply the configuration for the padding duration by allocating an additional symbol and a corresponding additional cyclic prefix to the padding duration, wherein a remaining padding duration after applying the configuration comprises an extended cyclic prefix and is less than or equal to the symbol duration of the plurality of symbols.

24. The method of claim 20, further comprising:
configuring the UE to apply the configuration for the padding duration by allocating an additional symbol and an extended cyclic prefix to the padding duration, wherein a remaining padding duration comprises the extended cyclic prefix.

25. The method of claim 24, wherein a duration of the extended cyclic prefix is greater than a duration of a cyclic prefix of the plurality of cyclic prefixes.

26. A method for wireless communication at a base station, comprising:
transmitting, to a user equipment (UE), an indication of a subcarrier spacing for communications in a plurality of transmission time intervals, wherein a transmission time interval of the plurality of transmission time intervals comprises a plurality of symbols, a corresponding plurality of cyclic prefixes, and a padding duration, wherein a symbol duration of the plurality of symbols is based at least in part on the subcarrier spacing and wherein the padding duration is at least as long as the symbol duration;

transmitting, to the UE, a control signal indicating a configuration for the padding duration, wherein the configuration indicates that the padding duration is to be reallocated as one or more additional symbols with corresponding one or more additional cyclic prefixes, wherein the one or more additional cyclic prefixes and at least a first portion of the plurality of cyclic prefixes are reduced in duration in comparison with a remaining portion of the plurality of cyclic prefixes; and communicating during the transmission time interval using the one or more additional symbols and the plurality of symbols with the corresponding one or more additional cyclic prefixes, the first portion of the plurality of cyclic prefixes, and the remaining portion of the plurality of cyclic prefixes.

27. The method of claim 26, wherein transmitting the control signal further comprises:
transmitting the control signal selecting a first configuration mode or a second configuration mode based at least in part on a delay spread condition at the UE, wherein, the first configuration mode is associated with a reduced delay spread environment in comparison with an environment associated with the second configuration mode.

28. The method of claim 27, further comprising:
receiving, from the UE, a request for the first configuration mode or the second configuration mode based at least in part on the delay spread condition at the UE, wherein the control signaling selecting the first configuration mode or the second configuration mode is based at least in part on the transmitted request.

29. The method of claim 27, further comprising:
receiving a report indicating a delay spread measurement at the UE, wherein the control signaling selecting the first configuration mode or the second configuration mode is based at least in part on the transmitted indication.

30. The method of claim 27, wherein transmitting the control signal further comprises:
transmitting an indication to switch from communicating according to the first configuration mode to the second configuration mode or from communicating according to the second configuration mode to the first configuration mode.

* * * * *